United States Patent
Adapalli et al.

(10) Patent No.: US 9,824,390 B2
(45) Date of Patent: Nov. 21, 2017

(54) CLOUD SERVICE BROKERAGE SERVICE STORE

(71) Applicant: Gravitant, Inc., Austin, TX (US)

(72) Inventors: Sridhar Adapalli, Austin, TX (US); John Panzariu, Austin, TX (US); Raghunath Sapuram, Austin, TX (US); Parth Shah, Austin, TX (US); Debasmita Roychowdhury, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/868,164

(22) Filed: Sep. 28, 2015

(65) Prior Publication Data

US 2016/0019636 A1    Jan. 21, 2016

Related U.S. Application Data

(63) Continuation-in-part of application No. 14/210,431, filed on Mar. 13, 2014.

(60) Provisional application No. 61/789,865, filed on Mar. 15, 2013, provisional application No. 61/790,536, filed on Mar. 15, 2013, provisional application No. 61/792,998, filed on Mar. 15, 2013, provisional application No. 61/798,567, filed on Mar. 15, 2013.

(51) Int. Cl.
| | |
|---|---|
| *H04L 12/24* | (2006.01) |
| *H04L 12/26* | (2006.01) |
| *H04L 29/08* | (2006.01) |
| *H04L 12/911* | (2013.01) |
| *G06Q 30/06* | (2012.01) |
| *G06F 9/445* | (2006.01) |
| *G06Q 40/00* | (2012.01) |

(52) U.S. Cl.
CPC .......... *G06Q 30/0641* (2013.01); *G06F 8/60* (2013.01); *G06Q 30/0625* (2013.01); *G06Q 30/0629* (2013.01); *G06Q 30/0631* (2013.01); *G06Q 30/0635* (2013.01); *G06Q 40/00* (2013.01); *H04L 41/5045* (2013.01); *H04L 41/5054* (2013.01); *H04L 47/70* (2013.01); *H04L 47/78* (2013.01); *H04L 67/10* (2013.01); *H04L 41/145* (2013.01); *H04L 67/16* (2013.01)

(58) Field of Classification Search
None
See application file for complete search history.

(56) References Cited

U.S. PATENT DOCUMENTS

| | | | |
|---|---|---|---|
| 6,366,576 B1 * | 4/2002 | Haga | .................. H04L 12/6418 370/352 |
| 2006/0218156 A1 * | 9/2006 | Schechinger | ..... G06F 17/30864 |

(Continued)

*Primary Examiner* — Philip Chea
*Assistant Examiner* — Hassan Khan
(74) *Attorney, Agent, or Firm* — David O. Simmons; IVC Patent Agency

(57) ABSTRACT

A cloud service brokerage system includes an electronic cloud service catalog containing cloud service defining information for a plurality of cloud services and a cloud service store coupled to the electronic cloud service catalog. The cloud service store includes cloud service publications each representing cloud service functionality corresponding to one or more of the cloud services. The cloud service store includes a user interface structure enabling generation of cloud service orders each including one or more of the cloud service publications.

13 Claims, 43 Drawing Sheets

(56) References Cited

U.S. PATENT DOCUMENTS

| | | | |
|---|---|---|---|
| 2009/0086945 A1* | 4/2009 | Buchanan | H04M 3/42289 379/201.02 |
| 2010/0042720 A1* | 2/2010 | Stienhans | G06F 9/5072 709/226 |
| 2010/0325199 A1* | 12/2010 | Park | G06F 17/30067 709/203 |
| 2010/0332262 A1* | 12/2010 | Horvitz | G06F 9/5027 705/4 |
| 2011/0029882 A1* | 2/2011 | Jaisinghani | H04L 41/12 715/736 |
| 2011/0055712 A1* | 3/2011 | Tung | G06F 9/5072 715/738 |
| 2011/0145094 A1* | 6/2011 | Dawson | G06F 9/5027 705/26.63 |
| 2011/0153727 A1* | 6/2011 | Li | G06F 9/5055 709/203 |
| 2011/0276686 A1* | 11/2011 | Tung | G06F 9/5072 709/224 |
| 2011/0282793 A1* | 11/2011 | Mercuri | G06Q 30/0214 705/80 |
| 2012/0124211 A1* | 5/2012 | Kampas | G06F 9/50 709/226 |
| 2013/0060945 A1* | 3/2013 | Allam | G06F 9/5072 709/226 |
| 2013/0066940 A1* | 3/2013 | Shao | H04L 67/1025 709/201 |
| 2013/0067090 A1* | 3/2013 | Batrouni | H04L 67/1097 709/226 |
| 2013/0185413 A1* | 7/2013 | Beaty | G06F 9/5072 709/224 |

\* cited by examiner

| | amazon webservices | GOGRID | SAVVIS |
|---|---|---|---|
| | 462 | Pre-Paid Plans | Balanced |
| | Select | Select | Select |
| Description | On demand commodity cloud provider. Enterprise support available at additional cost | On demand commodity cloud offering based on prepaid plans for certain included 1GB RAM hours and monthly GB data transfer out with an average rate for additional hours and GBs used. Prices based on selecting Business Plan for Small Package, Corporate Plan for Medium Package, and Global Plan for Large Package. | Higher-level security & SLA; optimized for eCommerce & Web Hosting |
| Virtual Machine | • RAM(GB)<br>• CPUs(vCPU)<br>• Local Storage | • 0.6, 1.7, 7, 7.5, 15, 17, 1, 34.2, 68.4<br>• 1, 2, 4, 8 (fixed based on size above)<br>• Local instance storage is transient. EBS persistent storage can be attached | • 0.5, 1, 2, 4, 8, 16, 24 (fixed based on memory options below)<br>• 0.5, 1, 2, 4, 8, 16, 24<br>• 25, 50, 100, 200, 400, 800, 800 GB (fixed based on memory option above) | • 2, 4, 8, 16<br>• 1, 2, 4, 8<br>• 50GB – 1.625TB |
| Network | • Bandwidth<br>• VLANs<br>• Min Guar. Throughput<br>• Pricing Model<br>• Server Load Balancer<br>• Private Network | • 250 Mbps within EC2 network<br>• Any number of public/private VLANs<br>• None<br>• Charged per GB data transfer per month<br>• Additional Charge<br>• Supported | • 400 Mbps between servers<br>• 1x Public and 1x Private VLAN provided<br>• Throughput not guaranteed, but network performance (jitter/latency) guaranteed<br>• Charged per GB data transfer per month with prepaid plans available<br>• any number of pools by port<br>• Not Supported (All VMs must have public and private address) | • 100 Mbps Enterprise Grade QoS<br>• 1x Public and 1x Private<br>• None<br>• Charged by 95th Percentile for 5 minute Mbps Intervals Across Entire Month And Not Total Data Transferred<br>• 2 Pools<br>• Supported (3 tiers)(10.x.x.x – can request Custom) |

Create Plan

738

Plan Information    ⓘ Help

Plan Provider    * [ Select an option ▼ ]

Provider Location    *
☐ US East
☐ US West
☐ Asia Pacific

Plan Name    *
Description
255 characters allowed

[ Cancel ]    [ Save & Exit ]    [ Next ]

Create Service

? Help

Service Information

Service Provider  * [Select an option ▼]  — Provider: Pre-populate with provider info if user comes from the previous pop up flow Service Name Description  255 characters allowed Service Category  * [Select options ▼]
☒ Network
☐ Storage
☒ Monitoring
☐ Infrastructure Multi-select categories for a service

[Cancel] [Save & Exit]  [Next ↑]

CLOUD SERVICE BROKERAGE SERVICE STORE

FIELD OF THE DISCLOSURE

The disclosures made herein relate generally to cloud computing architectures and management methodologies and, more particularly, to selection and procurement of cloud services.

BACKGROUND

Cloud computing refers to the practice of using a network of remote servers hosted on a public network (e.g., the Internet) to deliver information computing services (i.e., cloud services) as opposed to doing so on a local server. The network architecture (e.g., virtualized information processing environment comprising hardware and software) through which these cloud services are provided to service consumers (i.e., a cloud service consumers) is referred to as "the cloud", which can be a public cloud (e.g., cloud services provided publicly to cloud service consumers) or a private cloud (e.g., a private network or data center that supplies cloud services to only a specified group of cloud service consumers within an enterprise), or a community cloud (e.g., a set of cloud services provided publicly to a limited set of cloud service consumers, e.g., to agencies with a specific State/Region or set of States/Regions), dedicated/hosted private cloud, or other emerging cloud service delivery models. The underlying intent of cloud computing is to provide easy, scalable access to computing resources and information technology (IT) services to cloud service consumers.

Cloud services can be broadly divided into four categories: Infrastructure-as-a-Service (IaaS), Platform-as-a-Service (PaaS), Software-as-a-Service (SaaS), and Managed Services. Infrastructure-as-a-Service refers to a virtualized computing infrastructure through which cloud services are provided (e.g., virtual server space, network connections, bandwidth, IP addresses, load balancers, etc). Platform-as-a-Service in the cloud refers to a set of software and product development tools hosted on the cloud for enabling developers (i.e., a type of cloud service consumer) to build applications and services using the cloud. Software-as-a-Service refers to applications that are hosted on and available on-demand by cloud service consumers via the cloud. Managed Services refers to services such as backup administration, remote system administration, application management, security services, etc. that are enabled by managed service providers for any cloud services.

In general, a cloud service has three distinct characteristics that differentiate it from a traditionally hosted service. The first one of these distinct characteristics is that it is sold to a services consumer on demand (e.g., by the minute or the hour). The second one of these distinct characteristics is that it is dynamic (e.g., a services consumer can have as much or as little of a service as they want at any given point in time). The third one of these distinct characteristics, which applies specifically to public clouds as opposed to private or hybrid clouds, is that the service is fully managed by a cloud services provider (e.g., the services consumer only needs a suitably equipped client device and network connection). This third functionality is particularly relevant to public clouds. However, private clouds can be managed by an internal IT department or through ITO (IT Outsourcing) contracts. In these examples, I&O (Infrastructure & Operations) administrators act as the cloud provider and, accordingly, this third functionality would be of similar relevance.

The cloud is rapidly being adopted by business and IT users as a way to make their organizations more effective and to save costs. Along with this opportunity comes a new set of pain points and significant risks to enterprises that must be addressed. For example, business users are rapidly investing in their own cloud capabilities (e.g., IaaS, PaaS, and SaaS) to meet business needs while application developers want to move rapidly without the involvement of IT to provision tools and environments. These actions are creating a significant threat to IT management whom are worried about considerations such as, for example, managing costs, chargeback, capacity and resources from the result of unrestrained/unplanned cloud expansion.

FIG. 1 shows an example of a traditional cloud management model 100 leading to business unit cloud service users 105 and IT organization cloud service users 108 (i.e., cloud service users) of a cloud service consumer 110 (e.g., a business, an institution, an individual or the like) directly implementing cloud services via cloud service providers 115 (e.g., IaaS, PaaS, SaaS, ERP, and MS available on one or more outside networks) without oversight and/or involvement of a centralized resource (e.g., IT management). ERP refers to enterprise resource planning and MS refers to Managed Services such as security, backup, monitoring and governance services offered by cloud service providers or a CSB platform provider (i.e., the entity that manages and administers the CSB platform). Examples of the cloud service categories include, but are not limited to, enterprises resource planning services, Infrastructure as-a-Service (IaaS), Platform-as-a-Service (PaaS), Software-as-a-Service (SaaS), and managed services.

There are numerous challenges and limitations in regard to implementing and managing cloud services that arise from the traditional cloud management model 100 discussed above in reference to FIG. 1. Examples of these challenges and limitations include, but are not limited to, different portions (e.g., user, entities, departments, etc) of a given cloud service consumer individually buying cloud services; different portions of a given cloud service consumer purchasing cloud services at different price points from the same cloud services provider; actions of different portions of a given cloud service consumer creating gaps in current business entity processes; disparate billing, payment, contract and settlement process for cloud services of a given cloud service consumer being created; IT interests of a given cloud service consumer being required to undertake actions such that it mimic a cloud service provider; existence of inconsistent service management and service-level-agreement (SLA) compliance across cloud service providers; and loss of effectiveness in implementing and managing cloud services due to broken processes across business, IT demand and supply organizations.

Accordingly, underlying problems that exists in cloud computing is that the need for intermediaries to aggregate, integrate or customize cloud services and that this need grows significantly as the number of cloud services and the rate of consumer adoption grows. Without such intermediaries being able to effectively and efficiently manage cloud services, cloud service consumers must manage numerous transactions (e.g., payments, governance, data movement, customization and enrichment) associated with their cloud service providers and cloud services. This can rapidly become a task that is difficult, time-consuming and expensive, especially when they are consuming numerous cloud services from independent providers. Furthermore, traditional approaches for managing cloud services leads to the adverse situation of vendor "lock-in" in which cloud service consumers are undesirably tied to a particular vendor or set of vendors for all or a portion of their cloud services. Therefore, a platform that enables cloud service consumers to manage these numerous transactions associated with their cloud service providers and cloud services in an effective and efficient manner, which includes implementing a cloud services catalog, would be beneficial, desirable and useful.

SUMMARY OF THE DISCLOSURE

Embodiments of the present invention relate to methodologies and systems for enhancing cloud services through use of a cloud services brokerage (CSB) platform. The CSB platform enables a centralized resource within a cloud service consumer (e.g., personnel within an IT department of a business) to implement and manage all aspects of transactions associated with their cloud service providers and cloud services (e.g., payments, governance, data movement, customization, enrichment, etc) in an effective and efficient manner. In doing so, the CSB platform provides the centralized resource within the cloud service consumer to assume exclusive command and control for managing its cloud services. In the context of a CSB platform, a CSB is a third party company, or Enterprise IT Cloud Administration Organization, that adds value to cloud services on behalf of cloud service consumers. The goal of a CSB is to make the service more specific to a company, or to integrate or aggregate services, to enhance their security, to establish and manage contract based pricing, or to do anything that adds a significant layer of value (i.e. capabilities) to the original cloud services being offered.

A CSB platform configured in accordance with an embodiment of the present invention offer numerous benefits over traditional cloud management models such as the traditional cloud management model 100 discussed above in reference to FIG. 1. One benefit that the CSB platform provides is a unique, new approach to providing operations modeling and planning intelligence for enabling cloud service consumers to efficiently and effectively operate in current and future cloud computing environments such as to manage business demand and IT supply processes and relationships. For example, the CSB platform serves as a governance center driven by business, supported by enterprise IT and cloud providers. Another benefit that the CSB platform provides is that it serves as aggregation point for cloud resources, cost and SLA management to design, deploy, manage and govern cloud service solutions. Still another benefit that the CSB platform provides is that it provides a common financial model for IaaS, PaaS, and/or SaaS functionalities across various cloud configurations such as, for examples, public clouds, private clouds, and/or hybrid clouds. In a private cloud, the cloud infrastructure is self-owned such as being operated solely by an organization. However, it can be managed by the organization itself or a third-party provider and can exist on or off the organization's premise. In a public cloud, the cloud infrastructure is made available to the general public or a large industry group and is vendor-owned. A hybrid cloud is a combination of both private and public clouds, are organized so that a portion of the infrastructure is deployed in a private cloud and the rest is exposed on the public cloud.

Still another benefit that the CSB platform provides is providing choice and cost comparisons for determining whether to take a service to the public cloud or keep it internal based on risk/value profile. Still another benefit is that the CSB platform enables a rapidly changing IT service supply chain of cloud services through on-boarding of new cloud services and off-boarding retired cloud services in such a way as to minimize the disruption to end customers, while enabling them to leverage the benefits of new and better value cloud services.

In view of the disclosure presented herein, a skilled person will appreciate that a CSB platform configured in accordance with an embodiment of the present invention is a portal arrangement that enables easy-to-use broker capabilities for cloud services, supporting multiple customers and integrating several different providers, allowing a cloud services consumer (i.e., including its cloud services users) to design, order, provision and control cloud services from a single portal. A cloud services consumer can use a CSB platform configured in accordance with an embodiment of the present invention to provision virtual data centers (VDCs), then find and order services through a single unified web 2.0 interface; to directly access and manage provisioned resources and deploy applications; to track changes through a workflow for technical, legal and financial approvals; govern finances and capacity planning, both for current resources and future growth; and to view multiple command and control tracking dashboards and download them as PDF or Excel files.

With regard to designing cloud solutions, a CSB platform configured in accordance with an embodiment of the present invention allows a cloud service consumer to compare and highlight key differences and features of multiple provider offerings, such as security, service level agreements and cost, to determine the best-fit for their needs; to design the deployment architecture of cloud resources to run their application(s) using a "single pane of glass" view; to use a resource solution center of the CSB platform as a one-stop shop for all of its virtual resource services needs; and to add infrastructure services such as shared storage and backup services; network services such as VPN, and managed services such as back-up administration and security management.

A CSB platform configured in accordance with an embodiment of the present invention provides a cloud service consumer with a simple, comprehensive means for ordering cloud services. To this end, such a CSB platform allows a cloud service consumer to view a comprehensive bill of materials for every application and virtual data center design, generated automatically across multiple providers chosen from an extensive catalog of services; to review the terms and conditions for every designed solution in a single simplified view; and to submit and place consolidated orders for your solution directly from a single interface. Monitor the technical, financial, and legal approvals using a workflow.

With regard to provisioning cloud solutions, a CSB platform configured in accordance with an embodiment of the present invention allows a cloud service consumer to provision multiple VDC change orders at once, with all provisioning tasks identified as a single set and automatically provisioned together; to automatically manage virtual resources and service provisioning using an intelligent asynchronous provisioning engine; and, once provisioned, to view the access and management details at any time.

With regard to controlling cloud solutions, a CSB platform configured in accordance with an embodiment of the present invention allows a cloud service consumer to manage bills across multiple cloud service providers with one automatically consolidated monthly bill; to monitor and control cost and capacity trends, aggregate and correlate every bill item cost to resources and capacity, and view dashboards of aggregate spend across applications and VDCs; and to view monitoring dashboards to compare utilization of resources versus cost, and see if you are over or under capacity or cost for any of your applications across environments and layers.

A CSB platform configured in accordance with an embodiment of the present invention provides a cloud service consumer with an intuitive user interface. To this end, such a CSB platform provides a cloud service consumer with a central web/Internet based portal enabled to implementing broker capabilities for cloud services (e.g., cloud infrastructure services). As a skilled person will appreciate from the disclosures presented herein, a CSB platform portal configured in accordance with embodiments of the present invention offers wizard-based tools for screening applications for cloud deployment, identifying target cloud infrastructures, estimating capacity required on the cloud, comparing provider prices side-by-side, creating a migration roadmap, and finally evaluating the ROI of cloud migration; single view for designing application architectures in the cloud, assigning portions of the architecture to different cloud providers, automatically provisioning the entire architecture simultaneously, and cost estimation; dashboards for consolidated billing, utilization monitoring, and security monitoring; and command and control screens for provisioning authorization, workflow orchestration, and provider compliance evaluation.

The CSB platform can support many cloud service consumers and connects many cloud service providers with a catalog and services-integration framework. Cloud service consumers can use the CSB platform to find, order, and manage services through a single unified Web 2.0 interface and enables ordering and provisioning of virtual resources. The CSB platform enables resource change management, and ongoing financial governance of charges from providers across many applications and virtual data centers.

In one embodiment, a cloud service brokerage system comprises an electronic cloud service catalog and a cloud service store coupled to the electronic cloud service catalog. The electronic cloud service catalog contains cloud service defining information for each one a plurality of cloud services. The cloud service store includes cloud service publications each representing cloud service functionality corresponding to one or more of the cloud services. The cloud service store includes a user interface structure enabling generation of cloud service orders.

In another embodiment, a computer-implemented method for ordering cloud services comprise plurality of operations. An operation of populating an electronic data repository with cloud service defining information for each one of a plurality of cloud services is performed. Each of the cloud services is provided by a respective one of a plurality of different cloud service providers. An operation of receiving one or more publication specifications each designating one or more cloud services maintained in the electronic data repository is performed. An operation of creating cloud service publications from the one or more publication specifications is performed. Each one of the cloud service publications is associated with one or more of the cloud services in the electronic data repository. An operation of enabling cloud service consumers to create cloud service orders through selection of one or more of the cloud service publications is performed.

In another embodiment, a non-transitory computer-readable storage medium having tangibly embodied thereon and accessible therefrom instructions interpretable by at least one data processing device. The instructions are configured for causing the at least one data processing device to perform a method comprising a plurality of operations. An operation of populating an electronic data repository with cloud service defining information for each one of a plurality of cloud services is performed. Each of the cloud services is provided by a respective one of a plurality of different cloud service providers. An operation of receiving one or more publication specifications each designating one or more cloud services maintained in the electronic data repository is performed. An operation of creating cloud service publications from the one or more publication specifications is performed. Each one of the cloud service publications is associated with one or more of the cloud services in the electronic data repository. An operation of enabling cloud service consumers to create cloud service orders through selection of one or more of the cloud service publications is performed.

These and other objects, embodiments, advantages and/or distinctions of the present invention will become readily apparent upon further review of the following specification, associated drawings and appended claims.

BRIEF DESCRIPTION OF THE DRAWINGS

FIG. 9 is an illustrative view of a cloud services provider comparison screen of a CSB platform (e.g., a portal thereof) configured in accordance with an embodiment of the present invention.

Figure 20:
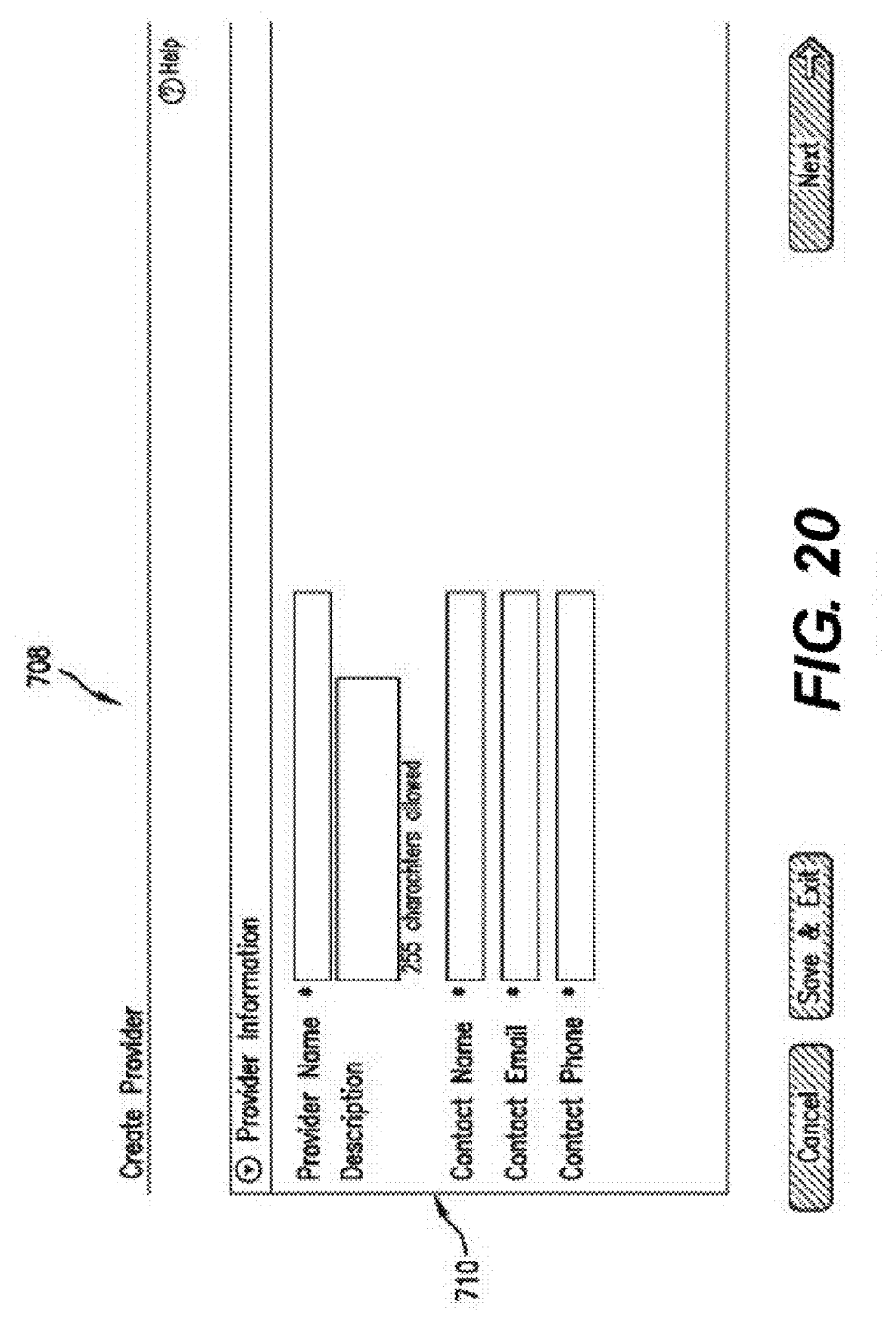

FIG. 20 is an illustrative view showing a provider information pop-up screen of the catalog management section shown in FIG. 19.

Figure 21:
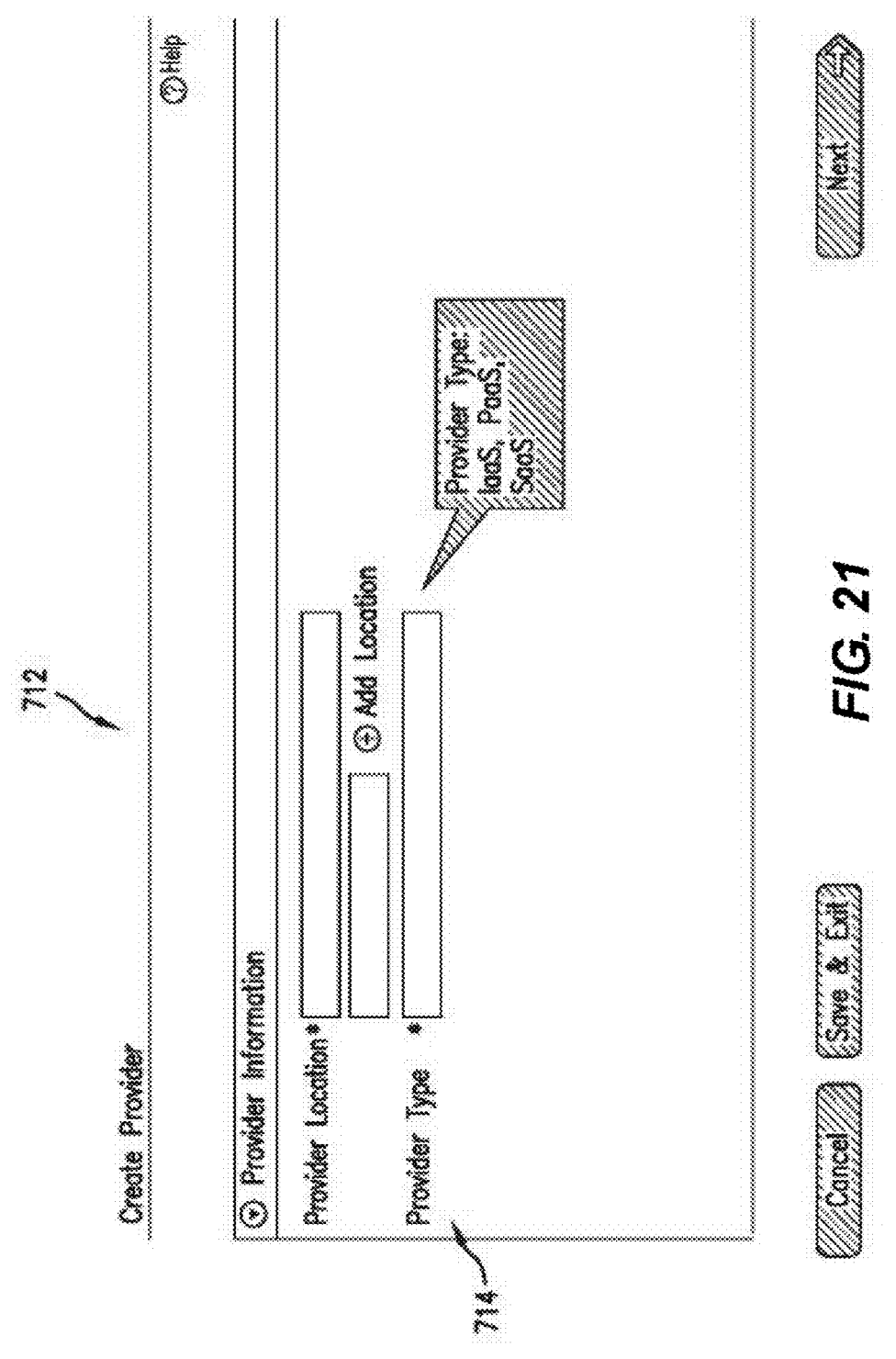

FIG. 21 is an illustrative view showing a provider properties pop-up screen of the catalog management section shown in FIG. 19.

FIG. 24 is an illustrative view showing a provider plan information pop-up screen of the catalog management section in FIG. 19.

FIG. 28 is an illustrative view showing a service information pop-up screen of the catalog management section in FIG. 19.

DETAILED DESCRIPTION

CSB Platform Architecture

Figure 1:
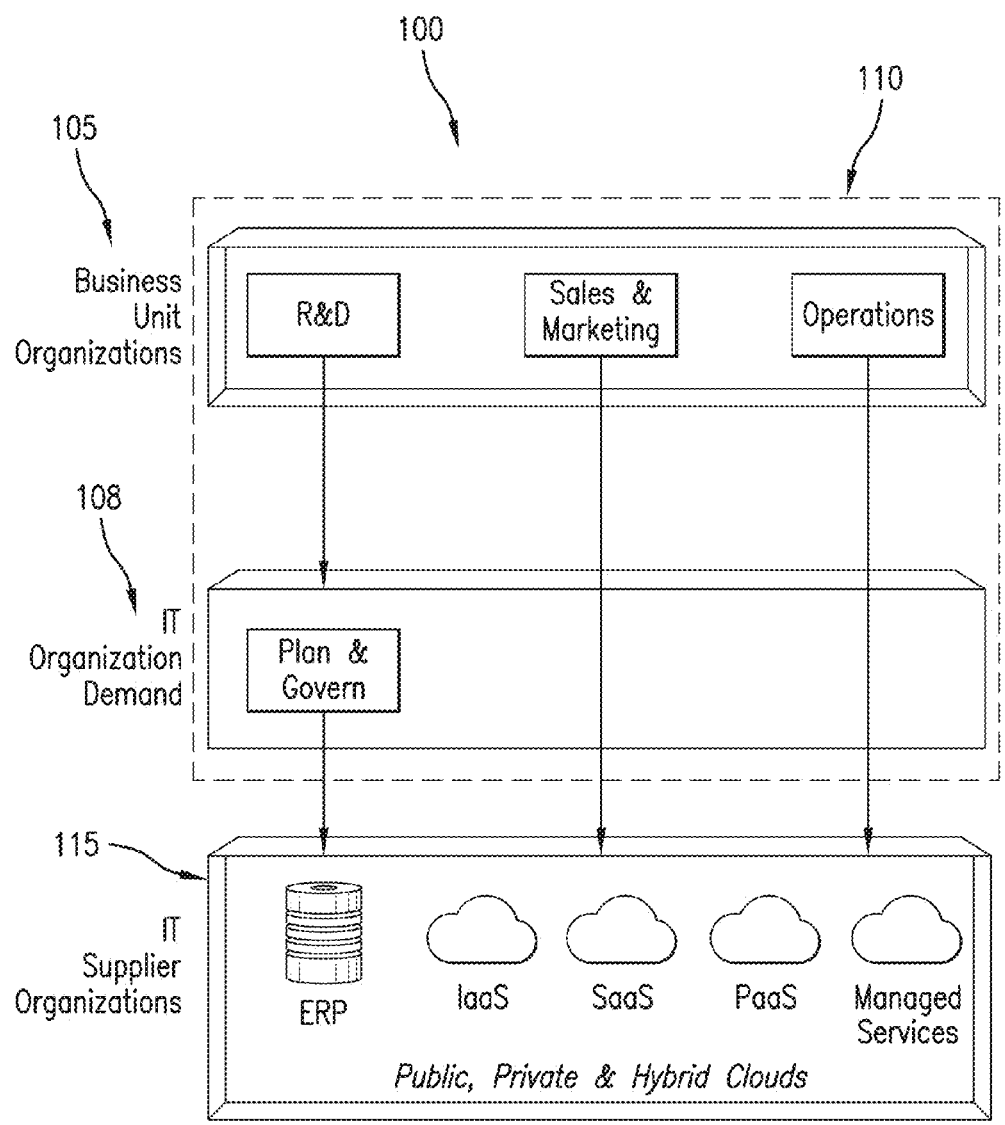
FIG. 1 is an illustrative view showing an example of a traditional cloud management model leading to cloud service users of a cloud service consumer directly implementing cloud services via cloud service providers.
Figure 2A:
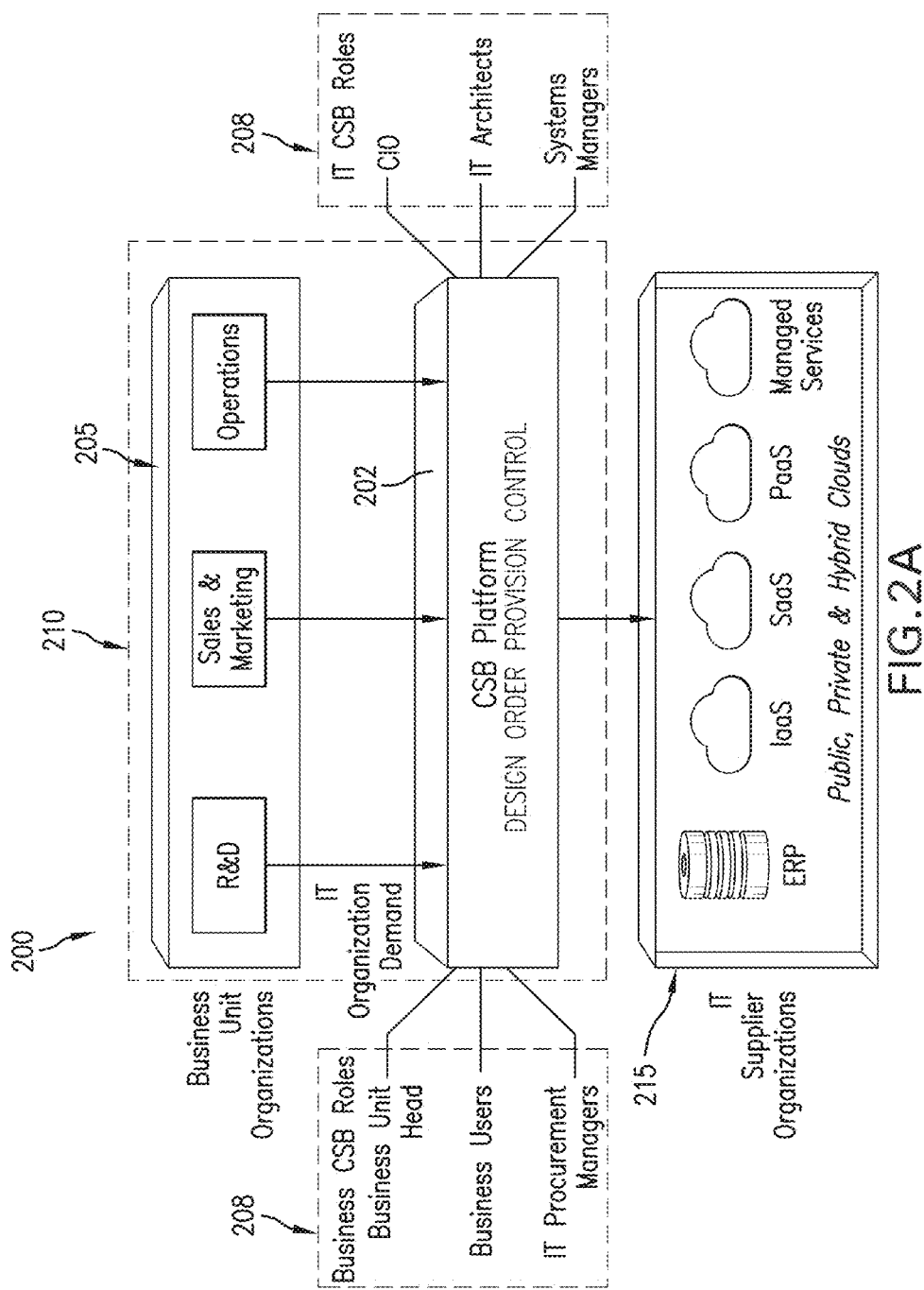
FIG. 2A is an illustrative view showing an example of a cloud management model configured in accordance with an embodiment of the present invention.
Figure 2B:
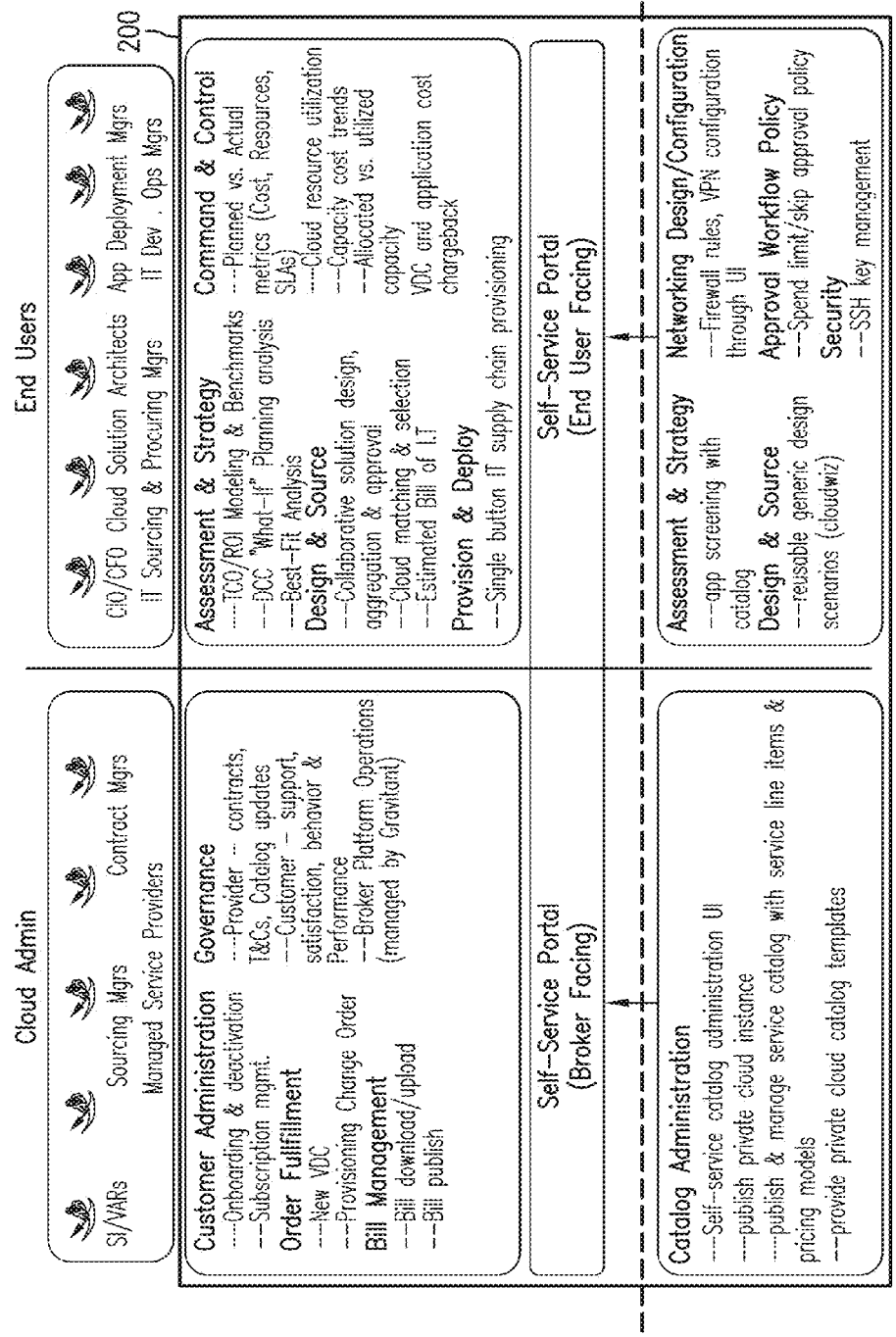
FIG. 2B is diagrammatic view showing a detailed implementation of the cloud management model of FIG. 2 as viewed from Cloud Administrator and End User perspectives.

Referring to FIGS. 2A and 2B, various aspects of a cloud management model 200 configured in accordance with an embodiment of the present invention are shown. Advantageously, the cloud management model 200 implements a CSB platform 202 through which business unit cloud service users 205 and CSB role cloud service users 208 (i.e., cloud service users) of a cloud service consumer 210 access cloud services via cloud service providers 215 (e.g., providing services via one or more outside networks with respect to the CSB platform 202). The CSB platform 202 enables cloud service users of the cloud service consumer 210 to enhance the manner in which it implements cloud consumption across public, private and hybrid clouds. For example, the CSB platform 202 enables cloud service users of the cloud service consumer 210 serving in an IT capacity (e.g., IT architects, system managers, information executives and the like) to limit the complexities and risks of implementing cloud services across multiple providers, allowing for increased agility, standardization of a cloud consumption model, formalization of accounting processes and implementation of compliance and governance.

The CSB platform 202 can be implemented in a variety of manners. In a first implementation, the CSB platform 202 is implemented in a manner where it enables an entity to be a trusted cloud service provider for its own customer base (i.e., its own cloud service consumers), to set up and manage secure virtual data centers with multiple cloud providers, and to add third party services such as security, monitoring and backup to build a more complete solution. In this first implementation, the CSB platform 202 serves as a single interface through which this users in customers with a single interface through which the cloud service consumers can design, order, provision, and manage not just cloud services but also traditional IT services have been provided to them in the past. In a second implementation, the CSB platform 202 is implemented in a manner where it enables an IT organization to maintain complete cost and SLA visibility and governance, while providing its users with a single interface through which they can design, order, provision, and control infrastructure and platform services from a myriad of public, private, hybrid and colocation providers.

The CSB platform 202 has a plurality of associated entities that directly or indirectly interact with it. Though the roles and responsibilities can vary for in certain implementations based on the needs of the specific brokerage, following is a summary of such entities. Broker refers to an entity that owns a cloud service brokerage. The Broker is responsible for contractual oversight of the brokerage, governance, and communication to agencies & consumers to facilitate and increase adoption. The Broker may take on additional roles that can be delegated to the Broker Operator. These additional roles are billing intermediary between broker operator and consumer agency and payment handling. Broker Operator refers to an entity that runs the business operations of the brokerage (e.g., billing management & invoicing, Provider agreements, SLAs and relationship management, pricing management, customer on-boarding including customer agreements, etc.) and technical services (e.g., federated help desk, new provider on-boarding, cloud architecture and design services, additional integrations and customizations, migration services, application management services, other managed services). Some of these roles may be a separate entity such as a System Integrator. For example, if the Broker chooses to manage the business operations and act as the Broker Operator, the Broker may choose to have a System Integrator or vendor perform the technical services. Brokerage Platform Operator refers to the entity that maintains and provides access to the CSB platform. Its responsibilities can include deployment, ongoing upgrades and release management, technical operations, level 3 support for the brokerage portal, etc. Cloud Service Provider refers to the entity that provides the requested cloud services, technical support for published APIs, monthly metering and billing, meet SLAs and provider terms, Level 3 support for provisioned resources, participate in critical problem triage and resolution processes, solution design review and approve (optional), etc. Cloud service consumer refers to an entity that is a register user on a portal of the platform. The Cloud Service Consumer manages users and access control through role assignments, sets spending limits and purchase orders, undertakes cloud architecture and solution design, accesses and uses provisioned resources, receives monthly bills, reviews bills and details through portal, pays bills, monitors performance using the performance dashboards/analytics for cost, capacity and utilization, etc.

Figure 3A:
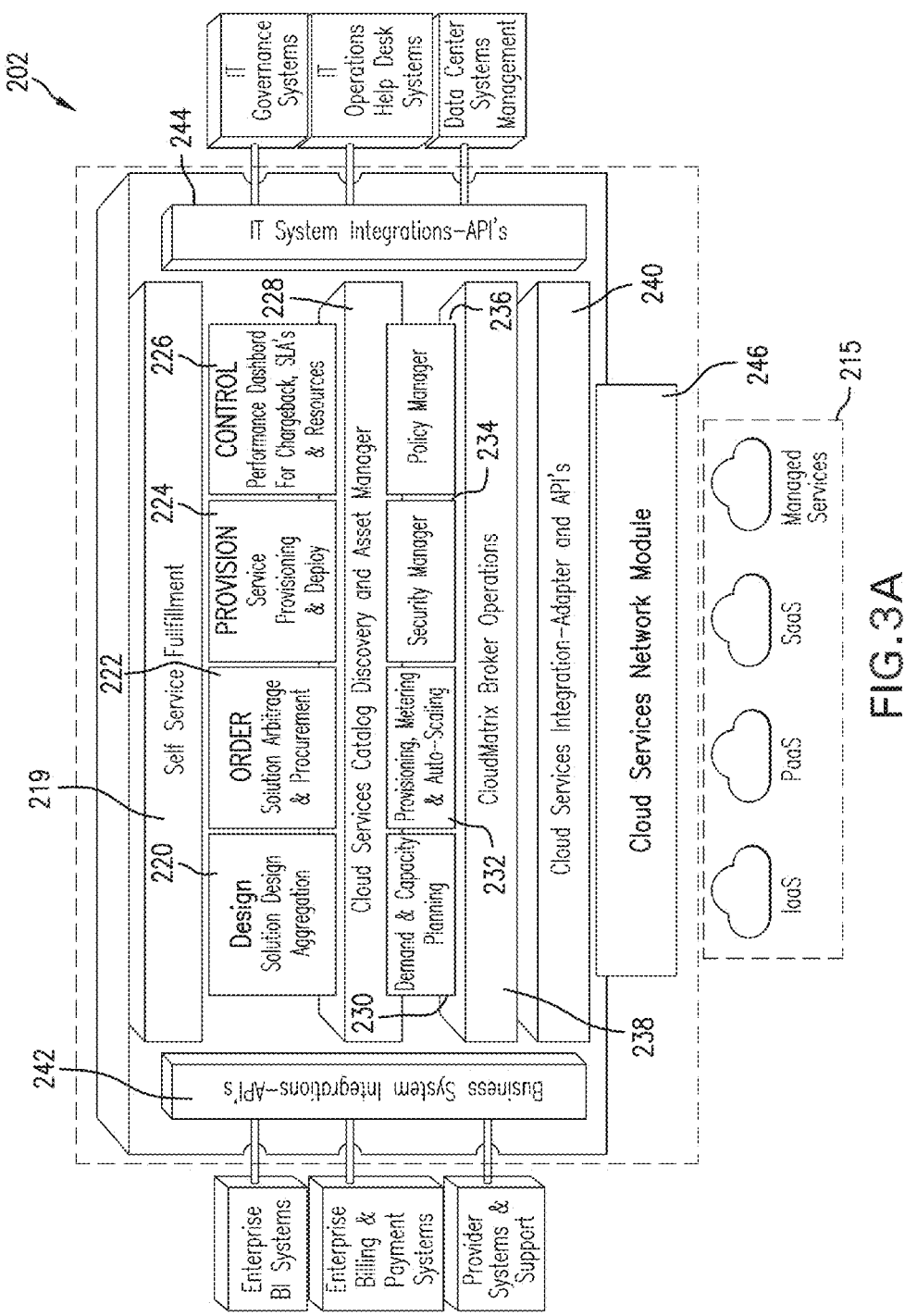
FIG. 3A is a functionality module view of a CSB platform configured in accordance with an embodiment of the present invention.

FIG. 3A shows a functionality module view of the CSB platform 202 (i.e., a CSB platform configured in accordance with an embodiment of the present invention). The CSB platform 202 serves as a cloud services brokerage and management platform that integrates multiple cloud provider services (e.g., internal or external) into a CSB platform portal through which cloud service consumers (e.g., business enterprises) can manage (e.g., optimize) the design, provisioning, ordering and control (i.e., consumption) of cloud services. One example of such a CSB platform portal is provided by Gravitant Inc. at the URL mygravitant.com. Cloud service consumers can deploy core services and features enabled by the CSB platform 202, which are described below in greater detail, through a single user interface of a cloud user accessible portal. These core services and features can be deployed independently or as an integrated suite of cloud services based on specific cloud service needs of a particular cloud service consumer. Advantageously, the CSB platform 202 is technology agnostic and will work and leverage current cloud platforms and business systems deployed of a cloud service consumer.

Advantageously, the CSB platform 202 offers numerous capabilities for allowing a cloud service consumer 210 to enable its cloud service users to implement (e.g., design, order, provision and control) cloud services across public, private and hybrid clouds. Examples of these capabilities include, but are not limited to enabling internal business and IT units to offer their cloud service users a single interface to design, order, provision and control virtual data centers (VDC) in public, private and hybrid infrastructure services; setting up a central environment for carrying out sourcing, procurement, fulfillment and billing processes and contracts with preferred public and private cloud providers; and tracking usage, chargeback, Quality of Service (QoS), SLA's and performance of internal and external cloud infrastructure service providers. Furthermore, the CSB platform 202 enables integration with current IT infrastructure and automation of investments made by a cloud service consumer. Still further, the CSB platform 202 includes a multi-cloud services catalog with services from available public cloud providers (e.g., Amazon, GoGrid, Terremark and Savvis). Accordingly, a cloud service consumer can use a private cloud catalog and service package template to quickly operationalize an enterprise CSB solution. Examples of template content, which are discussed below in greater detail, include service options relating to design and aggregation (i.e., cloud service designing); cloud service sourcing, arbitrage and procurement (i.e., cloud service ordering); service/user provisioning and deployment (i.e., cloud service provisioning); performance dashboards for chargeback, SLA's and resources (i.e., cloud service control); cloud services catalog and asset manager; cloud demand and capacity planning; provisioning, metering and auto-scaling; security management; policy management; broker operations management; cloud services integrations (e.g., adapters & APIs); business systems integrations (e.g., APIs); IT systems integrations (e.g., APIs); and cloud services networking.

In regard to the multi-cloud services catalog (i.e., the catalog), it is highly customizable. Self-service administrative capabilities (e.g., via the self-service fulfillment module 219) are available for the broker to perform actions such as, for example, setting up new cloud services, modifying existing cloud services, customizing the cloud service parameters, updating pricing, reclassifying services, and adding or removing providers. Broadly speaking, the catalog supports an abstraction of marketplace services and categorizations that then maps to provider specific catalog line items. In this regard, a cloud services catalog provides a service abstraction that can map to one or more provider services/line items. For example, a VM service on Savvis maps to vCPU, memory and local storage services with OS templates. For Terremark, Savvis, Amazon, Amazon GovCloud, the aggregated VM services are pre-defined and published in the catalog. Additionally, attributes that are specific to cloud service consumers such as, for example, pricing rules, security and access constraints can be defined in the same catalog. This allows for a high degree of function and flexibility. For example, a consumer level service may be a packaged VM, which may translate into multiple provider catalog line items thereby significantly reducing complexity of the cloud for the consumer. This also simplifies maintenance as well as enables comparison of cloud services and plans from different providers. Accordingly, it will be appreciated that the CSB platform 202 can be configured with an integrated catalog and solution configurator that provides a unique capability to access services from providers that are required to enable a cloud service consumer solution. This integrated catalog and solution configurator provides transparency of provider capabilities and enables the customer to make the right choices from a technology, operational and management perspective.

The catalog has predefined metadata for service providers and services such as capacity limits, and allowed capacity configurations for CPU, memory, local storage, NAS storage etc. for different providers. These constraints are then applied at the time of solution design and Architecture. The total capacity being procured is also displayed to the user while the solution is being iteratively designed. If the predefined capacity limits are exceeded, warning and error messages can be displayed to the user as appropriate. With the ability for the cloud provider to have predefined capacity configurations such as specific vCPU sizes, specific RAM sizes, and storage blocks, it makes the catalog more end-users friendly and self-service. Through use of a catalog administration capability, an operator of the CSB platform 202 can update the metadata of the catalog to change the limits and predefined capacity configurations. For the cloud service providers already integrated into the CSB platform, these capacity configurations have already been defined as part of the content that is available as pre-configured selections.

Figure 3B:
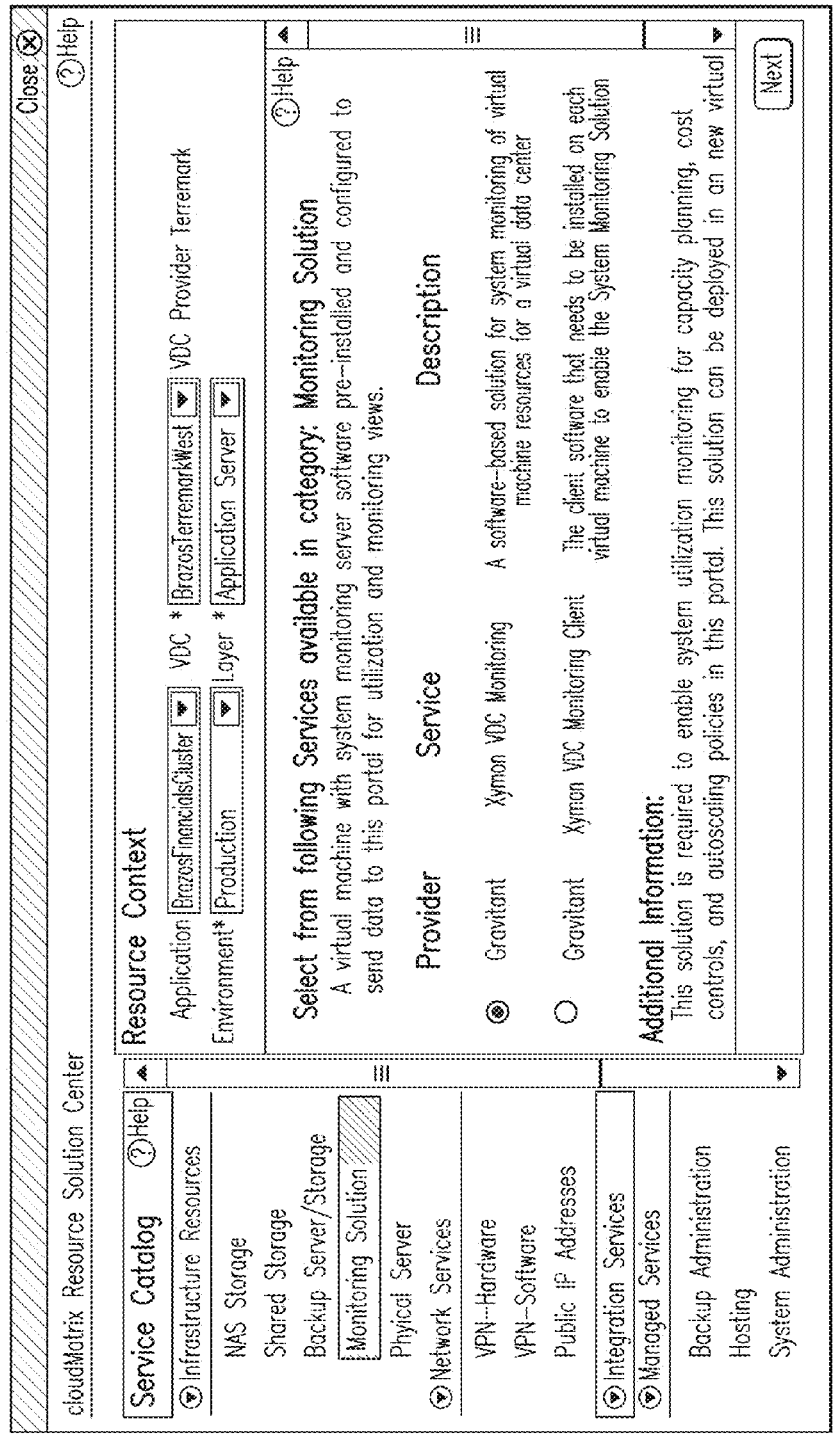
FIG. 3B is an illustrative view showing a resource solution center configured in accordance with an embodiment of the present invention.

FIG. 3B shows a resource solution center 221. The resource solution center 221 serves as a single point (e.g., one-stop) source for all of virtual resource service needs of a user of the CSB platform 202, in FIG. 3A. The resource solution center 221 correlates service catalog line items to an available cloud service selection (i.e., a resource context). Through the resource solution center 221, a user can identify and add infrastructure services such as, for example, shared storage and backup services; network services such as VPN; and managed services such as back-up administration and security management. Examples of infrastructure services include, but are not limited to shared storage (e.g., a cloud-based storage service for backup server software and shared backup storage) and a monitoring solution (e.g., a VM with system monitoring server software pre-installed and configured to send data to this portal for utilization and monitoring views). Examples of network services include, but are not limited to, VPN hardware (e.g., a hardware-based Virtual Private Network (VPN) solution that enables a Site to Site VPN managed by the VDC provider) and VPN software (e.g., software-based VPN solutions that allow for a lower cost secure VPN gateway and can enable Client to Site and Client to Site VPN). Examples of managed services include, but are not limited to, backup administration (e.g., services offered by IT operations service providers to configure backups, maintain backup schedules, monitor and verify backups, and restore backups as needed); system administration (e.g., services offered by IT operations service providers to setup, configure, and support cloud environments, including systems, virtual machines, storage, and networks); and security management (e.g., services offered by IT operations service providers to setup operational security policies, manage virtual private networks, and manage ongoing security, including audits and compliance).

Referring to FIG. 3A, a design module 220 of the CSB platform 202 enables (e.g., via a CSB platform access portal interface (i.e., part of the self-service fulfillment module 219) of the CSB platform 202) comprehensive cloud planning services (i.e., solution design and aggregation functionality). Cloud adoption scenarios can be simulated using prediction analytics for business applications and infrastructure resource needs. Demand, capacity, cost (TCO) and ROI baselines can be forecasted and established for each cloud solution and the internal and/or external cloud service platforms being used. Scenario dashboards can be saved and published and used to provide access to business organizations, IT resources, vendors and the like to align all parties on goals and implementation activities. Examples of information generated and tasks implemented using the design module 220 include, but are not limited to, visual architecture management; solution design and aggregation; application definition and management; and solution scenario design. Accordingly, a skilled person will appreciate that benefits of the design module 220 include, but are not limited to, accurately simulating and predicting cloud capacity and cost for a given application demand profile; clearly understanding cloud capacity needs and cost for each cloud provider before making investment decisions; running cloud consumption scenarios to understand cost, capacity and demand trade-offs/risks; accurately setting IT budgets for cloud computing projects; comparing cloud capacity, costs and SLAs across cloud provider offerings and platforms; clearly establishing and track ROI and TCO metrics for each cloud solution and project; and controlling and managing IT assets in the cloud and reduce cloud/virtual machines (VM) and subscription sprawl.

A virtual machine (VM) refers to a virtual computer that uses the resources of one or more real computers, but which is functionally indistinguishable from a physical computer running the same software from an end user's perspective. For example, in case in which there is a need to set up a new mail server, instead of buying a server (which may only actively process email 1% of the time), installing and configuring the mail server, configuring and maintaining networking for the server, and paying for the electricity and maintenance for the server, a cloud service consumer can pay a cloud service provider to set up a virtualized mail server. This server would run all the same software as the physical server, but would live in a VM that sits atop one or more physical servers which have (at a minimum) the same capabilities (CPU, memory, storage) as the local physical server necessary to run the same software. In turn, this same hardware used by the cloud service provider may support multiple other VMs, none of which use all the hardware system's resources. The cloud service users of the cloud service consumer would send and receive mail from this VM server exactly the same way they would if the server was physically located on premises of the cloud service consumer. In contrast, a virtual data centers (VDC) is similar to physical data centers. A VDC allows dynamic creation of virtual resources atop a physical infrastructure, including CPU, memory, storage, and network capacity. A VDC can be thought of as a container for a VM or as a server rack. Just as a server rack itself does not run any applications, a VDC does not itself run any applications; each is provisioned with servers (e.g., VMs) that run applications. VDC resources can be created on-demand and managed as a pool of virtual resources and controlled through an online user interface. Instead of ordering specific line items from a catalog, VDC is designed with capacity and/or virtual resources and then the system automatically generates an order for the provider to fulfill that VDC design. A VDC can be deployed on internal physical/virtual environments or in public clouds. A VDC can comprise of VMs, storage, one or more networks (subnets), VPNs, Firewalls, load balancers, and any other infrastructure as a service.

Still referring to FIG. 3A, the above-mentioned solution design and aggregation functionality implemented via the design module 220 often entails conducting an "apples-to-apples" comparison of cloud services from a variety of cloud service providers. However, quite often, each cloud service provider has a different style of presenting cloud services and resources to the end-consumer. At a high level, even their business models vary in the sense that certain providers employ reserved capacity vs. on-demand capacity methods of enabling a consumer to procure cloud resources. The CSB platform 202 is configured with a plurality of methods to perform such comparisons.

One method for performing such comparisons is through use of a cloud services planning wizard. An underlying component of the cloud services planning wizard is a metric parameter referred to as a Capacity Unit (CU), which is central to enabling precise cloud service comparative capabilities for measuring, comparing, metering and enforcing quality, performance and cost standards across cloud vendors for different cloud services. The CU is a generic unit of IT capacity that is a function of multiple factors such as, for example, processor speed, random access memory, storage, and bandwidth. In one specific implementation, 1 CU=the capacity to compute at a speed of 2.4 GHz with random access memory of 4 GB and local storage of 100 GB through 1 Mbps of bandwidth. It should be noted that the CU value scales differently with respect to each factor and its value intends to represent the effective realization of the individual capacity components.

By employing the cloud services wizard (which can include an application screener) to assess information derived from a knowledge base of information based on experience and best practices and to calculate CUs for various cloud service providers, the CSB platform user is guided towards an apples-to-apples comparison that results in the closest matched cloud services and cloud service providers. In at least one implementation, the cloud services wizard takes into account dimensions such as, for example, virtual machine dimensions (e.g., memory, CPU/vCPU, local storage, etc); network dimensions (bandwidth desired, virtual LAN, guaranteed throughput, pricing models, load balancers, public vs. private networks, etc); storage dimensions (e.g., defining different architectures, ability to snapshot storage, back up strategies for storage as well as offering shared storage, etc); security dimensions (e.g., firewalling technologies, intrusion detection/prevention technologies, etc); service level agreements (e.g., availability monitoring and service crediting); operating systems supported (e.g., employing templates with licenses, 32/64 bit operating systems, support for blank servers, virtual machines registered and compliant with certain operating systems, etc); provisioning times (e.g., for virtual machines, for provisioning the first virtual data center vs. subsequent virtual data centers, etc); support for virtual resources (e.g., varying from free, forum based support to full helpdesk support that is included for no additional fees); designation of location of virtual resources (e.g., geographic designation and specific locales based on CSP data center availability); and virtual resource pricing structure (e.g., varying by sizing of packages vs. individual resources that may vary by pricing model for reserved capacity vs. on-demand capacity).

Another method for performing such comparisons is through use of a service offerings comparator. By using a normalized scheme of small, medium and large cloud service packages (or other custom packages) of well-defined capacity including compute, storage and memory with normalized utilizations and allocation models, the CSB platform provides a quick pricing comparison for these multiple packages across cloud services and providers.

Still referring to FIG. 3A, the CSB platform 202 supports two models for creating and accessing accounts on the cloud service providers that it manages—Broker managed provider accounts and Customer managed provider accounts. The brokerage can be configured to support both models or either the Customer managed model or Broker managed model. In the broker managed provider accounts model, for example, a broker operations team creates accounts for each cloud provider and inputs the credentials to the portal based on customer (e.g., user) requests. Alternately, a broker can also have reseller relationships with the providers to have predefined accounts which can be set up in the system, and when a customer orders services, the broker simply assigns one of the predefined accounts to this customer. In the customer managed provider accounts model, for example, the customer may already have provider accounts or would prefer to directly create and manage the provider accounts. The customer sets up the account in CSB platform portal and provides the provisioning credentials, and billing credentials, if any. The brokerage portal can then perform all the functions such as catalog, solution design, order approval workflows, screening, provisioning, billing load by customer, cost allocation, dashboards, etc.

An order module 222 of the CSB platform 202 enables (e.g., via the CSB platform access portal) broker services enabling business and IT users the ability to engage with cloud service providers for building business and technology relationships (i.e., sourcing, arbitrage and procurement functionality). It offers a central point for a cloud service consumer to quickly aggregate cloud solutions, procure and pay for them by combining cloud services from different providers to meet business needs, cost constraints and innovation requirements. Examples of information generated and tasks implemented using the order module 222 include, but are not limited to, bill of materials estimates, advanced pricing rules, service offering comparators, provider account management, and procurement process flow. Accordingly, a skilled person will appreciate that benefits of the order module 222 include, but are not limited to, quickly setting up enterprise procurement portal(s) and streamlining cloud acquisition processes across business and IT organizations; meeting new business demand or scalability by having access to multiple cloud providers; ready access to cloud services from internal and external providers with integrated provisioning and procurement processes; being aligned with cloud market changes including product, pricing, packaging, and SLA changes from vendors; reducing cloud costs by comparing cloud service combinations for any given solution; performing real-time spend analysis across providers; optimizing as provisioning and de-provisioning systems are integrated with billing and order management; and reducing time and cost in billing, metering and payment management though a centralized bill and payment capability.

A provision module 224 of the CSB platform 202 enables (e.g., via the CSB platform access portal) cloud management services for users through a single view of cloud services resources from internal or external providers (i.e., service/user provisioning and deployment functionality). A cloud service consumer (e.g., an enterprise IT department) can use the provision module 224 to design application architectures and setup virtual data centers across multiple internal and external providers and manage it from one central location. Furthermore, cloud service consumers can create environments (e.g., Dev, Test, Production and DR) for a business application from different providers and manage them. Examples of information generated and tasks implemented using the provision module 224 include, but are not limited to, automated provisioning and deployment of IaaS and PaaS resource groups/clusters; workflow-based provisioning; auto-scaling service for one or more cloud service providers; and deployment workflow automation. Accordingly, a skilled person will appreciate that benefits of the provision module 222 include, but are not limited to, no vendor or technology lock in, rapid setup of virtual data centers and real time provisioning of IaaS, PaaS, SaaS, Managed Services and other cloud resources across multiple cloud providers, reduced cloud infrastructure costs by continuously optimizing utilization, enhanced resource availability for business applications to meet scalability and performance, enhanced cloud resource allocation to business application and business units, enabling customized cloud data center solutions by adding third party support services, and leveraging current investments in monitoring and management tools sets.

A control module 226 of the CSB platform 202 enables (e.g., via the CSB platform access portal) command and control services that are critical to successful adoption and acceptance of the cloud services model (i.e., dashboard functionality for chargeback, SLAs and resources). A cloud service consumer can gain visibility into current performance, cost and utilization of cloud services and compare against planning benchmarks/milestones to automatically initiate corrective action to continuously optimize cost, resources and SLAs to meet business demand and changes. Furthermore, a cloud service consumer can automatically track, define, establish, and report chargeback against business applications, business units, IT budget codes and/or shared resource categories. The provision module 224 includes a plurality of pre-configured dashboard views for chargeback, SLA's and resources. Examples of the pre-configured dashboard views include, but are not limited to, cloud analysis by virtual data center (VDC), application, customer, and business units/departments; capacity cost trends (e.g., compute, memory, network, managed services analysis of capacity vs. cost and trends over time); cost analysis (e.g., by resource type, environment and layer); capacity summary (e.g., allocated capacity, integrate with utilized capacity); cloud utilization & detailed utilization (e.g., monthly/daily utilization for avg/max of CPU/memory utilization and trends over time; aggregation of utilization data for cloud analysis by VDC, application, environment, layer, and resource groups; drill down to system monitoring tool; adapter based integration with any system monitoring tools; deployment template and provisioning for Xymon monitoring server/clients, and ability to deploy & provision other application and system monitoring technologies; and VDC and application cost chargeback); custom dashboards/reporting and activity logs for audit and tracking; and alerts (e.g., capacity changes, utilization thresholds, cost thresholds, and user access changes). Accordingly, a skilled person will appreciate that benefits of the provision module 222 include, but are not limited to, business and IT Management having visibility and control over the cloud ecosystems, costs, resources and SLAs; eliminating unrestricted/unintended spending with alerts, procurement and provisioning workflows; making more accurate investment decisions that continuously reduce cost and optimizes resource utilization; implementing proactive action on resource, SLA and cost alignment before there is an impact to business; auditing and reporting on all IT financial transactions, owned assets in the cloud by business app, business unit and shared IT resources; real time alignment of business, IT staff, resources, cost and performance; effective cost accounting and cost assignment to specific business units and apps; rapid enablement of IT initiatives for reducing the time between strategic planning and operational execution; continuous baselining of business and IT metrics; and establishing performance benchmarks.

A cloud services catalog and asset manager module 228 of the CSB platform 202 enables (e.g., via the CSB platform access portal) command and control services that are critical to successful adoption and acceptance of the cloud services model (i.e., cloud services catalog and asset manager functionality). Examples of information generated and tasks implemented using the cloud services catalog and asset manager module 228 include, but are not limited to, multi-provider catalog for IaaS, PaaS, SaaS, Managed Services, and Custom Services; extendable and customizable catalog with dynamic attributes and user interface; pricing support for different cloud provider pricing models (e.g., reserved capacity pricing, allocated capacity pricing and pay-as-you-go); manage provisioned assets (e.g., IaaS, PaaS, SaaS, managed and custom services, asset relationships, asset status and life cycle management, etc); automated asset discovery & sync (e.g., discover and make changes to assets in the cloud, sync with assets registered in catalog/asset manager, match process enabling the IT Administrator to resolve any discrepancies, match and compare prices in catalog for discovered assets, etc); and pre-configured content that is pre-populated with several provider offerings for rapid deployment.

A demand and capacity planning module 230 of the CSB platform 202 enables (e.g., via the CSB platform access portal) solution capacity modeling (i.e., cloud demand and capacity planning functionality). Examples of information generated and tasks implemented using the demand and capacity planning module 230 include, but are not limited to, planned vs. allocated vs. utilized capacity; standardized capacity units across cloud providers, cloud models and infrastructure; advanced and dynamic capacity planning (e.g., application capacity model and VDC capacity model; support for shared resources across VDCs, applications, environments and layers; capacity benchmarks using projected utilization profiles; capacity re-baseline using actual utilization data; modeling analysis of forecasted vs. available utilization thresholds for forecasting capacity growth needs, etc); demand planning with business driver-based demand modeling, drivers for normal demand growth or event-based; and integrated demand and capacity planning to update resource capacity and generate schedule or metric-based policies to change resource capacity based on capacity plan.

In regard to demand and capacity planning, the CSB platform (e.g., via the demand and capacity planning module 230) allows a cloud broker (e.g., platform operator) or the end customer (e.g., cloud service customer) to input demand profiles which then get applied to the solution design, and generate a capacity vs. demand curve (e.g., across an IaaS architecture). This enables cloud service consumers to incrementally acquire capacity as the demand grows instead of acquiring a lot of capacity that remains unutilized till the demand catches up. The CSB platform 202 also enables customization of the capacity planning to be tailored to specific customer architectural needs, and complex demand patterns.

A provisioning, metering and auto-scaling module 232 of the CSB platform 202 enables (e.g., via the CSB platform access portal) automated workflow based provisioning, integrated support for secure shell (SSH) based VMs, and deployment automation (i.e., provisioning, metering and auto-scaling functionality). Examples of automated workflow based provisioning include, but are not limited to, asynchronous message-based provisioning across multiple clouds simultaneously; handle and retry provisioning failures workflow to aggregate and manage underlying cloud provisioning task dependencies; hybrid workflow to support combination of automated and manual provisioning tasks; extensible workflow definitions that support custom integrations for Enterprise systems.

A security manager module 234 of the CSB platform 202 enables (e.g., via the CSB platform access portal) various security management functionalities related to cloud services. Examples of such security management functionalities include, but are not limited to, user security management with subscription and role-based access control that allows for multiple models of user security including user group support and password policy, single sign on and advanced security (e.g., support for integration with federated identity and access management systems, enterprise user directory integration, etc); user administration delegation to business units/departments; centralized and delegated user security administration; VPN services and firewall configuration support; VM encryption support across cloud providers; SSH key management for provider accounts, VDCs, and individual VMs; and support for Federal, Enterprise and other custom, high security deployments.

A policy manager module 236 of the CSB platform 202 enables (e.g., via the CSB platform access portal) implementation of various policies related to cloud services. Examples of such policies include, but are not limited to, pricing policies (discounts, upcharges, customer specific, partner specific, custom, etc); cost alerts based on thresholds; resource auto-scale policies (e.g., via support for a policy provider auto-scaling function); cost allocation policies by allocated and utilized capacity; architecture policies to enforce architectural constraints in solution design; and workflow/notification policies (e.g., email groups, portal tasks, order approvals, etc).

A broker operations module 238 of the CSB platform 202 enables (e.g., via the CSB platform access portal) implementation of broker operations related to cloud services. Examples of such broker operations include, but are not limited to, customer activations (i.e., on-boarding) and deactivation; customer subscription management (e.g., subscription packages and payment authorization); customer billing & payments with monthly bill export & import, bill lifecycle and publish, and credit card & purchase order support; brokerage command & control with visibility into cost, capacity & ordering behavior across providers & customers; customer support with integration and support ticketing systems; catalog implementation of services & providers, pricing rules, sourcing content, import SLAs and terms & conditions; channel/portal management with click-through agreements, white labeling/co-branding and affiliate management; and provider self-service with catalog & list price updates and visibility into customer behavior.

A cloud services integration module 240 of the CSB platform 202 enables (e.g., via the CSB platform access portal) implementation of cloud services integration functionalities (i.e., via adapters and application programming interfaces (API's)). Examples of such cloud services integration functionalities include, but are not limited to, pre-built jCloud API based adapters; built jCloud and REST API based adapters; support for custom adapters; adapters map to a common model for provisioning changes and asset discovery; metadata-driven configuration options enable dynamic UI for provider capabilities (e.g., memory, cpu, storage, OS templates); and map provisioning tasks to be automated or workflow-based.

A business systems integrations module 242 of the CSB platform 202 enables (e.g., via the CSB platform access portal) implementation of business systems integration functionalities (i.e., via API's). Examples of such business systems integration functionalities include, but are not limited to, APIs for business intelligence systems (e.g., resource capacity/cost/utilization for provisioned resources; catalog data, asset inventory data and orders; and the like); enterprise billing & payment systems that provide APIs for enterprise billing & payment systems to retrieve and update data for bills, orders and assets; and APIs for cloud service providers to manage catalog & list prices, terms and conditions for provider services and visibility into customer activity and behavior.

An IT systems integrations module 244 of the CSB platform 202 enables (e.g., via the CSB platform access portal) implementation of IT systems integration functionalities (i.e., via API's) related to internal IT governance, internal IT operations help desk systems, and internal data center systems management. Examples of such IT systems integration functionalities include, but are not limited to, providing APIs for enterprise governance systems to view order access and complete workflow tasks, review tickets/support, terms and conditions with SLAs; monitoring and auditing data for cost, capacity and utilization of resources; providing APIs for Help Desk systems to view, edit, submit and run reports on support tickets; providing APIs for enterprise systems management integration; and monitoring data for cost, capacity, and utilization of resources.

A cloud services network module 246 of the CSB platform 202 enables (e.g., via the CSB platform access portal) implementation of cloud services networking functionalities. Examples of such cloud services networking functionalities include, but are not limited to, pre-defined CSB service taxonomy (e.g., hierarchical); pre-loaded catalog(s) (e.g., for cloud providers, private clouds, security services, network services, managed services; pre-built adapters for available cloud service providers; pre-defined provisioning workflows for all services pre-loaded in the catalog(s); sourcing comparator content for cloud service provider offerings; pre-defined subscription packages; user roles and dashboards; pre-defined email templates for user registration, provisioning status, order status & process steps, alert notifications, and task notifications; and pre-built integration for support.

Figure 4:
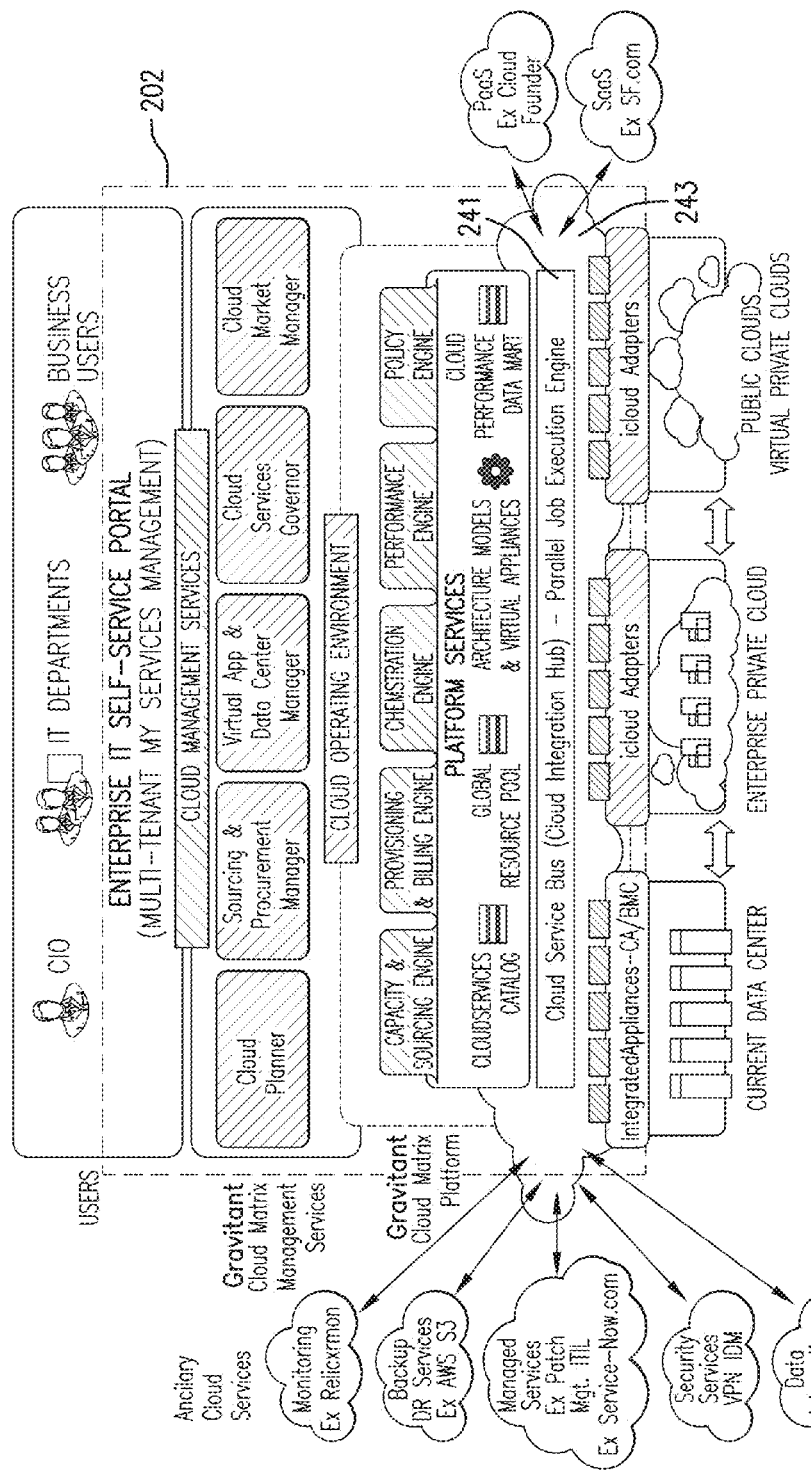
FIG. 4 is an illustrative view showing high-level functionality of the CSB platform of FIG. 3A.

Referring to FIG. 4, further details of the cloud services integration module 240 of the CSB platform 202 are presented. The cloud services integration module 240 shown in FIG. 3A comprises a unique and comprehensive service bus architecture for the provisioning capabilities. This service bus architecture is embodied by the cloud service bus 241, which is coupled to outside network 243. The cloud service bus 241 has an inbuilt data driven workflow/process engine that supports multiple workflow/process definitions for different services, service providers and/or service types. The cloud service bus 241 uses an adapter architecture pattern to integrate with service providers. The cloud service bus 241 is a message-based architecture that allows asynchronous and parallel execution of provisioning tasks across cloud services and cloud service providers. These provisioning adapters are separate 'classes/libraries' that implement specific provisioning APIs at the level of each operation mapped to the provider API. The adapter classes are implemented using the Interface design pattern. The cloud service bus 241 supports multiple adapter invocation approaches including standard web service protocols and REST API protocols, as well as custom approaches depending on the service provider capabilities.

The cloud service bus 241 can use standard open-source JClouds (jclouds) protocol that currently has provisioning integration enabled for about 30 cloud providers. The cloud service bus 241 workflows invoke jclouds protocol libraries using service provider metadata and credentials configured in the catalog discussed above (i.e., the service catalog).

The architecture of the cloud service bus 241 and the adapter pattern support several standards such as, for example, VMWare vCloud Director APIs, OpenStack APIs, AWS APIs, jclouds APIs, *Eucalyptus* APIs and CloudStack APIs. The cloud service bus 241 provides the unique ability to interoperate with emerging and changing standards with the cloud, and normalize across them from a consumer perspective. Many of these standards are focused on cloud provider's ease of management of multiple cloud technologies.

Users of the CSB platform 220 can design their virtual data centers through a visual user friendly console. Once the design is finalized, it goes through an authorization workflow, followed by an approvals process that is all fully automated through the CSB platform 220. Such an authorization workflow is critical to maintain complete control of the procurement process. Otherwise, resources may be ordered and provisioned randomly without proper protocol leading to rogue virtual machines and virtual machine sprawl. Next, all the virtual resources are simultaneously provisioned across multiple providers through the cloud services integration module 240, which has API connections to the different cloud service providers. Accordingly, cloud service consumers do not need to create accounts and communicate with multiple providers for their cloud requirements because this will be done for them automatically by the cloud services integration module 240. This level of automation also allows for easy movement of workloads between cloud service providers.

FIG. 3A shows a functional component architecture view of the CSB platform 202 of FIG. 4. Platform services of 202 shows the data repositories that power the various functional components of FIG. 3A. For example, Cloud Performance Datamart in 202 is updated and used along with Performance Engine and Cloud Services Governor in 202 by the Control Functional module in FIG. 3A; and the Cloud Services Catalog, Discovery and Asset Manager in FIG. 3A uses the Platform services of 202 Global Services Catalog, Global Resource Pool, and Architecture Models and Virtual Appliances, along with Virtual App and Data center Manager Functions shown in 202. The Cloud Services Network module in FIG. 3A represents the catalog content, templates and adapters built for the representative network of services shown in FIG. 4 outside 202 and connected to 202.

Figure 5:
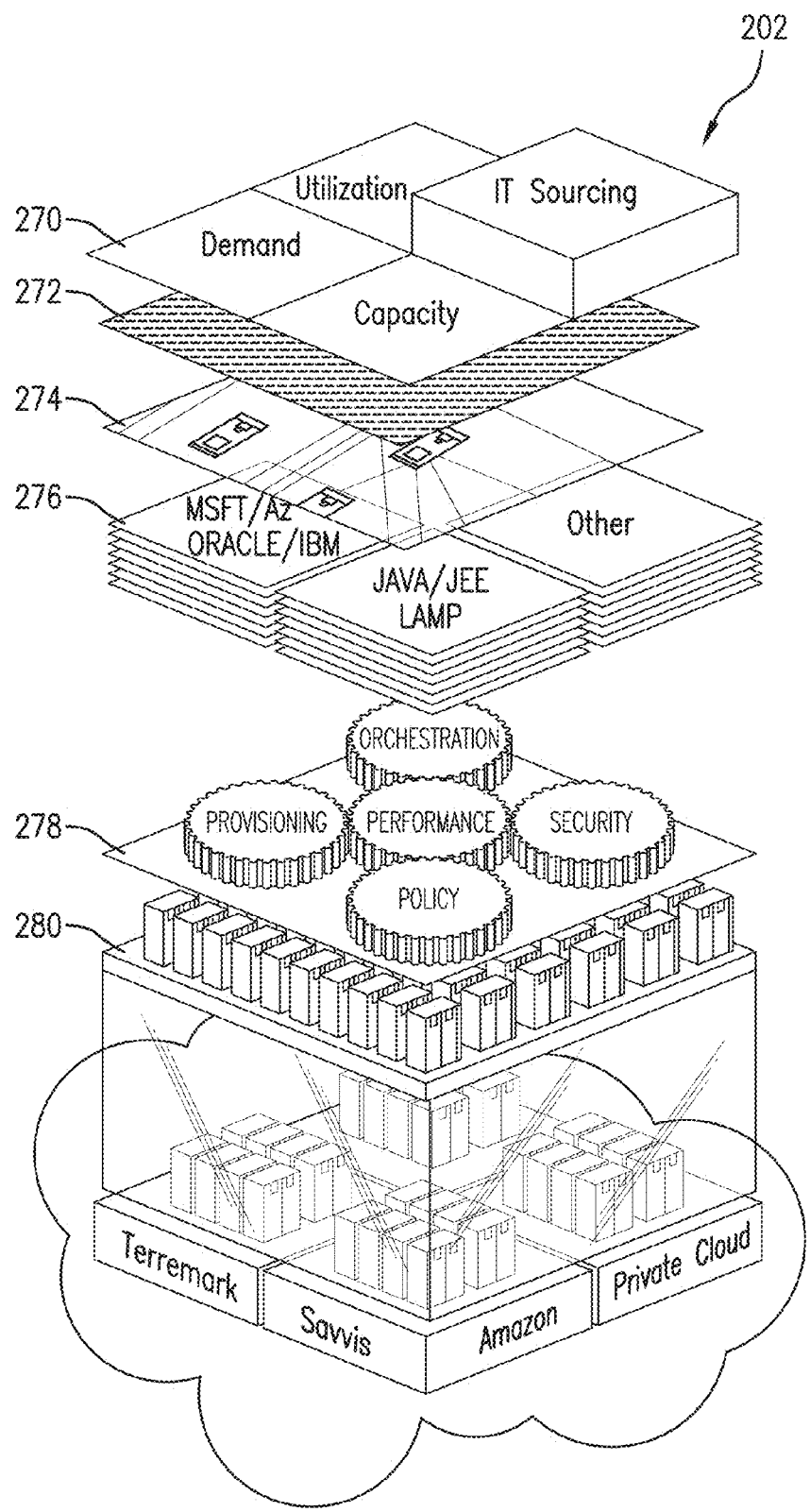
FIG. 5 is an architectural view showing various engines providing functionality the CSB platform of FIG. 3A.

FIG. 5 shows an architectural view of the CSB platform 202. The architecture of the CSB platform 202 enables cloud brokerage services to be delivered in a manner that provides advantageous and beneficial results. As is discussed below in reference to the various platform engines of the CSB platform 202, the architecture of the CSB platform 202 employs advanced simulation and optimization mathematical models for IT planning, sourcing, and governance.

A set of cloud decision and governance engines 270 of the CSB platform 202 is configured to simulate and optimize trade-offs between cloud service criteria such as, for example, business demand, resource capacity, utilization/performance, and IT sourcing policies. The set of cloud decision and governance engines 270 enable the analysis of impacts to cloud service parameters such as, for example, cost, risk, QoS, SLAs, and application architecture for business services and applications. Based on these analyses, IT organizations and/or other entity(ies) of a cloud service consumer can make decisions on preferred cloud service providers to use, on the optimal cloud service capacity to deploy, and on the policies for automated scaling of capacity based on business demand. Thereafter, an IT organization and/or other entity(ies) of a cloud service consumer can govern the operations and compliance of these decisions through on-going tracking and analysis against a defined plan.

A cloud services catalog engine 272 of the CSB platform 202 is configured to manage a comprehensive model of public/private cloud services supply and business services demand of the cloud service consumer's. An administrative entity that manages back-end operability of the CSB platform 202 (i.e., the various platform engines thereof) works with many cloud service providers to model their individual cloud services and purchase-able line items with pricing and packaging structures. The cloud service consumer (e.g., its IT Organizations) can then define their business services and model demand for cloud services based on available services in a catalog of cloud services that are available from the cloud service providers (i.e., a CSB cloud services catalog). The cloud service consumer (e.g., its IT Organizations) can also define a custom catalog of preferred suppliers (e.g., a CSB cloud service provider catalog that can comprise the CSB cloud services catalog) to help manage their sourcing policies and setup a private marketplace.

A cloud performance data mart engine 274 of the CSB platform 202 is configured to automatically aggregate and correlate metrics for cloud service criteria such as, for example, demand, capacity, utilization, performance, cost, and risk for multiple application architecture and cloud resources across many environments and virtual data centers. The cloud performance data mart engine 274 enables near real-time visibility into resource performance along with audit data to manage governance of resource changes. Using a suitable performance data model, the system can scale to support thousands of resources with historical data and deliver instant reporting.

An application architecture manager engine 276 of the CSB platform 202 is configured to define application architecture blueprints using virtual appliances (e.g., templates) and associated resource capacity models to automate system construction, deployment, configuration and maintenance across physical, virtual and cloud environments. Also, the application architecture manager engine 276 enables orchestration and transaction-based automated provisioning of cloud resource changes.

A set of cloud architecture engines 278 of the CSB platform 202 provides a common set of architecture services to intelligently scale, monitor, and secure applications running across multiple cloud environments and internal data centers. The cloud architecture engines 278 provide the foundation, logic, and integrations to enable automated resource provisioning, performance management, orchestration and workflow, policy models, and security controls.

A global cloud resource pool and cloud service provider engine 280 of the CSB platform 202 is configured to create, manage and control VDC's by provisioning resources from multiple external cloud service providers, private clouds and internal data centers. All resources are inventoried globally across providers and manageable through a single unified interface. Cloud service providers are integrated into the CSB platform 202 through common interfaces (e.g., for connectors of VDC's and connectors of cloud managed services).

In view of the disclosures made herein, a skilled person will appreciate that a CSB platform configured in accordance with the present invention offers several distinguishing aspects with respect to traditional approaches for enabling a cloud services to be implemented by a cloud services consumer. One such distinguishing aspect relates to CSB functionality being configured for meeting end user cloud service consumption use cases integrated with governance use cases for IT and business managers. In this regard, such a CSB platform is configured to operate and scale across multiple agencies and internal/external cloud service providers communities in a centralized or federated deployment model. Another such distinguishing aspect relates to CSB platform being model driven and based on XML semantic ontologies. This avoids lock in for end customers while providing quick extensibility and integration with customers and cloud providers systems. Furthermore, the CSB platform includes integrated analytics and policy management for intelligent resource usage, SLA compliance, and cost optimization thereby allowing cloud service consumers to run predictive IT operations to optimize utilization cost and SLA across an IT supply chain. Yet another such distinguishing aspect relates to CSB platform being able to be deployed (i.e., onsite or offsite) in multiple configurations where an operator of the CSB platform can be an agency or a preferred service integration provider. Additionally, the data processes implemented via the CSB platform inter-operate with service management and governance processes of other entities, which enables a staged extension of a non-broker-based operations model to a broker-based operations model.

Figure 6:
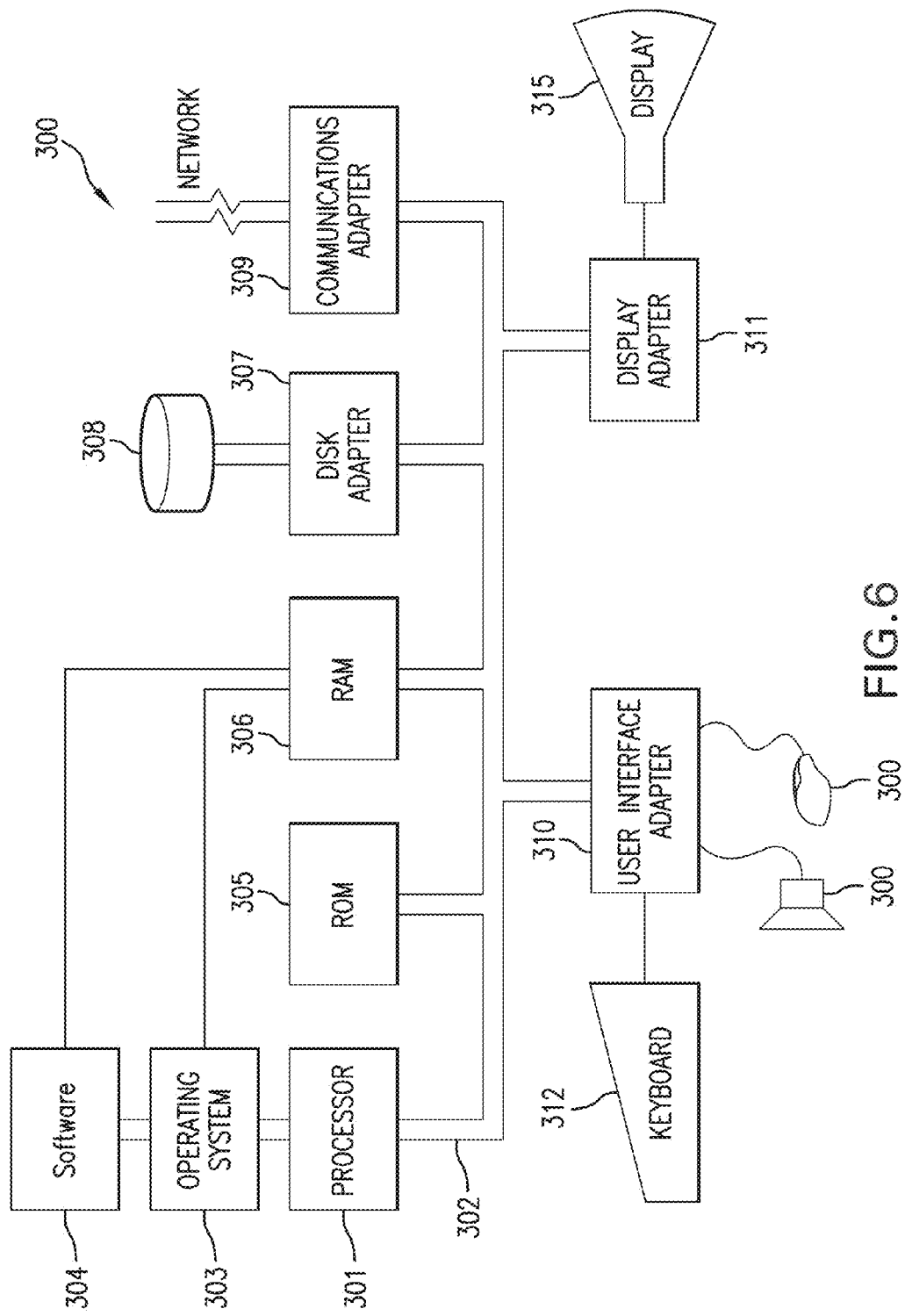
FIG. 6 is a block diagram view showing a data processing system 300 representative of a hardware environment comprising a CSB platform configured in accordance with an embodiment of the present invention.

FIG. 6 shows a data processing system 300 representative of a hardware environment comprising a CSB platform configured in accordance with an embodiment of the present invention (e.g., the CSB platform 202). A server is one example of the data processing system 300. The data processing system 300 a processor 301 coupled to various other components by system bus 302. An operating system 303 runs on processor 301 and provides control and coordinates the functions of the various components of the data processing system 300. 2. Software 304 in accordance with the principles of the present invention runs in conjunction with operating system 303 and provides calls to operating system 303 where the calls implement the various functions or services to be performed by software 304 and, optionally, other applications. Software 304 includes a set of instructions (i.e., a program) for providing cloud service brokerage functionality configured in accordance with an embodiment of the present invention (e.g., as disclosed above in FIGS. 2-5).

Read-only memory ("ROM") 305 is coupled to system bus 302 and includes a basic input/output system ("BIOS") that controls certain basic functions of capacity planning system 104. Random access memory ("RAM") 306 and disk adapter 307 are also coupled to system bus 302. It should be noted that software components including operating system 303 and software 304 can be loaded into RAM 306, which may be the main memory of execution for the CSB platform 202. Disk adapter 307 may be an integrated drive electronics ("IDE") adapter that communicates with a disk unit 308, e.g., disk drive.

The data processing system 300 may further include a communications adapter 309 coupled to bus 302. Communications adapter 309 interconnects bus 302 with an outside network (e.g., outside network 243 shown in FIG. 4) enabling the CSB platform 202 to communicate with other devices.

I/O devices may also be connected to the CSB platform 202 via a user interface adapter 310 and a display adapter 311. Keyboard 312, mouse 313 and speaker 314 may all be interconnected to bus 302 through user interface adapter 310. Data may be inputted to the CSB platform 202 through any of these devices. A display monitor 315 may be connected to system bus 302 by display adapter 311. In this manner, a user is capable of inputting to the CSB platform 202 through keyboard 312 or mouse 313 and receiving output from the CSB platform 202 via display 315 or speaker 314.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. In preferred embodiments, the computer readable program code is implemented via a non-transitory computer-readable storage medium having tangibly embodied thereon and accessible therefrom instructions interpretable by at least one data processing device.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are/can be described herein with reference to textual descriptions, flowchart illustrations and/or block diagrams of methods, apparatus (systems) and computer program products according to embodiments of the present invention. It will be understood that portions of the textual descriptions, flowchart illustrations and/or block diagrams, and combinations thereof can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the textual descriptions, flowchart illustrations and/or block diagrams, and combinations thereof. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the textual descriptions, flowchart illustrations and/or block diagrams, and combinations thereof. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the textual descriptions, flowchart illustrations and/or block diagrams, and combinations thereof.

CSB Platform User Interface

Figure 7:
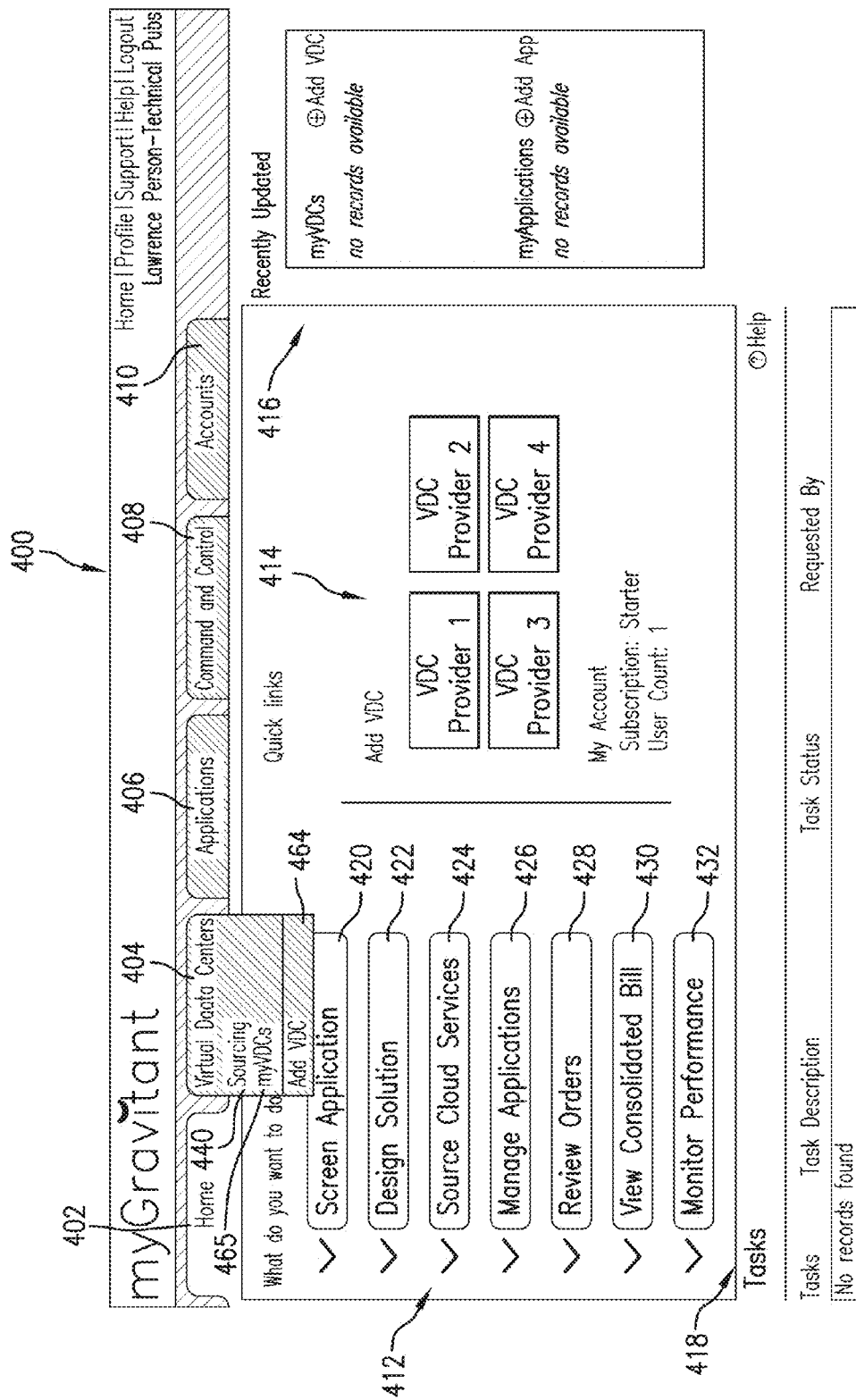
FIG. 7 is an illustrative view of a home page of a CSB platform portal configured in accordance with an embodiment of the present invention.

Turning now to specific aspects of cloud management interface functionalities, FIG. 7 shows a main user page 400 of a portal configured in accordance with an embodiment of the present invention (e.g., a portal of the CSB platform 202 discussed above). The main user page 400 includes a Home tab 402, a Virtual Data Center (VDC) tab 404, an Applications tab 406, a Command And Control tab 408, and an Accounts tab 410. The Home tab 402 enables navigation to specific functionalities (e.g., those of other navigation tabs) and to consumer task activities. The VDC tab 404 provides functionalities related to comparing different cloud service providers and to creating and managing VDCs and other virtual resources. The Applications tab 406 provides functionalities related to creating, sizing, editing and managing the consumer's cloud applications, which can be mapped to resources within a single VDC or across multiple VDCs. The Command And Control tab 408 provides functionalities related to viewing and managing the consumer's orders, view monthly consolidated bills and to monitoring its VDCs and applications. The Accounts tab 410 provides functionalities related to creating and editing users of the consumer's cloud services, assigning roles to its users and managing its users. In this regard and as will be discussed below in greater detail, each one of the tabs 402-410 provides a cloud services consumer access to respective information and functionalities.

Home Tab

The Home tab 402 includes a Tab Link section 412, a VDC Quick Link section 414, a Recently Updated Resource section 416, and a Tasks section 418. The Tab Link section 412 provides selectors for accessing respective functionalities, as discussed below. The Quick Links section 414 provide shortcuts to create VDCs with the selected providers. The Recently Updated Resource section 416 links provide shortcuts to the IT Architecture view of recently created/updated VDCs and applications. The Tasks section 418 is a task manager that lists all pending tasks and providing links to order details where action is needed.

Figure 19:
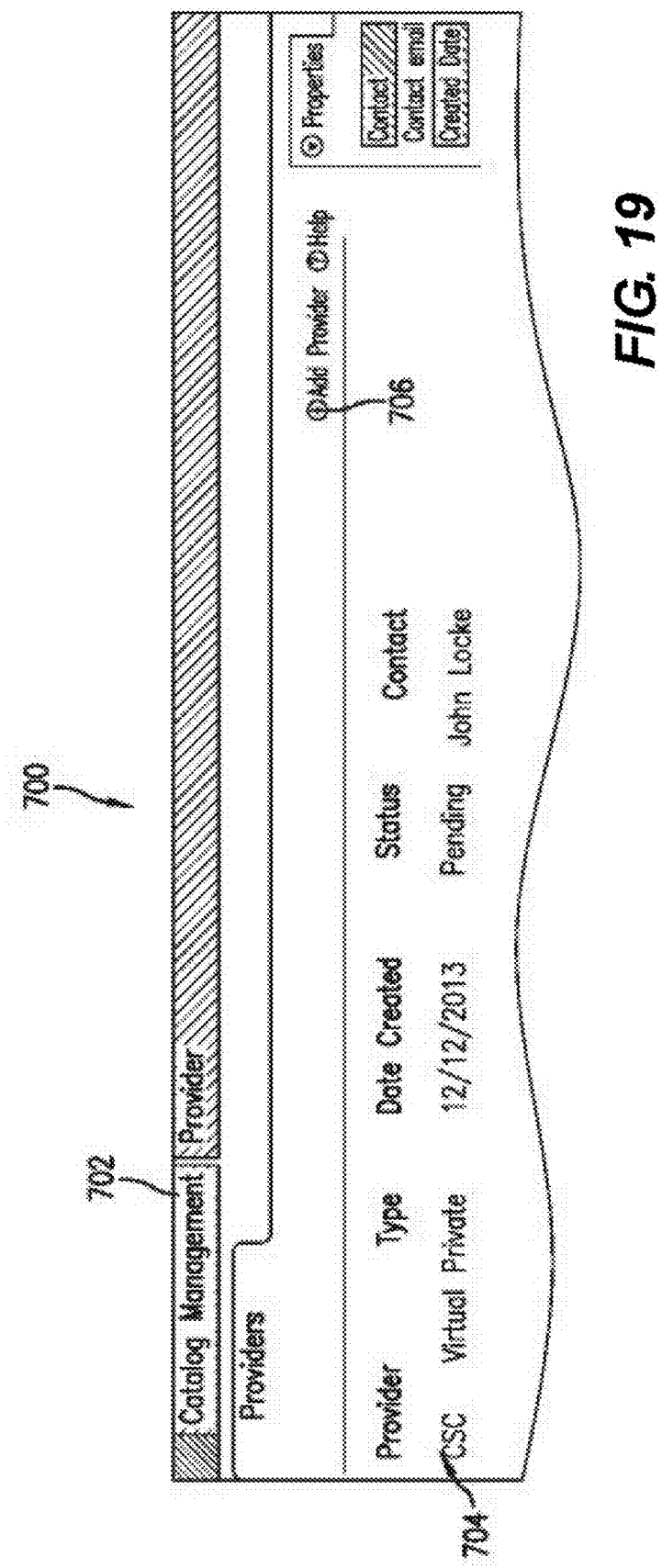
FIG. 19 is an illustrative view showing a provider screen of a catalog management section of a CSB platform portal.
Figure 22:
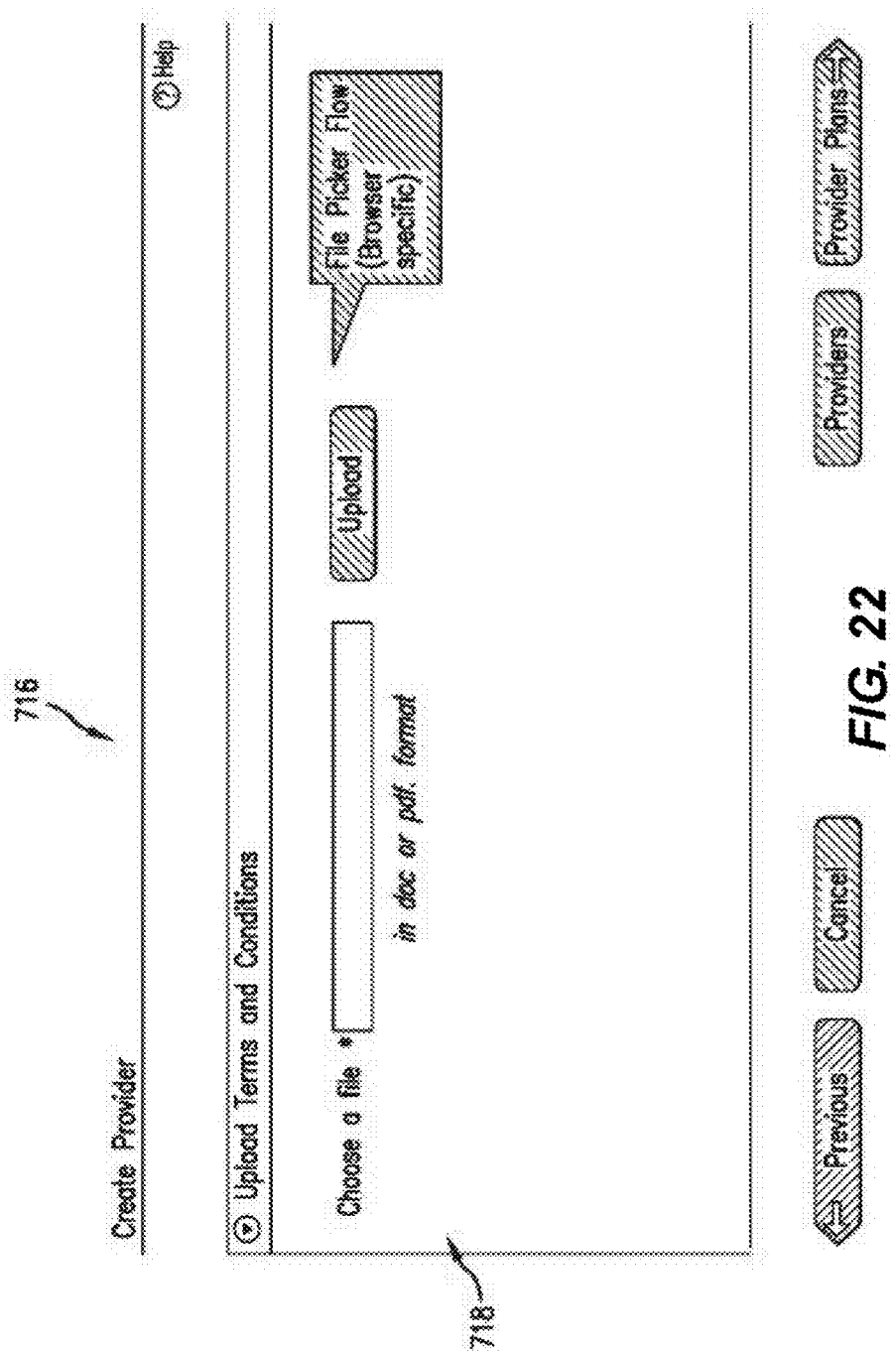
FIG. 22 is an illustrative view showing a provider terms and conditions pop-up screen of the catalog management section shown in FIG. 19.
Figure 23:
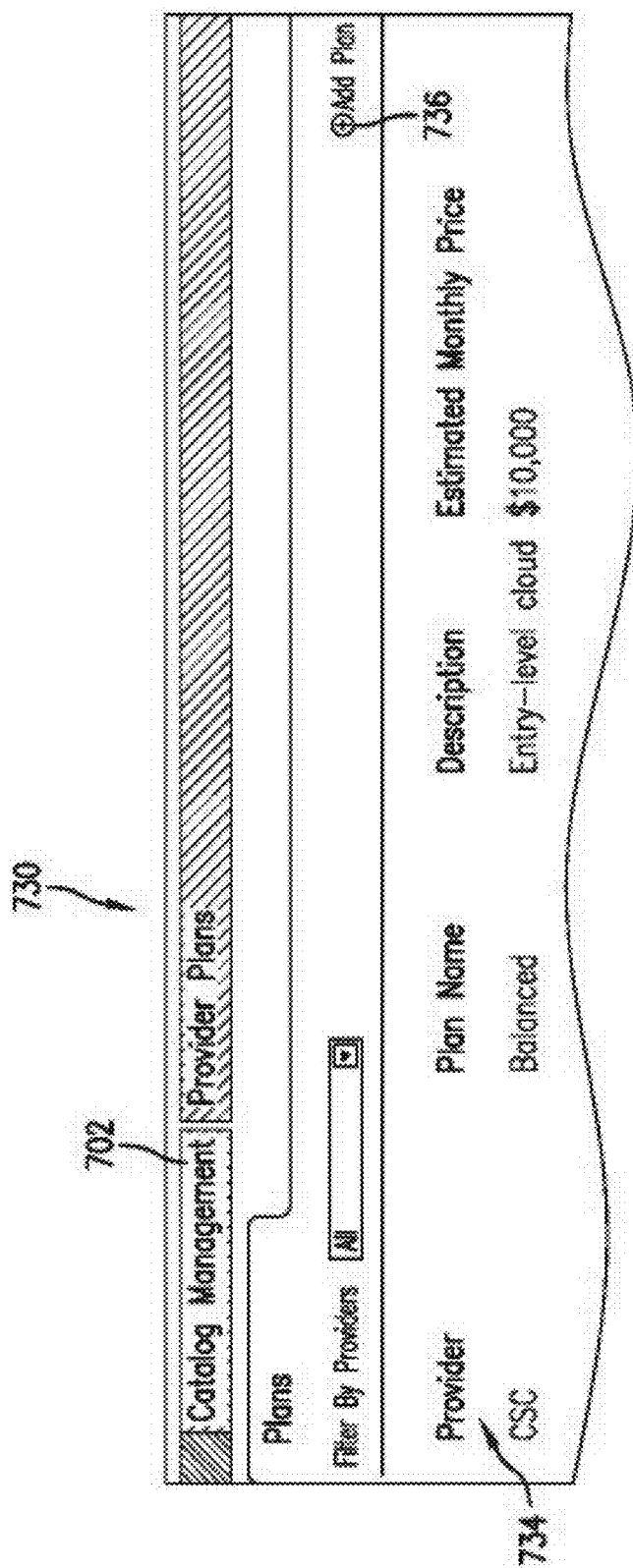
FIG. 23 is an illustrative view showing a provider plans screen of the catalog management section of the catalog management section in FIG. 19.
Figure 25:
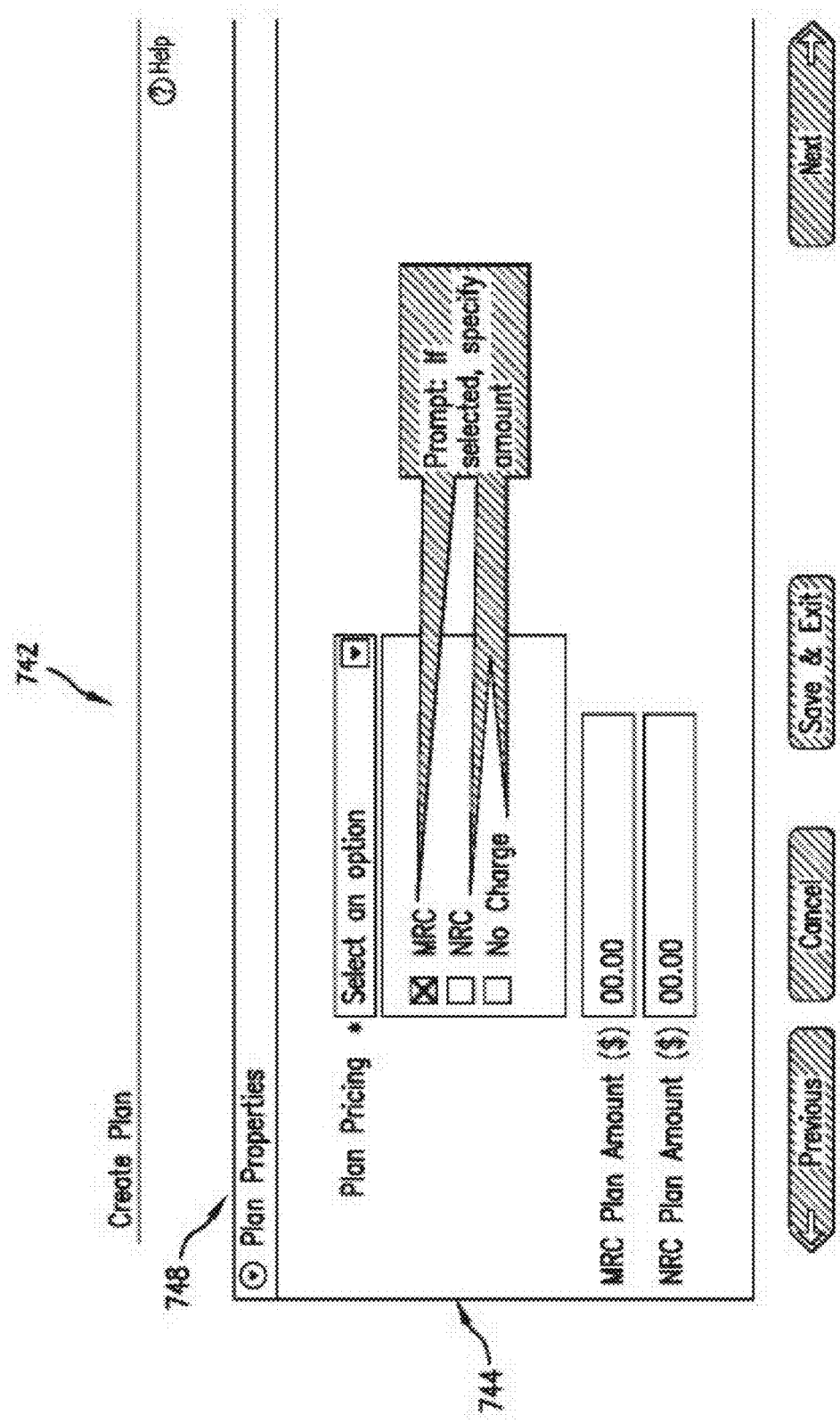
FIG. 25 is an illustrative view showing a provider plan properties pop-up screen of the catalog management section in FIG. 19.
Figure 26:
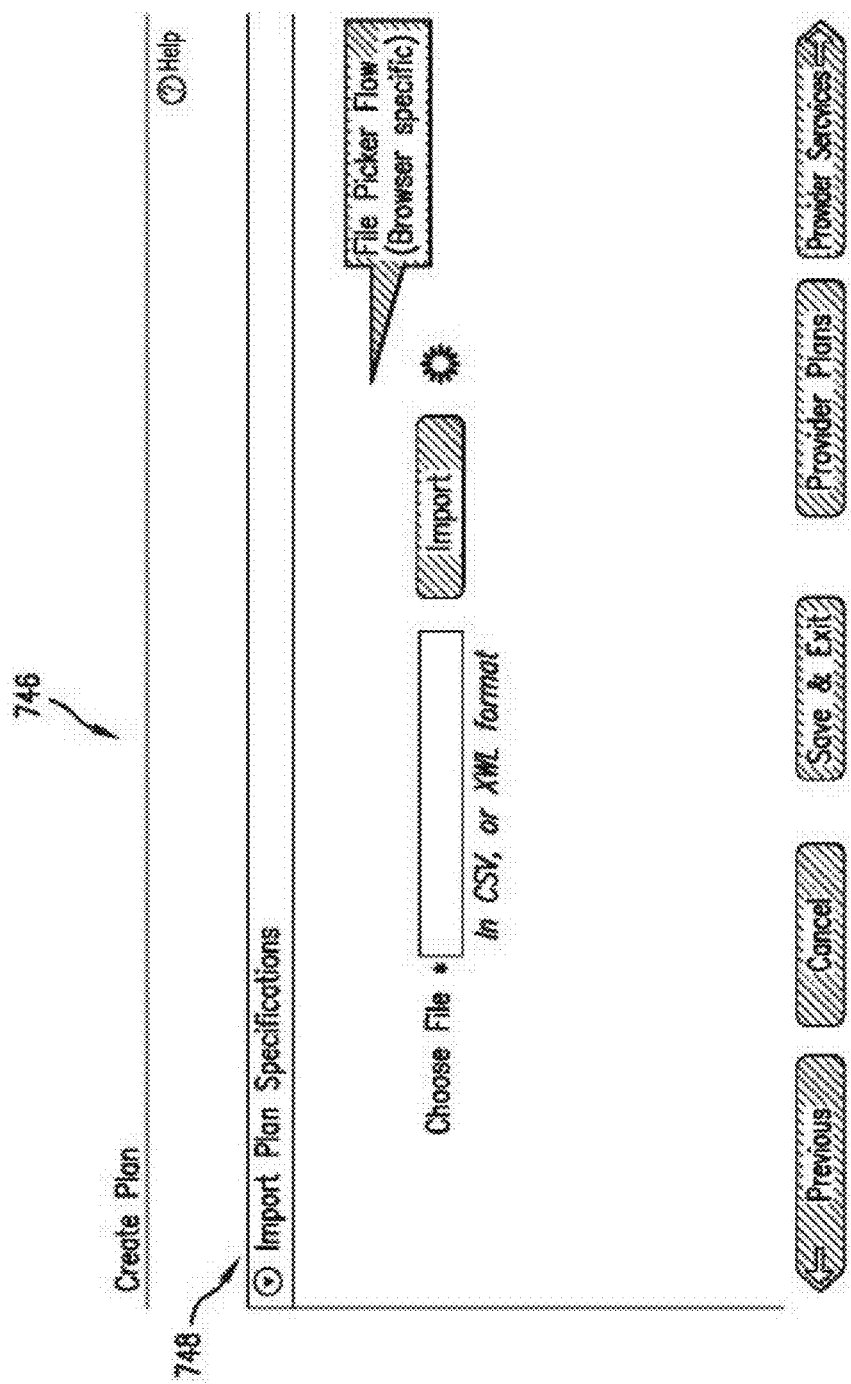
FIG. 26 is an illustrative view showing a provider plan specifications pop-up screen of the catalog management section in FIG. 19.
Figure 27:
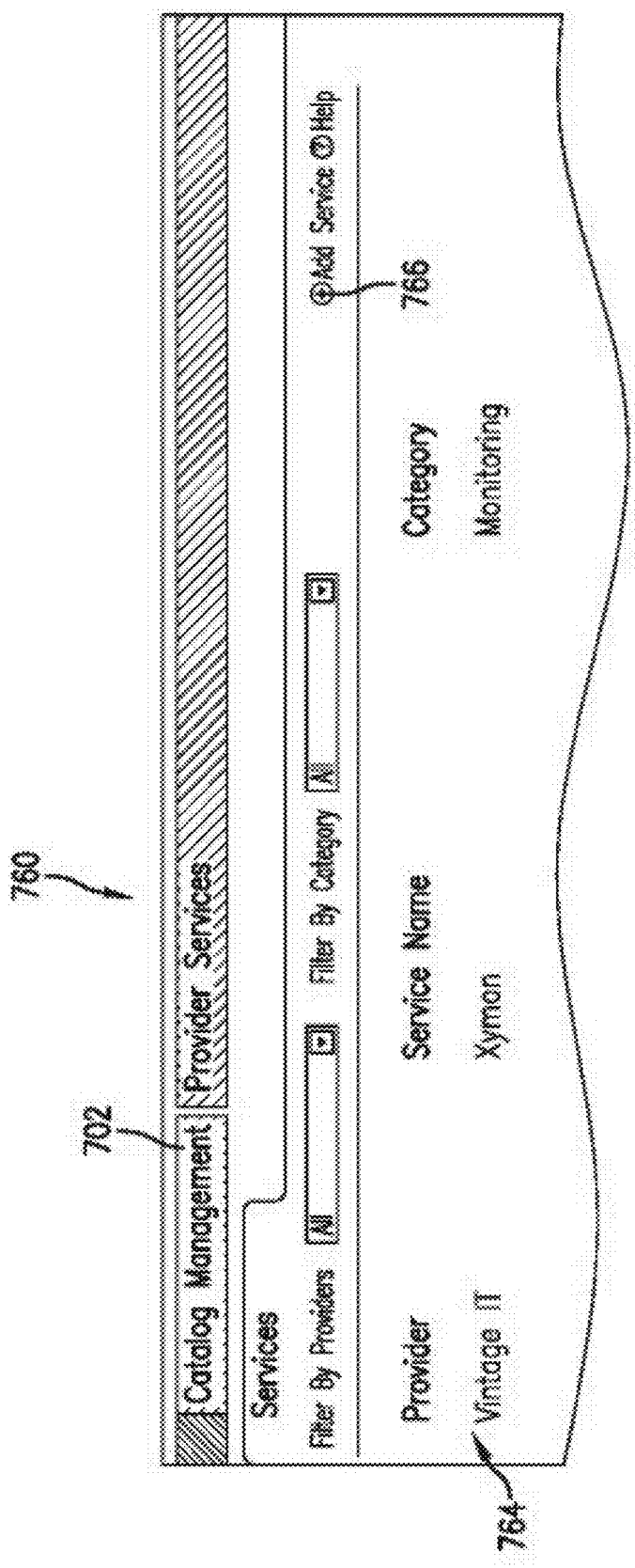
FIG. 27 is an illustrative view showing a provider services screen of the catalog management section of the catalog management section in FIG. 19.
Figure 29:
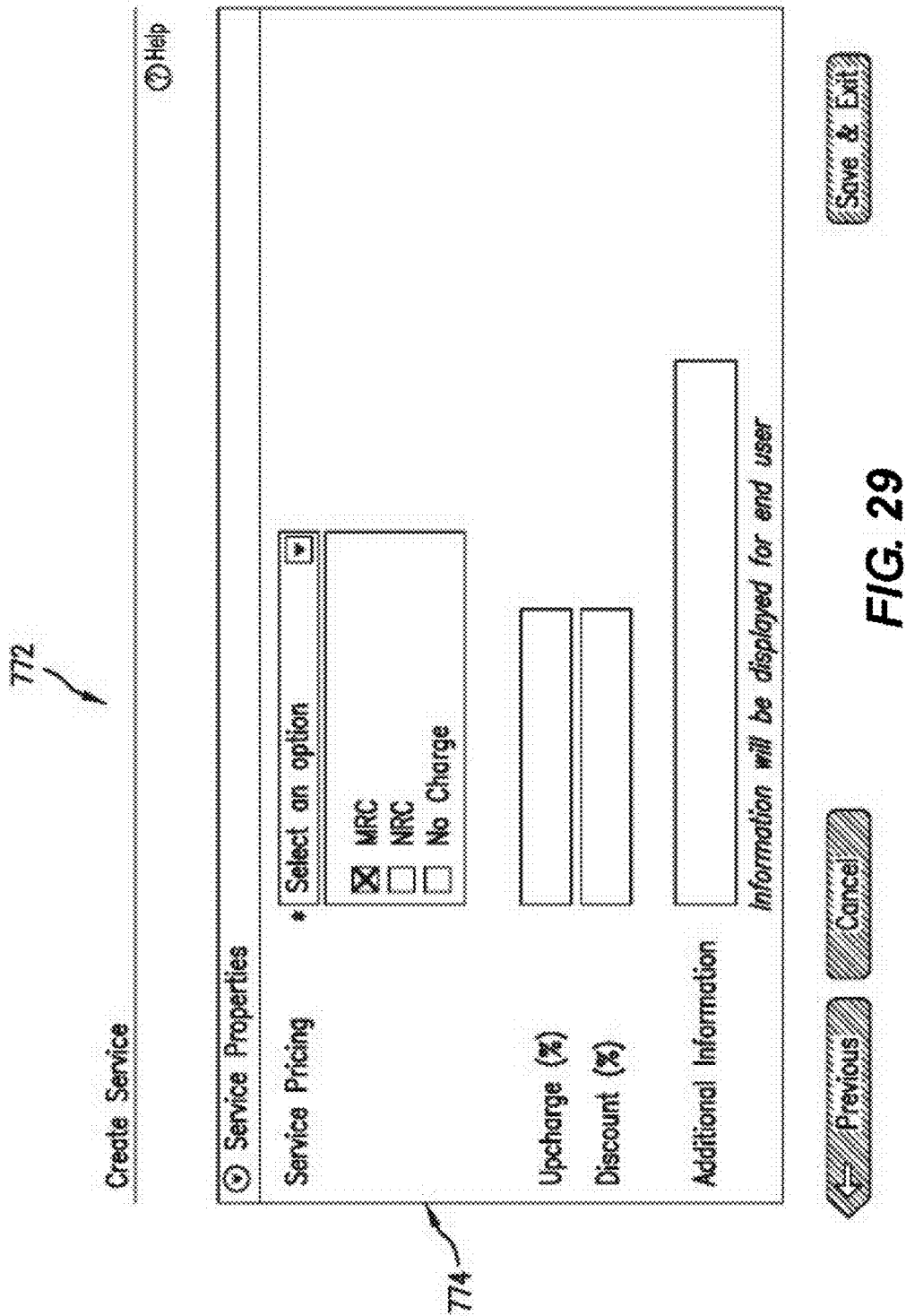
FIG. 29 is an illustrative view showing a service properties pop-up screen of the catalog management section in FIG. 19.
Figure 30:
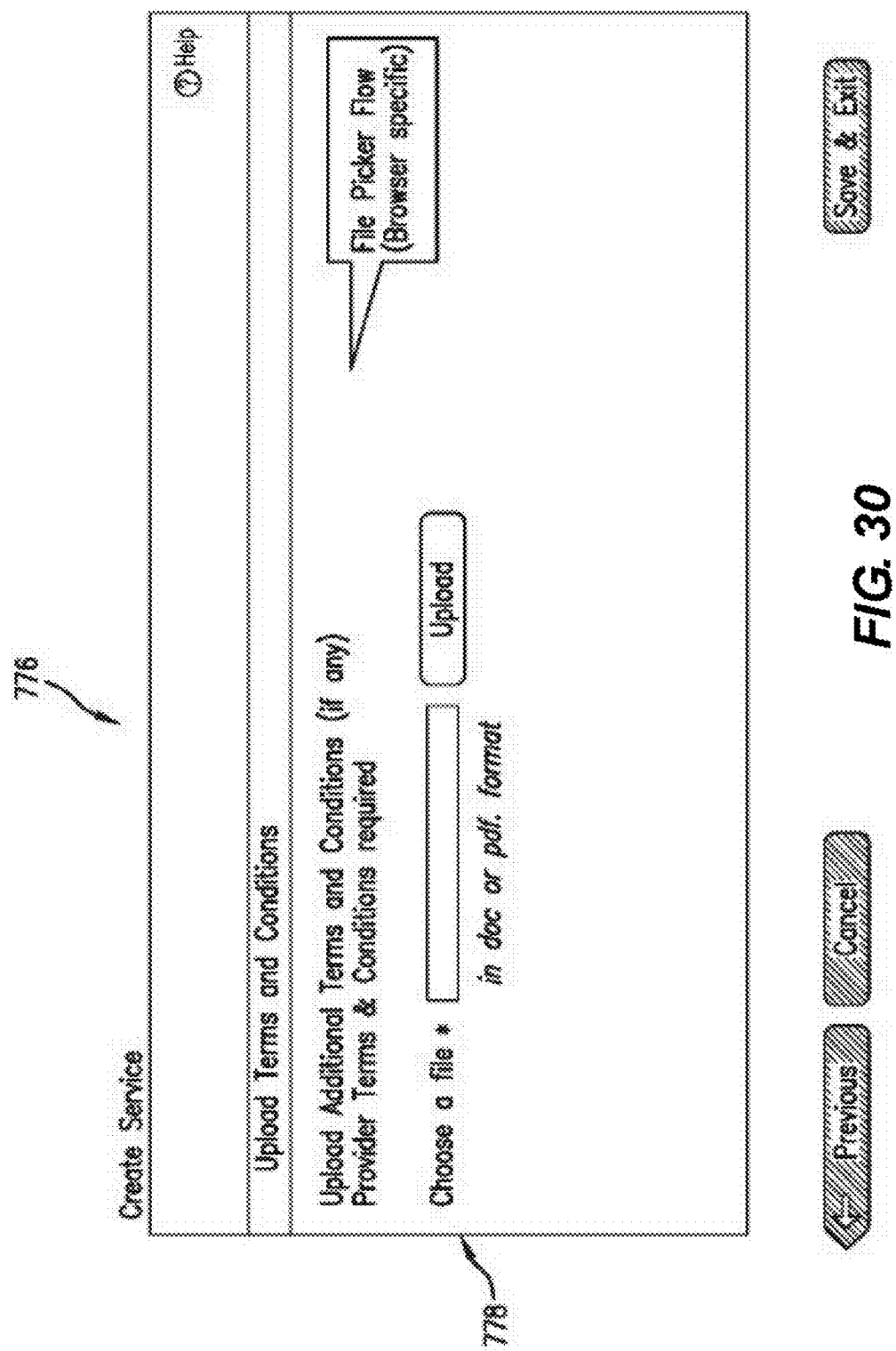
FIG. 30 is an illustrative view showing a service terms and conditions pop-up screen of the catalog management section in FIG. 19.

A screen application selector 420 of the Tab Link section 412 links (i.e., navigates the interface to) to functionalities for screening application for determining migration considerations, as is discussed below in reference to FIG. 19. A design solution selector 422 of the Tab Link section 412 links to an application solution designer view of the Applications tab 406 for enabling a user (i.e., cloud service user) to plan cloud resource scenarios by creating one or more applications (i.e., use specific cloud resource configurations) and mapping the one or more applications to different virtual data centers to compare and choose a desired cloud service solution (i.e., cloud service provider offering(s)). A source cloud services selector 424 of the Tab Link section 412 links to provider offering of the VDC tab 404 for enabling a user to compare provider packages and features to determine which provider to select. The objective of such comparison and determination is map application requirements to a package and use that package to compare which cloud service provider the user want to select (i.e., not yet actually buying, provisioning or fulfilling these packages). A manage applications selector 426 of the Tab Link section 412 links to an application screen (e.g., My Applications screen) of the Applications tab 406 for enabling a user to create applications and map them to a VDC or make edits to existing applications. A review orders selector 428 of the Tab Link section 412 links to an order screen (e.g., My Orders screen) of the Command And Control tab 408 for enabling a user to simultaneously view multiple orders across VDCs, to monitor their status, and to see the history of orders associated with their existing VDCs. A consolidated bill selector 430 of the Tab Link section 412 links to a list of bills currently in pending for the cloud service consumer for enabling a user to navigate to detail information for a particular bill. A monitor performance selector 432 of the Tab Link section 412 links to a monitoring screen of the command and control tab 408 for providing access to dashboard that provide information relating to cost and performance of a user's VDCs and Applications.

VDC Tab

The VDC tab 404 (FIG. 7) provides functionalities related to comparing VDC packages, creating new VDCs, and monitoring relationship between applications and VDCs. As discussed below in greater detail, creating VDCs entails creating resources on-demand and managed as a pool of virtual resources and controlled through the portal (i.e., an online user interface). Instead of ordering specific line items from a catalog, a VDC is designed with capacity and/or virtual resources and then the CSB platform automatically generates an order for a selected cloud service provider to fulfill the ordered VDC design.

Figure 8A:
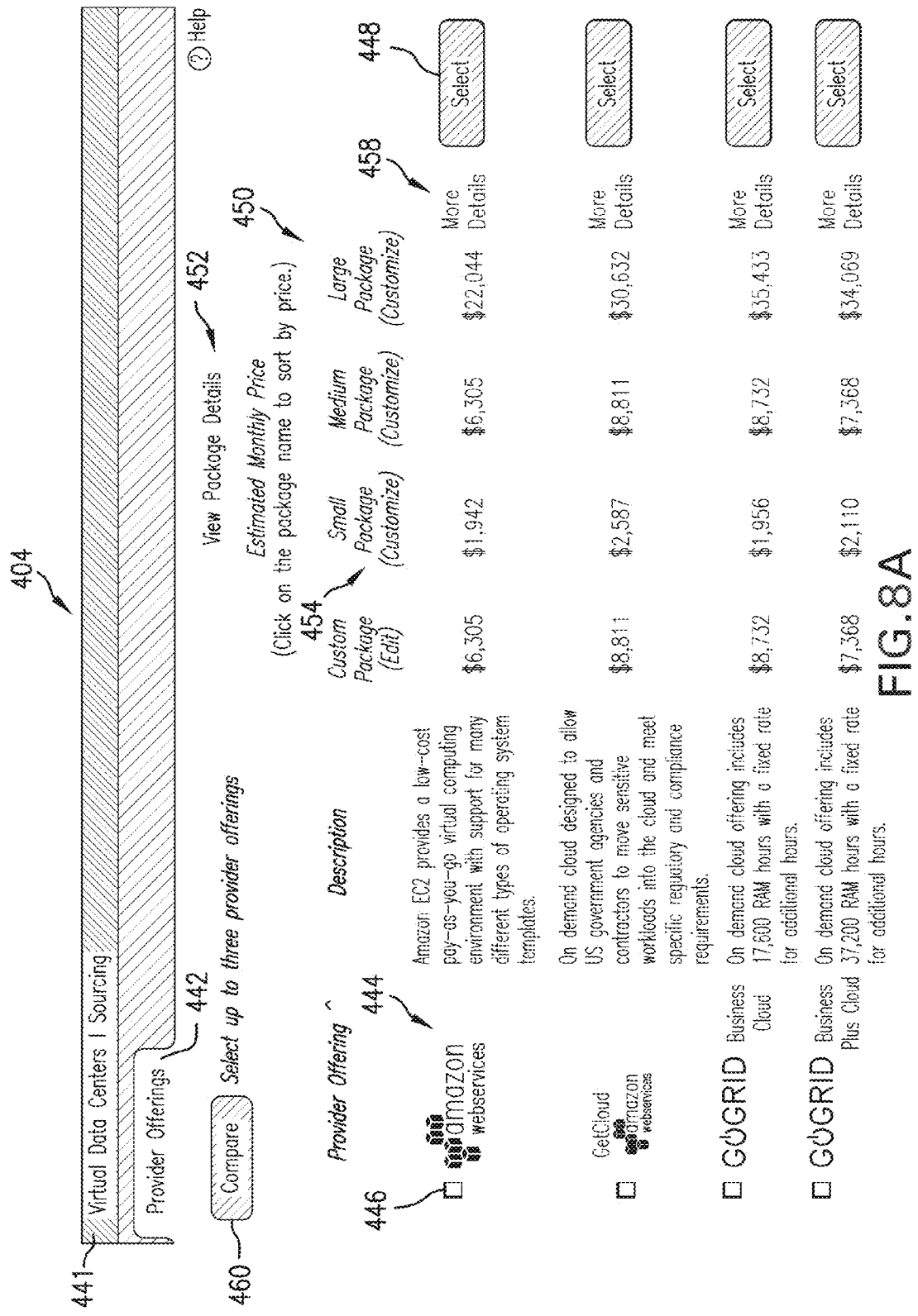
FIG. 8A is an illustrative view of a cloud services sourcing screen of a CSB platform (e.g., a portal thereof) configured in accordance with an embodiment of the present invention.

A sourcing selection 440 (FIG. 7) of the VDC tab 404 takes the user to a sourcing section 441 of the VDC tab 404 for allowing the user to compare cloud provider packages (i.e., VDC package offerings) at a Provider Offering screen 442 (FIG. 8A). At this stage, a user (i.e., a cloud services consumer) is not actually buying, provisioning or fulfilling these packages, but is attempting to identify or map its requirements to a package and use that package to compare which cloud service provider to select. Referring now to FIG. 8A, the user chooses available packages 444 to be compared by selecting (i.e., checking) a plurality of provider offering boxes 446 and then clicks a Select button 448 next to a selected provider offering 444 to bring up the VDC ordering popup with the configuration values already pre-populated. Clicking the Select button 448 simply pre-populates the configuration values in VDC Order screen(s) to enable the comparison and allows the user to specify a package configuration. Each package configuration 450 has an estimated price (e.g., monthly, quarterly or annually) shown. Examples of the package configurations include, but are not limited to, a custom package, a small package (e.g., a relatively small cloud), a medium package (i.e., a medium size cloud), and a large package (i.e., an enterprise level cloud). The used can click a View Sample Solution Package Details button 452 or any package column row header 454 to bring up package details. Each available package has a description 456 of the provider offering 444. For a more detailed description, a user can select a More Details button 458 to cause additional information (i.e., specific package configuration information) on the provider offering 444 to be displayed (i.e., outputted).

Figure 8B:
FIG. 8B is an illustrative view of showing configuration of a custom package that is included as an available package offering in the cloud services sourcing screen of FIG. 8A.

As shown in FIG. 8B, the user creates the custom package through use of a custom package editing screen 443. The custom package can be created by choosing to customize one of the pre-configured packages (e.g., small, medium or large package) on the Provider Offering screen 442 whereby the package customization process entails starting with all or certain package configuration parameter fields of the custom package editing screen 443 populated with configuration parameters based on a selected pre-configured packages and the user editing the configuration parameter of all or a portion of the package configuration parameter fields. Alternately, the custom package can be created by from the ground up whereby the package customization process entails starting with all or certain package configuration parameter fields of the custom package editing screen 443 empty and the user editing the configuration parameter all or a portion of the package configuration parameter fields.

To compare the selected ones of the provider offerings 444 (i.e., those with the provider offering boxes 446 checked), the user clicks the compare button 460 thereby causing a Provider Offerings Comparison screen 457 to be displayed (FIG. 9). Referring now to FIG. 9, the Provider Offerings Comparison screen 457 allows the user to compare a plurality of provider offerings (e.g., up to 3) in a side-by-side manner with key features highlighted for each provider offering. Choosing the select button 462 on the Provider Offerings Comparison screen 457 causes the user to be directed to a VDC Ordering Pop-up screen (not shown) with the configuration values already pre-populated based on your selection.

Comparisons between provider offerings can be sorted into broad categories of usage for Small, Medium, and Large VDCs. For example, if the user is running a public catalog website, it may need only two application servers, one database server, and one VPN server, whereas an enterprise-class application with thousands of concurrent users may have 20 web servers, 20 application servers, 12 database servers, and 8 VPN servers, with vastly increased memory, CPU, network, and storage requirements. It is acceptable for the users exact requirements to vary from a particular the sample package. The user can simply pick the package that is closest to its needs and alter that package as part of the design process that is similar to the Add New VDC process discussed below.

Examples of comparison parameters include, but are not limited to, Description (e.g., a brief description of the provider offerings); Virtual Machine (e.g., summary of the RAM (in GB), CPUs, and local storage (usually in GB) included in the provider offering, which can be adjusted later during an Add Resource Group process); Network (e.g., overview for the bandwidth, VLANs, minimum guaranteed throughput, pricing model for network traffic, server load balancer and private network provisions for the provider offerings); Storage (e.g., overview of the architecture, snapshots, backup policy, and shared storage for the provider storage offerings); Security (e.g., summary of firewall and intrusion detection/prevention for provider offerings); SLA (e.g., what uptime does the provider guarantee for their offering).; Operating System (e.g., which operating systems the provider has available for its VMs, particular variety of OS, any restrictions on uploading your own image to a "blank" server); Provisioning Time (e.g., time for the provider to provision VDCs and VMs, which frequently can assume that configuring the first VDC created will take more time than subsequent VDCs); Support (e.g., provider support policies); Location (e.g., Geographical location of the provider's physical data center); and Pricing (e.g., Provider pricing for small, medium and large packages). The values of comparison parameters represent entries of a particular service e provider offering in a catalog (e.g., service provider offering portion thereof) configured in accordance with an embodiment of the present invention.

Figure 10:
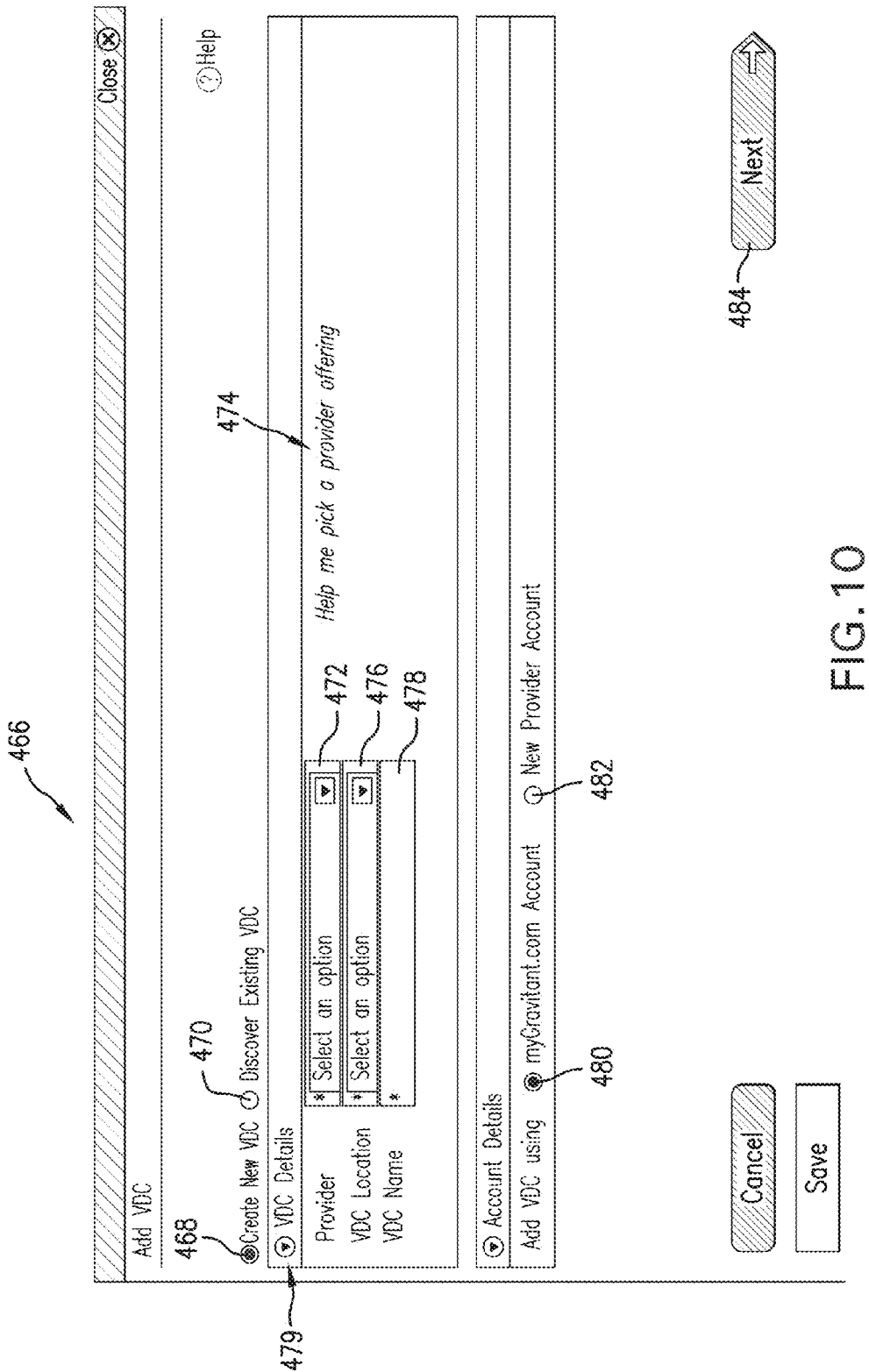
FIG. 10 is an illustrative view of a virtual data center (VDC) pop-up screen of a CSB platform (e.g., a portal thereof) configured in accordance with an embodiment of the present invention.

Instead of ordering line items from a catalog, a user (e.g., a cloud service consumer) can design a customized VDC with capacity and/or virtual resources. Thereafter, the user can cause the CSB platform (i.e., system configured in accordance with the present invention) to automatically generate an order for a selected cloud service provider to fulfill the VDC design order. To this end, the user can select an add VDC selection 464 (FIG. 7) of the VDC tab 404 for causing a Virtual Data Center Pop-up screen 466 (FIG. 10) to be displayed. Referring now to FIG. 10, the Virtual Data Center Pop-up screen 466 enables the user to create an entirely new VDC by selecting a create new VDC button 468 or discover an existing VDC that it has already created (e.g., outside the portal using provider tools) by selecting a discover existing VDC button 470. As discussed below in greater detail, pulling in an existing VDC can be implemented by the user being instructed to first discover the existing VDC, then replicate information of the existing in the portal, and then synchronize all its existing VMs to the portal using a sync process. Clicking the Save button 468 during any point after the user has named the VDC causes that names VDC to appear in the My Virtual Data Centers list in the Recently Updated Resource section 416 of the home navigation tab 402 (FIG. 7) with a status indicated as being "Created".

Figure 11:
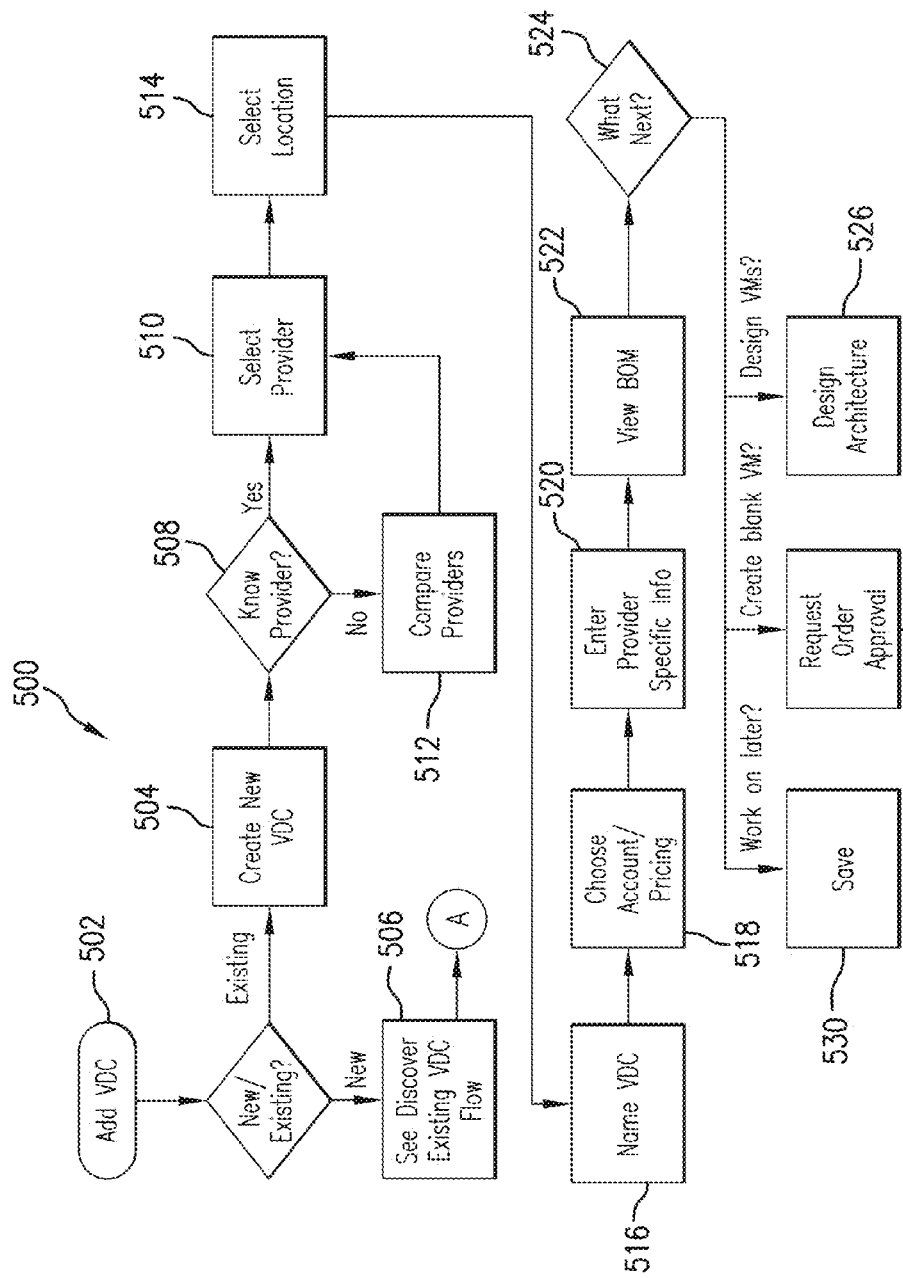
FIG. 11 is a flow diagram view showing a method for setting up a VDC in accordance with an embodiment of the present invention.

Referring to FIGS. 10 and 11, a method 500 (FIG. 11) for setting up a VDC is shown. A step 502 is performed for selecting the Add VDC button 464 of the VDC tab 404 (FIG. 7) for causing the Virtual Data Center Portfolio Pop-up screen 466 (FIG. 10) to be displayed. The user has the choice of performing a step 504 for selecting the create new VDC button 468 for creating a new VDC or performing a step 506 for selecting the discover existing VDC button 470 for setting up a VDC based on an existing VDC that has been created outside of the CSB platform 202.

When setting up a new VDC, a step 508 is performed for querying the user if the cloud service provider for the VDC is known or not. If the cloud service provider for the VDC is known, a step 510 is performed for enabling the user to select the provider at the provider entry box 472 of the Virtual Data Center Portfolio Pop-up screen 466 (FIG. 10). If the cloud service provider for the VDC is unknown, the user can select Help Me Pick A Provider button 474 of the Virtual Data Center Portfolio Pop-up screen 466 in FIG. 10 thereby implementing a step 512 for enabling the user to determine a desired cloud service provide (e.g., via the comparison method discussed above in reference to FIGS. 8 and 9). Once the desired provider is determined, the step 512 is performed for enabling the user to select the provider at the provider name box 472 in conjunction with a step 514 being performed for enabling the user to select a VDC location at a VDC location box 476 of the Virtual Data Center Portfolio Pop-up screen 466 (FIG. 10) and a step 516 being performed for enabling the user to name the VDC at the VDC name box 478 of the Virtual Data Center Portfolio Pop-up screen 466 (FIG. 10). The provider name box 472, the VDC location box 476 and the VDC name box 478 are within a VDC details section 479 of the Virtual Data Center Portfolio Pop-up screen 466 (FIG. 10).

The user is then prompted to perform a step 518 for choosing whether to add the newly created VDC using an existing cloud consumer account by selecting an existing cloud consumer account button 480 of the Virtual Data Center Portfolio Pop-up screen 466 (FIG. 10) or a new provider account by selecting a new provider account button 482 of the Virtual Data Center Portfolio Pop-up screen 466 (FIG. 10). If adding the newly created VDC using a new provider account, the user also chooses pricing details. The account options provider name box 472, the VDC location box 476 and the VDC name box 478 are within a VDC details section 479 of the Virtual Data Center Portfolio Pop-up screen 466 (FIG. 10).

A step 520 is performed for enabling the user to enter provider-specific information. Examples of provider-specific information include, but is not limited to, information related to capacity being charged based on reserved capacity, supporting bursting at additional cost based on the bursting amount needed; information related to a number of resources that can be created and their actual utilization counts toward reserved capacity; information related to resources being charged based on hourly metering of the allocated capacity turned on; information related to each resource being allocated and turned on being charged independently; information related to capacity not being pre-ordered whereby managed physical servers are required for applications or middleware that cannot be installed on virtual resources; information related to VDCs not requiring reserved capacity; and information related to package plans based on RAM hours and data transfer with pay-as-you-go or monthly/annual pre-pay options.

The user is then prompted to select the Next button 484 of the Virtual Data Center Portfolio Pop-up screen 466 (FIG. 10) and a step 522 is performed for enabling the user to view Bill of Materials (BOM) information 486 for the new VDC. The BOM information 486 is displayed in a BOM details information section 488 of the Virtual Data Center Portfolio Pop-up screen 466 as shown in FIG. 10. For example, the BOM information can be a consolidated bill with any and all orders that the user has modeled. A step 524 is then performed for giving the user the option of performing a step 526 for initiating a design architecture process for designing VMs that the user would like to provision, performing a step 528 for requesting order approval to send the order through an approval process, or a step 530 for saving the order and optionally taking the user back to the Virtual Data Center screen 466 to model a VMs and/or additional services.

Figure 13:
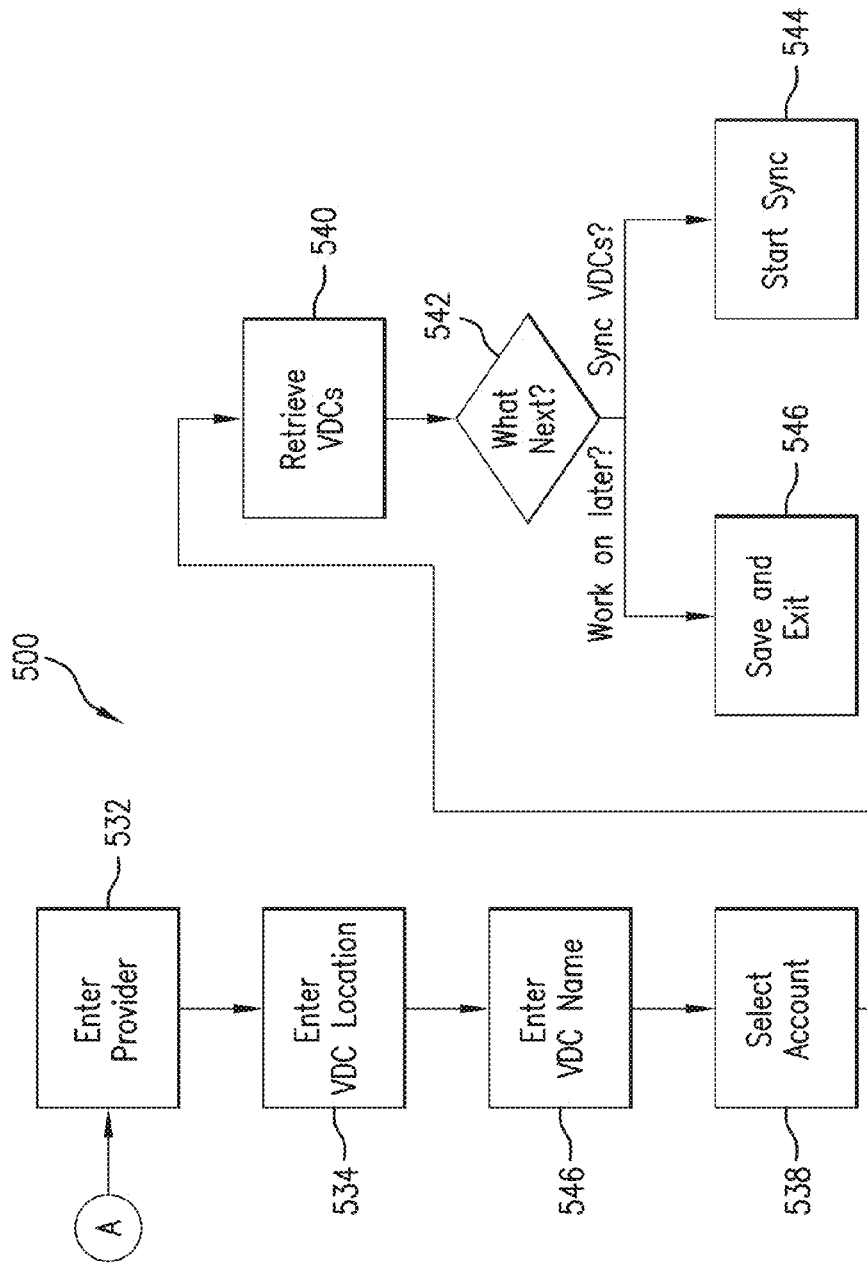
FIG. 13 is a flow diagram view showing a method for discovering an existing VDC in accordance with an embodiment of the present invention.

Referring now to FIG. 13, when selecting the discover existing VDC button 470 for setting up a VDC based on an existing VDC that has been created outside of the CSB platform 202, the method 500 performs a step 532 for enabling the user to enter a provider at a provider entry box of a screen similar to the Virtual Data Center Portfolio Pop-up screen 466 (FIG. 10), performs a step 534 for enabling the user to enter a VDC location at a VDC location box of a screen similar to the Virtual Data Center Portfolio Pop-up screen 466 (FIG. 10), and performs a step 536 for enabling the user to enter a name of the VDC at a VDC name box of a screen similar to the Virtual Data Center Portfolio Pop-up screen 466 (FIG. 10). A step 538 is performed for enabling the user to enter provider account information (e.g., credentials) at a provider account entry box of a screen similar to the Virtual Data Center Portfolio Pop-up screen 466 (FIG. 10). A step 540 is then performed for verifying the provider account information and retrieving the VDC(s) in response to the provider account information being successfully verified. A step 543 is performed for enabling the user to enter sync and/or provisioning properties at a synch/provisioning properties box of a screen similar to the Virtual Data Center Portfolio Pop-up screen 466 (FIG. 10). For example, the user can choose whether or not to include public or VPC (Virtual Private Cloud) resources. A step 542 is then performed for giving the user the option of performing a step 544 for enabling the user to start a process for synchronizing selected VDCs to the portal or an operation 546 for saving the gathered information and taking the user back to the Virtual Data Center Portfolio Pop-up screen 466.

Referring back to FIG. 11, when the step 526 is performed for initiating the design architecture process, the method 50 takes the user to an IT Architecture page of the VDC tab 404 (discussed below in greater detail). The IT Architecture page provides a composite (e.g., single pane of glass) view to model and provision resources and services from different providers. Once the user is finished designing its IT architecture, the user can access the BOM details information section 488 of the Virtual Data Center Portfolio Pop-up screen 466 to view its entire order, including VDC, resources and services and the associated line items from the service catalog grouped by VDC and service providers.

Referring back to FIG. 11, when the step 528 is performed for requesting order approval to send the order through the order approval process, the BOM details information section 488 of the Virtual Data Center Portfolio Pop-up screen 466 appears and shows a consolidated bill detailing all items that have been created. The detail line items will also be priced and a total monthly recurring cost calculated. For every line item, the charge can be a fixed monthly recurring charge (MRC), an estimated usage charge, or a non-recurring charge (NRC or one-time charge). Usage-based charges are based on actual resources utilization. Unit and Unit Price indicate the utilization units and price used to measure how line items are charged. Quantity represents the actual utilization values by which the unit price is multiplied. When line items have a unit-based charge, the default estimated usage charge can assume the resource is fully utilized for the entire calendar month.

The order approval process requires that the VDC order goes through Technical, Legal, and Financial approval before the order can officially be placed. In this regard, a Technical Approver, Legal Approver, and Financial Approver must approve the order for enabling the order to be placed. Orders can include a VDC, virtual machines, applications and services, which can all be modeled using a CSB platform configured in accordance with an embodiment of the present invention (e.g., the CSB platform 202). Workflow of the order approval can be customized by assigning multiple customer roles to a single user. For example, if the user's role includes Technical Approver and Financial Approver roles, the appropriate Technical and Financial checkboxes in an order approval pop-up screen would be enabled, which can then be selected in a single step for approving the order. A comment box allows can be provided for enabling a user to communicate with other users (e.g., approvers) and leave comments shown in an Order History view for an order. The Order History view shows all of the approvals that have been recorded. Once current status changes to "Approved" (i.e., after all approvals have been obtained), the user can place the order for processing.

After the order approval process is successfully completed, the VDC order can be placed by selecting a Place Order button on an appropriate screen. In response, the order status changes to Submitted and the VDC order is sent to forwarded from the CSB platform 202 the appropriate cloud service provider. A CSB platform administrator communicates with cloud service provider to ensure proper order fulfillment and updates status progress. After submitting the new order (either the first initial order or any change order), status changes to Order in Progress. Once the order has been fulfilled, the VDC order status changes to Active.

Figure 12:
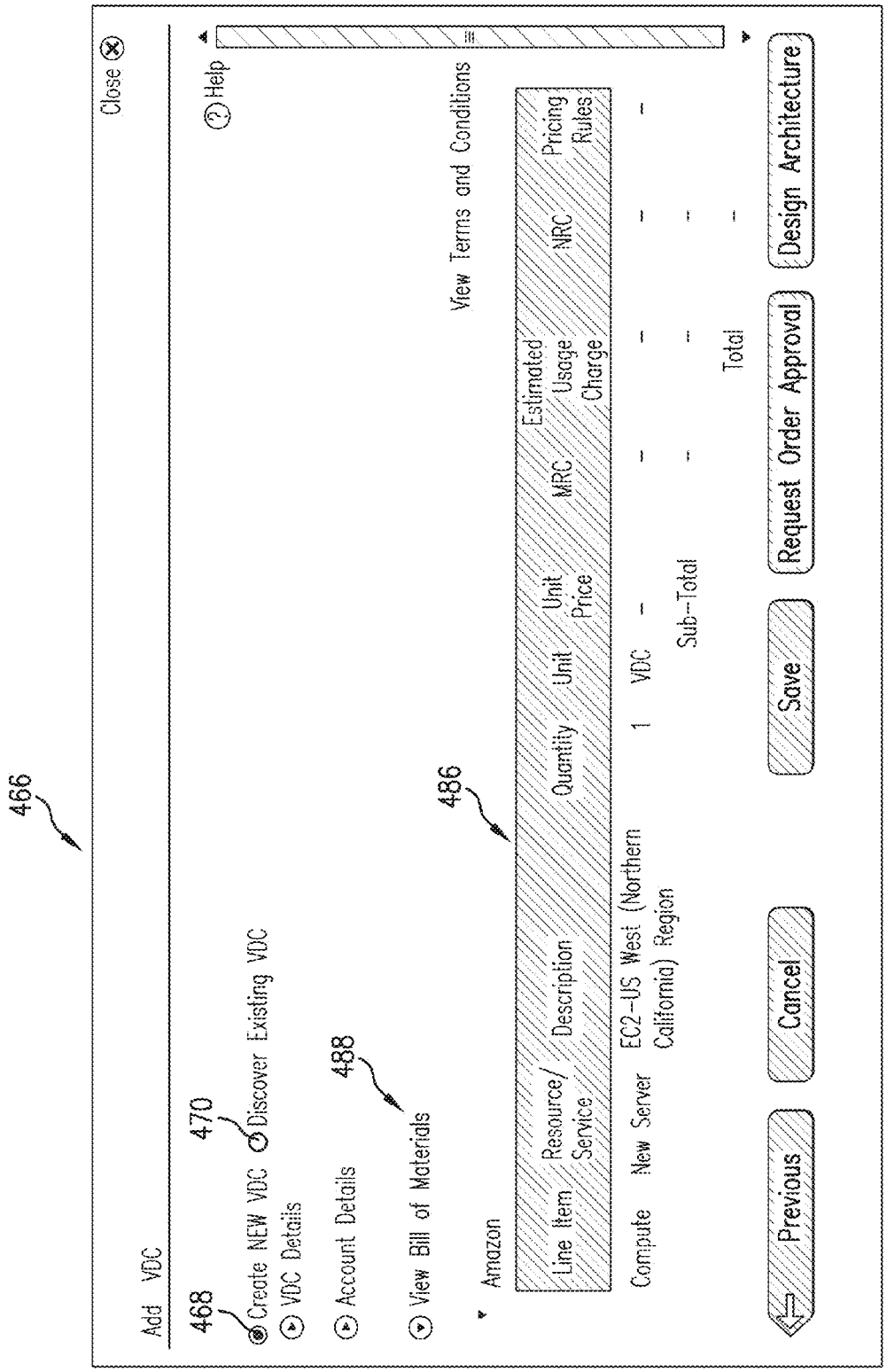
FIG. 12 is an illustrative view of a BOM details information section of the virtual data center (VDC) pop-up screen shown in FIG. 10.
Figure 14:
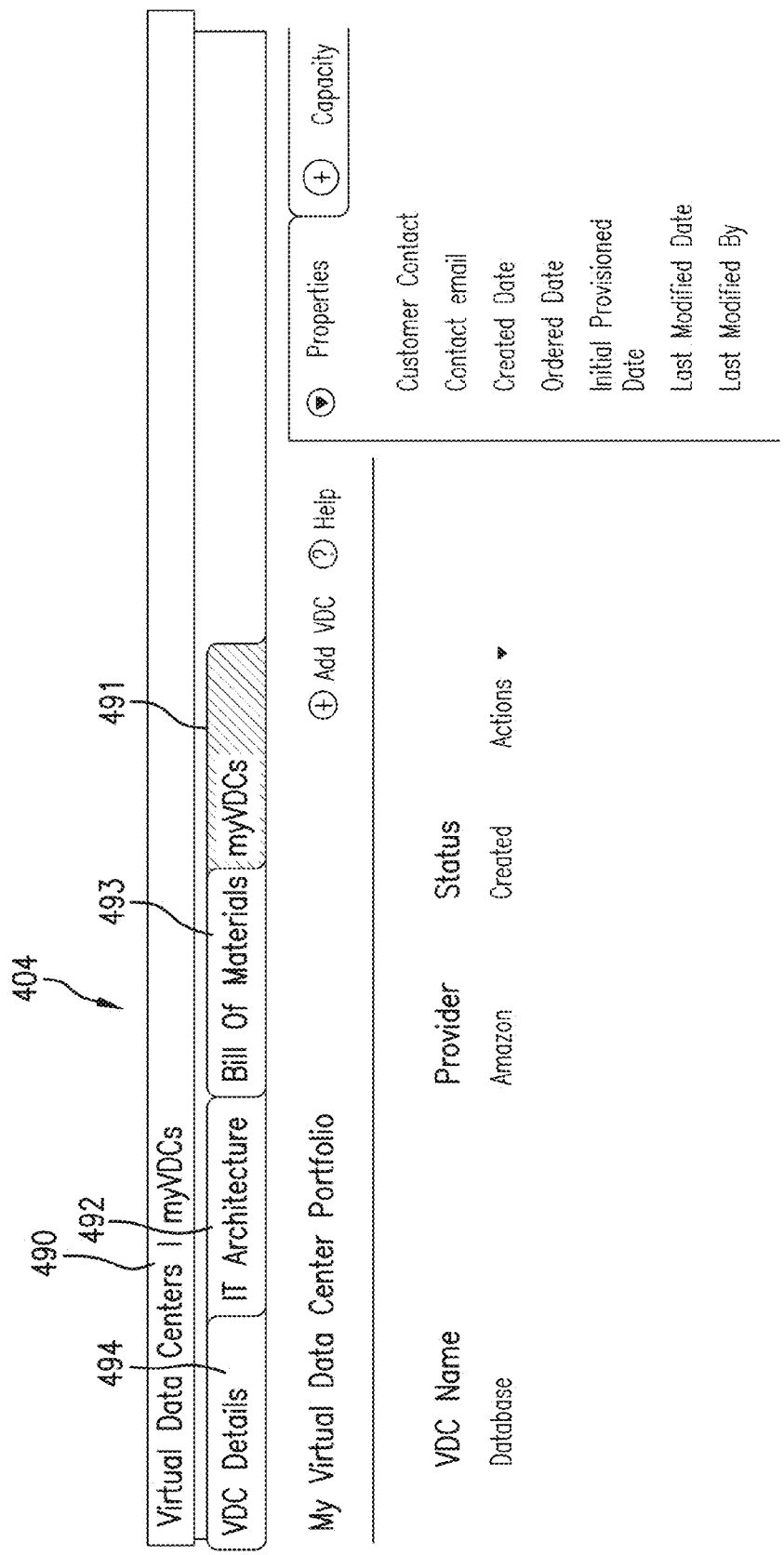
FIG. 14 is an illustrative view of a my VDCs page in a my VDCs section of a VDC tab of a CSB platform (e.g., a portal thereof) configured in accordance with an embodiment of the present invention.
Figure 15:
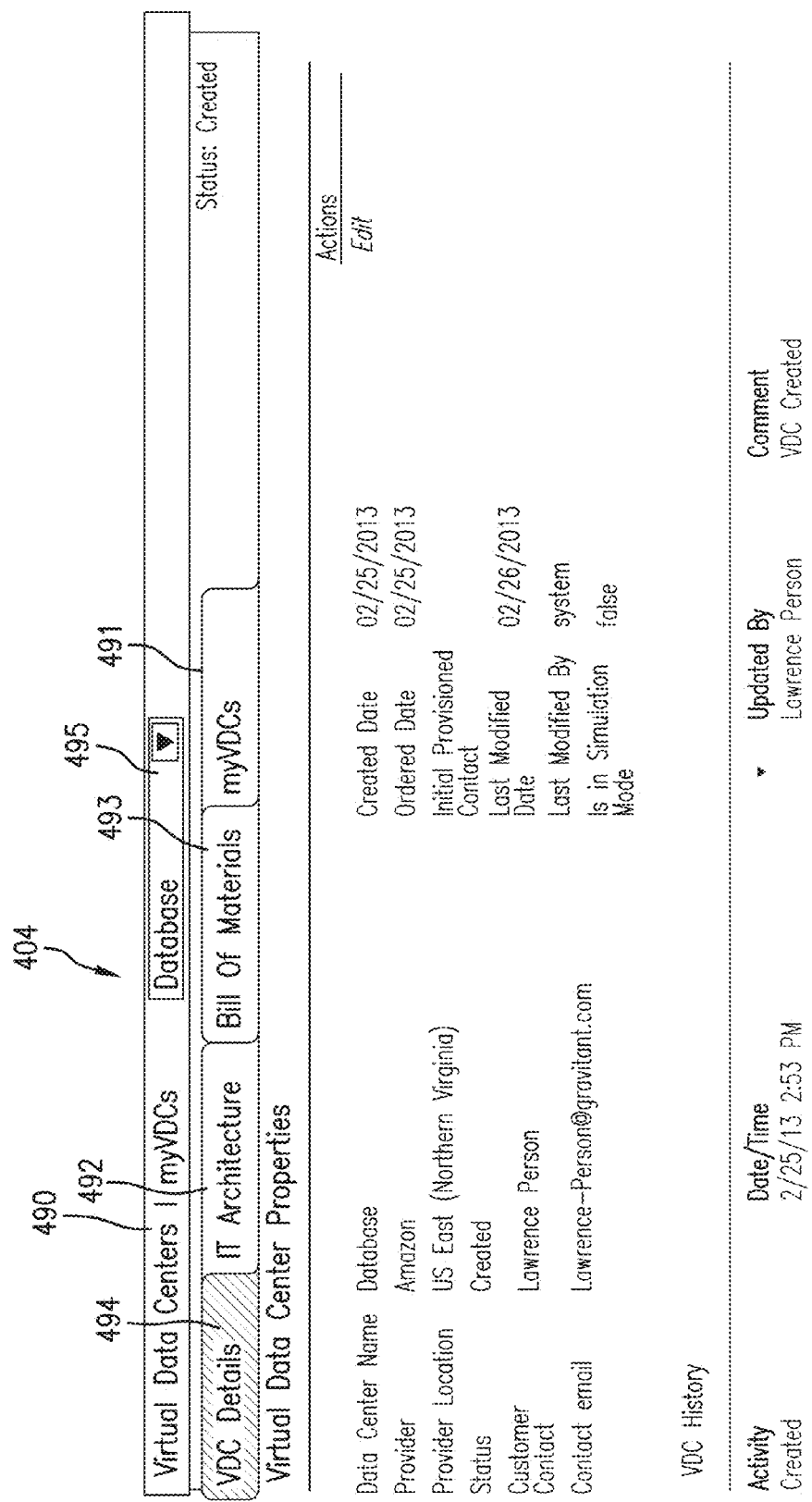
FIG. 15 is an illustrative view of a VDC Details page in the myVDCs section of FIG. 14.

Through a suitable action (e.g., selection of a myVDCs selection 465 at the VDC tab 404), the user is presented with a myVDCs section 490 of the VDC tab 404, as shown in FIGS. 14 and 15. At a myVDCs page 491 in the myVDCs section 490 (FIG. 14), the user's VDCs are listed along with their corresponding status (e.g., Created, Approval in Progress, Order In Progress, Provisioning In Progress, Changes Pending, Active, Inactive). If the status of any particular VDC sis Created or Active, resources can be modeled through on an IT Architecture page 492 of the VDC tab 404, as discussed below in greater detail. The BOM information discussed above in reference to FIG. 12 can be accessed via the Bill of Materials page 493 of the VDC tab 404. A VDC Details page 494 of the VDC tab 404 shows various properties and actions available for a selected VDC (e.g., VDC named "Database" selected within drop down menu 495 of the VDC Details page 494). Advantageously, as discussed below in greater detail, certain ones of the pages of one screen are also a viewable page option of another screen (e.g., the IT Architecture page 492 is a viewable option within the VDC tab 404 and within the Applications tab 406).

Figure 16:
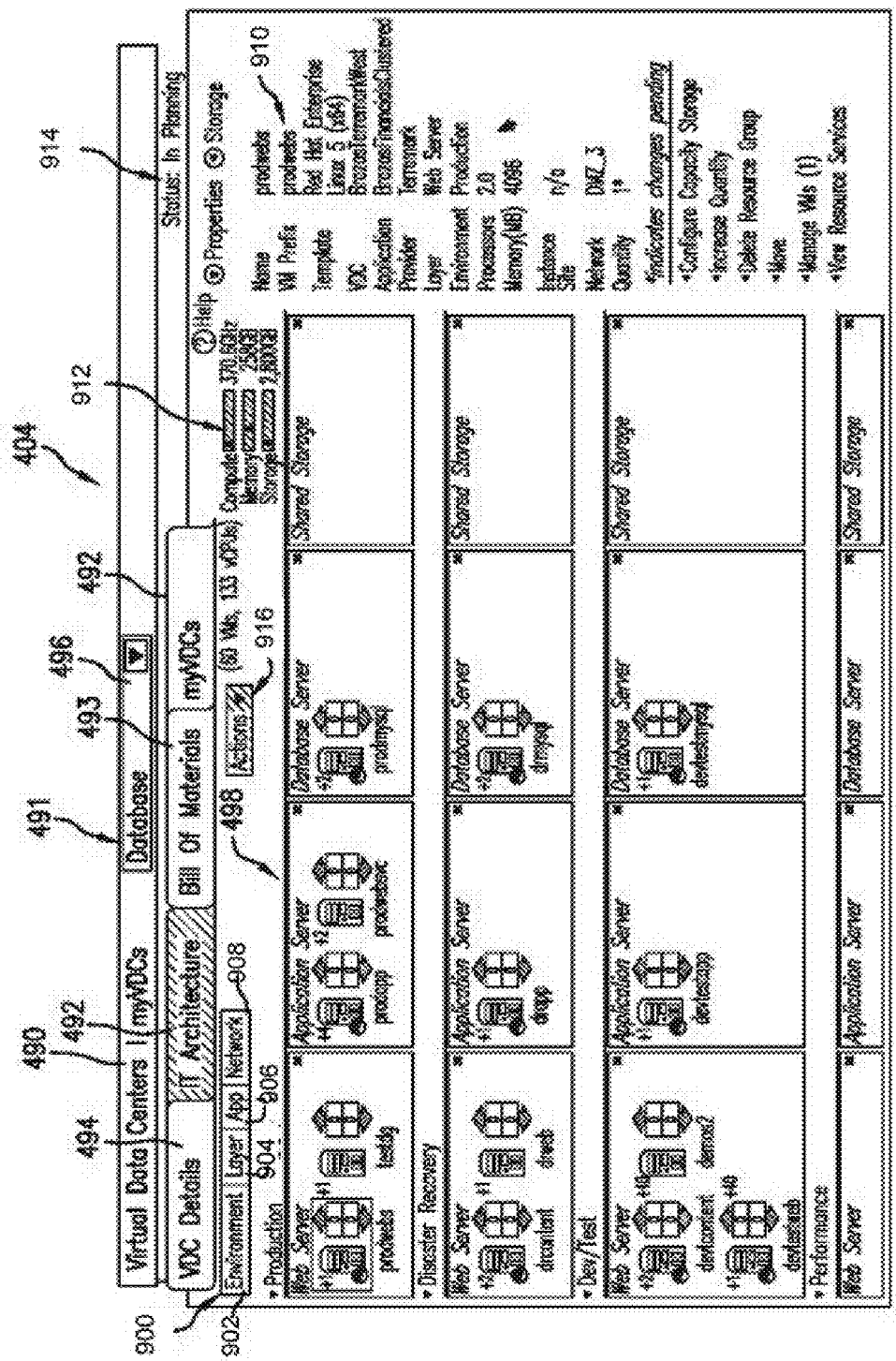
FIG. 16 is an illustrative view of an IT architecture page in a myVDCs section of a VDC tab of a CSB platform (e.g., a portal thereof) configured in accordance with an embodiment of the present invention, wherein the VDC information depicted in an architecture layout is filtered by environment and layer.

Referring now to FIG. 16, an IT Architecture page 492 of the VDC tab 404 is shown. The IT Architecture page provides a composite (e.g., single pane of glass) view of an architecture layout 498 of resources within a selected VDC (i.e., as designated at a VDC dropdown list 496), enables comprehensive service aggregation, and enables the user to model and provision VDC resources and services from different providers. In essence, the IT Architecture page 492 provides the user with a cloud level view of the resources that populate its cloud (i.e., provides an illustrative depiction of what is in the user's cloud(s)). The IT Architecture page 492 enables the user to create resources and resource groups. All resources are assumed to be in a resource group, even if there is only one resource in the group. Resource groups can be assigned to an architectural layer such as, for example, a Web Server layer, an Application Server layer, a Database Server layer, a Shared Storage layer, a LDAP layer, or the like. Resource groups can also be assigned to an application environment such as, for example, a Development environment, a Test environment, a development/test environment, a performance environment, a disaster recovery environment, or the like.

Advantageously, assignment of resources to a respective architectural layer and a respective application environment allow the resources of each VDC (and network on which the VDC is hosted) to be presented to the user in a plurality of different resource views 900. As shown in FIG. 16, at the VDC tab 404, these views include, an Environment view 902, a Layer view 904, an Application view 906, and a Network view 908. Furthermore, selection of a given one of the layers 902-908 allows multi-level filtering on a per-view basis. For example, the architecture layout 498 in FIG. 16 is filtered with the environment view 902 as a primary filter and the layer view 904 as a secondary filter. It should also be understood that the layers can be defined on a per-tab basis. For example, in the VDC tab, the Application view 906 is available whereas, when the IT Architecture page 492 is accessed from within the Application tab 406 (FIG. 7), the Application view 906 is replaced with a VDC view (i.e., resources filtered based on the VDC in which they are a resource).

Resource group specification information 910, resource group utilization information 912, and resource status information 914 is presented at the IT Architecture page 492. Examples of the group specification information 910 include, but are not limited to, VM name, VM prefix, VDC template name, application name, provider name, environment name, processor specification, memory size, network name, VM quantity and the like. Examples of resource group utilization information includes, but are not limited to, compute resource (e.g., CPU) utilization amount, memory resource (e.g., RAM) utilization amount, and storage (e.g., harddrive, flash, etc) utilization amount. Examples of resource status information includes, but are not limited to, created, in planning, order in progress, provisioning in process, active, changes pending, inactive, submitted, approval in process, submitted to provider, and the like.

At the IT Architecture page 492, the user can manage resources such as, for example, though use of the Action menu 916. Examples of Resource Group management actions include, but are not limited to, configuring capacity/storage (e.g., increase the amount/quantity of processors, memory, network bandwidth, storage, etc); increasing quantity of a VM; deleting a resource group; moving selected resources between VDCs, environments, or layers; managing VMs parameters (e.g., name, status, capacity, login password and IP address, etc); controlling power state of VMs (e.g., power on, power off, reboot). Examples of VDC management actions include, but are not limited to, adding resource groups (e.g., VMs), adding VMs to a VDC, a adding resources or services to a VM; viewing services configured to a VDC as well as service provider and the service status; provisioning changes made to a VDC; connecting into a VDC using a VPN connection; viewing activity logs for a VDC; and synching to an existing VM.

Figure 17:
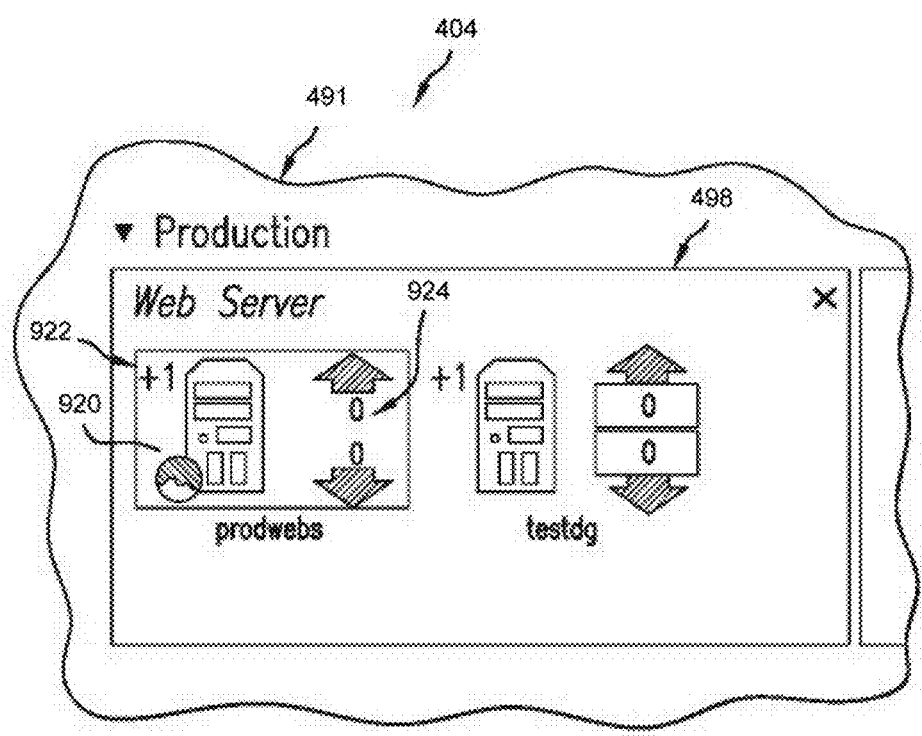
FIG. 17 is an illustrative view of a virtual machine (VM) within the architecture layout shown in FIG. 16.

FIGS. 16 and 17 show that resource groups of each environment (e.g., Production environment, Disaster Recover environment, Dev/Test environment, Performance environment, etc) are associated with respective layers (e.g., Web Server layer, Application Server layer, Database Server layer, etc). Each resource (e.g., the selected resource group 920 in FIG. 17) shows a VM quantity indicator 922 and a VM status indicator 924. The VM quantity indicator 922 is visible in statuses such as Planning to show the number of VMs that are in the resource group. As the VMs are provisioned and brought to an active status, the VM quantity indicator 922 is decremented and the VM status indicator 924 shows the number of VMs that are active (e.g., powered up as indicated by number next to up arrow) and the number that are not powered up (e.g., not powered up (e.g., inactive) as indicated by number next to down arrow). For example, the VM quantity indicator 922 for the selected resource group 920 indicates that this resource group has one (1) VM (i.e., indicated by "+1") and the VM status indicator 924 for the selected resource group 920 indicates that VM is not yet provisioned (i.e., indicated by "0" next to the up and down arrows and thus is not active or inactive. Once provisioning is complete, the +1 will be removed and the VM status indicator 924 will indicate that the VM is active (i.e., indicated by "1" next to the up arrow) or, if so set, inactive (i.e., indicated by "1" next to the down arrow). Accordingly, one can see that the VM quantity indicator 922 and the VM status indicator 924 (and other information in the VDC tab 404) jointly provide information as to a number of VMs in a resource group, the provisioning status of a resource group (e.g., the VMs thereof), the activity status of the resource group (e.g., the VMs thereof once provisioned), and a current status of a VDC comprising the resource group.

Applications Tab

The Applications tab 406 (FIG. 7) provides functionalities related to creating, editing and managing applications. Examples of applications include, but are not limited to, custom business applications, IT applications, third-party applications and SaaS applications. Through the Applications tab 406, a user can perform actions such as, for example, creating new applications, map virtual data centers to applications; define, view and manage application architecture within a single VDC or across multiple VDCs; and associate applications with virtual resources. When a resource is associated to an application and VDC, mapping created automatically between that application and the VDC enables collaboration and orchestration of Application resources for many users.

Figure 18:
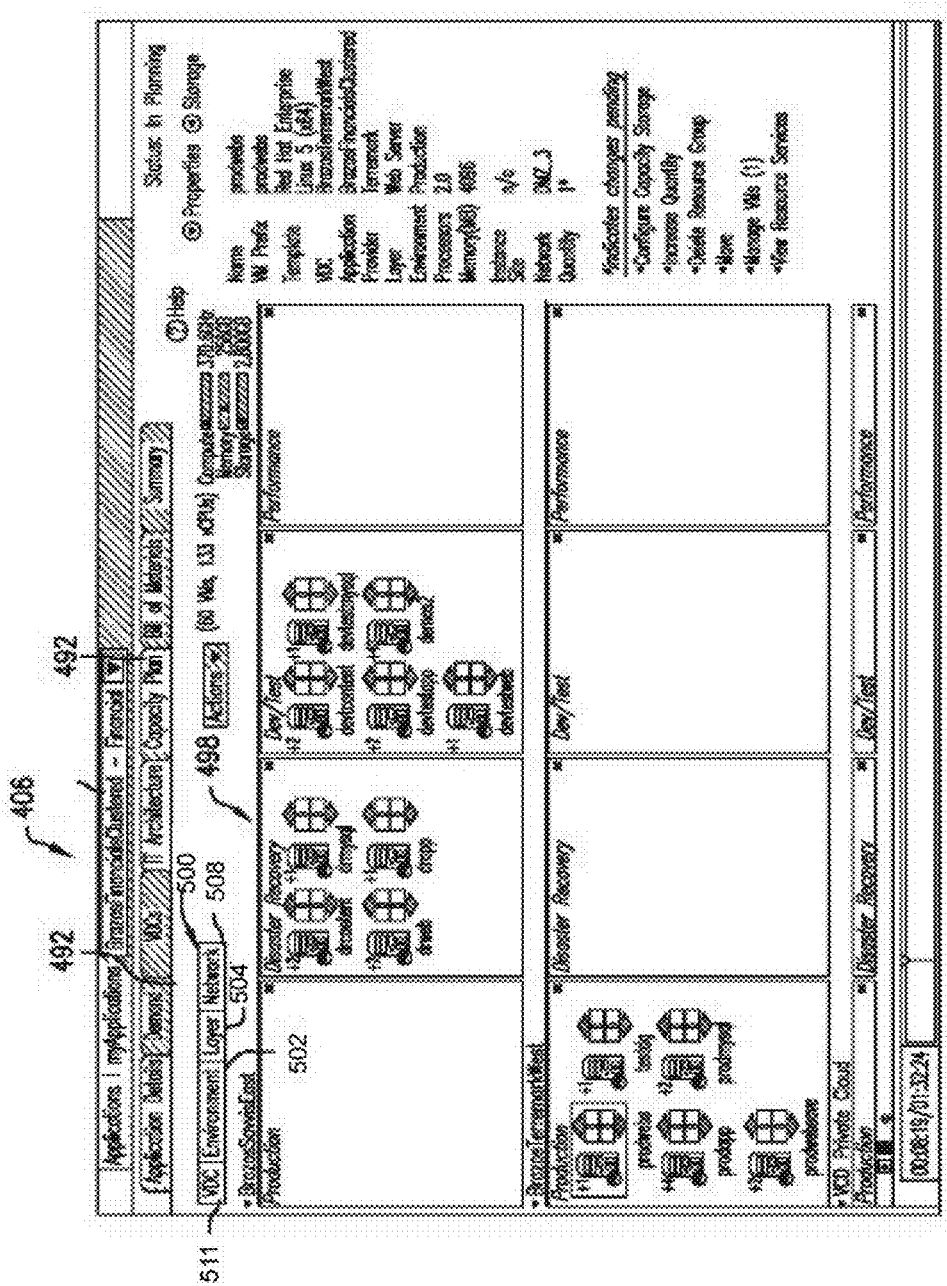
FIG. 18 is an illustrative view of an IT architecture page in a my Applications section of an Applications tab of a CSB platform (e.g., a portal thereof) configured in accordance with an embodiment of the present invention, wherein the VDC information depicted in an architecture layout is filtered by VDC and environment.

Through a suitable action (e.g., selection of a myApplications selection at the Applications tab 406), the user is presented with a myApplications section 950 of the Applications tab 406, as shown in FIG. 18. As shown in FIG. 18, various information pages can be accessed via the myApplications section 950 of the Applications tab 406. Examples of these pages include an applications details page, a demand page, a VDC, page, an IT architecture page, a capacity plans page, a bill of materials page, and a summary page. Advantageously, at least a portion of this information is presented in the context of the available applications (e.g., on a per-application basis). For example, as discussed above in reference to the VDC tab 404, the IT Architecture page 492 (FIG. 16) can be accessed from within the Application tab 406. In this regard, IT architecture functionalities such as those discussed above in reference to the VDC tab 404 can be performed from the myApplications section 950 via the IT Architecture page 492. As discussed above in reference to the VDC tab 404, assignment of resources to a respective architectural layer and a respective application environment allow the resources of each VDC (and network on which the VDC is hosted) to be presented to the user in a plurality of different resource views 900. As shown in FIG. 18, at the Applications tab 406, these views include, the Environment view 902, the Layer view 904, the Network view 908 and the VDC view 911. In this regard, in the Applications tab 406, the IT Architecture page 492 provides a composite view of the architecture layout 498 of resources within a selected Application (i.e., as designated at a application dropdown list 952), enables comprehensive service aggregation, and enables the user to model and provision VDC resources and services from different providers.

At an Applications Details page 954 (e.g., assessed by a corresponding selection at the myApplications section 950) on the Applications tab 406, the user can view application properties information, application classification information and application history information on a per-application basis. Examples of the application properties information includes, but are not limited to, name of the application; name of a scenario associated with the application; a description of the application; an architecture type (e.g., Java N-Tier, Java Client-Server, .NET N-Tier, .NET Client Server, etc); status of the application (e.g., Created, Provisioning in Progress, Active, Changes Pending, and Inactive); a date the application was first created; contact information for a person associated with the application; and revision information for the application. The application classification information relates to application templates, supported environments (e.g., Development, Disaster Recovery, Production and Test), and architectural layers (e.g., Application Server, Database Server and Web Server). The application history information relates to history of edits to a selected application. Examples of the application history information includes, but are not limited to activity carried out on the application; date and time an activity occurred; the user updating the application; and description of the change.

CSB Catalog

As disclosed above, one advantageous aspect of the present invention is the services catalog that includes services from available public cloud providers. As previously disclosed, a cloud service consumer can use a private cloud catalog and service package template to quickly operationalize an enterprise CSB solution. For example, a cloud services catalog and asset manager module of a CSB platform configured in accordance with an embodiment of the present invention enables (e.g., via the CSB platform access portal) command and control services that are critical to successful adoption and acceptance of the cloud services model (i.e., cloud services catalog and asset manager functionality). Furthermore, a resource solution center of a CSB platform configured in accordance with an embodiment of the present invention can serve as a single point (e.g., one-stop) source for all of virtual resource services needs of a user of the CSB platform. To this end, the resource solution center is configured to correlate service catalog line items to an available cloud service selection (i.e., a resource context). In this regard, a services catalog configured in accordance with an embodiment of the present invention is highly customizable.

Broadly speaking, the catalog supports an abstraction of marketplace services and categorizations that then maps to provider specific catalog line items. In this regard, a cloud services catalog provides a service abstraction that can map to one or more provider services/line items. Additionally, attributes that are specific to cloud service consumers such as, for example, pricing rules, security, and access constraints can be defined in the same catalog. This allows for a high degree of function and flexibility. This also simplifies maintenance as well as enables comparison of cloud services and plans from different providers. One example of an attribute of a CSB platform that is provided via a catalog configured in accordance with an embodiment of the present invention relates to contract based pricing for cloud business models (e.g., reserved capacity, pay-as-you-go, memory plans, bursting, VM based pricing, etc. along with discounts, upcharges, business management fees, and spend based fees). Another example of an attribute of a CSB platform that is provided via a catalog configured in accordance with an embodiment of the present invention relates to on-going daily synchronization of certain catalog components that are rapidly changing in the cloud world (e.g., a list of AMIs (Amazon Machine Images) is synchronized on a periodic scheduled basis (e.g., nightly)). Another example of an attribute of a CSB platform that is provided via a catalog configured in accordance with an embodiment of the present invention relates to cloud services business models, legal agreements (e.g., flow-through terms, pricing rules for the cloud supply chain to accommodate upcharges & management fees for different entities in the supply chain such as resellers, distributors, System Integrators, CSB Operators, etc).). Another example of an attribute of a CSB platform that is provided via a catalog configured in accordance with an embodiment of the present invention relates to cloud service abstraction that maps to underlying cloud provider catalog line items. This enables a consumption view of a cloud service that maps to one or more cloud provider catalog line items and also enables an aggregated or composed service that goes across multiple cloud provider line items (e.g., a value added service by an SI that is made of a set of underlying provider services bundled with a managed service and support services provided by the SI with a unique cost model that is different from that of the provider service(s). Another example of an attribute of a CSB platform that is provided via a catalog configured in accordance with an embodiment of the present invention relates to multi-tenancy support in the form of consumer-specific views of the catalog (e.g., across services, providers, pricing and branding), provider-specific line item management (e.g., data import/export/user interface/API) and CSB operator management capabilities (e.g., publishing a private cloud instance into a set of cloud services, templates for converting a private cloud instance into a set of cloud services for consumption, and the like).

Referring now to FIGS. 19-22, a method for adding a service provider to a catalog of the CSB platform 202. For example, through a suitable action (e.g., selection of an add provider selection at a catalog management tab of the CSB platform 202 (e.g., a portal thereof), a provider screen 700 (FIG. 19) of a catalog management section 702 of the catalog management tab is displayed. The provider screen 700 includes provider details 704 for providers that are currently configured within the CSB platform and includes an Add Provider button 706 for enabling new providers to be added. Selection of the Add Provider button 706 causes a process for creating a new provider within the service catalog of the CSB platform 202 to be initiated. A provider information pop-up screen 708 (FIG. 20) is displayed for enabling provider information 710 to be entered. A provider properties pop-up screen 712 (FIG. 21) is displayed for enabling provider properties 714 to be entered. A provider terms and conditions pop-up screen 716 (FIG. 22) is displayed for enabling provider terms and conditions 718 to be entered. The provider information 710, the provider properties 714, and the provider terms and conditions 718 are then used for creating a new provider offering within the service catalog of the CSB platform 202.

Referring now to FIGS. 23-26, a method for adding a service provider plan to a catalog of the CSB platform 202. For example, through a suitable action (e.g., selection of an add provider plan selection at the catalog management tab of the CSB platform 202 (e.g., a portal thereof), a plans screen 730 (FIG. 23) of the catalog management section 702 of the catalog management tab is displayed. The provider screen 730 includes provider plan details 734 for providers that are currently configured within the CSB platform and includes an Add Plan button 736 for enabling new provider plans to be added. Selection of the Add Plan button 736 causes a process for creating a new provider plan within the service catalog of the CSB platform 202 to be initiated. A plan information pop-up screen 738 (FIG. 24) is displayed for enabling plan information 740 to be entered. A plan properties pop-up screen 742 (FIG. 25) is displayed for enabling plan properties 744 to be entered. A plan specification pop-up screen 746 (FIG. 26) is displayed for enabling plan specifications 748 to be entered. The plan information 740, the plan properties 744, and the plan specifications 748 are then used for creating a new plan offering within the service catalog of the CSB platform 202. An instance of a cloud can be added through a similar process.

Referring now to FIGS. 27-30, a method for adding a provider service to a catalog of the CSB platform 202. For example, through a suitable action (e.g., selection of an add provider service selection) at the catalog management tab of the CSB platform 202 (e.g., a portal thereof), a provider services screen 760 (FIG. 27) of the catalog management section 702 of the catalog management tab is displayed. The provider screen 760 includes service plan details 764 for providers that are currently configured within the CSB platform and includes an Add Service button 766 for enabling new services to be added. Selection of the Add Service button 766 causes a process for creating a new service within the service catalog of the CSB platform 202 to be initiated. A service information pop-up screen 768 (FIG. 28) is displayed for enabling service information 770 to be entered. A service properties pop-up screen 772 (FIG. 29) is displayed for enabling service properties 774 to be entered. A service terms and conditions pop-up screen 776 (FIG. 30) is displayed for enabling service terms and conditions 778 to be entered. The service information 770 (FIG. 28), the service properties 744, and the service terms and conditions 778 are then used for creating a new provider service offering within the service catalog of the CSB platform 202 where provider location, instance name, provide plan (e.g., balanced or essential), technology (e.g., VCD, open stack, Eucalyptus), integration method (e.g., REST API, Web Services, JAVA API) Provisioning API URL/, user name/password, Billing API/user name/password) are provided via one or more pop-up screens.

Figure 31:
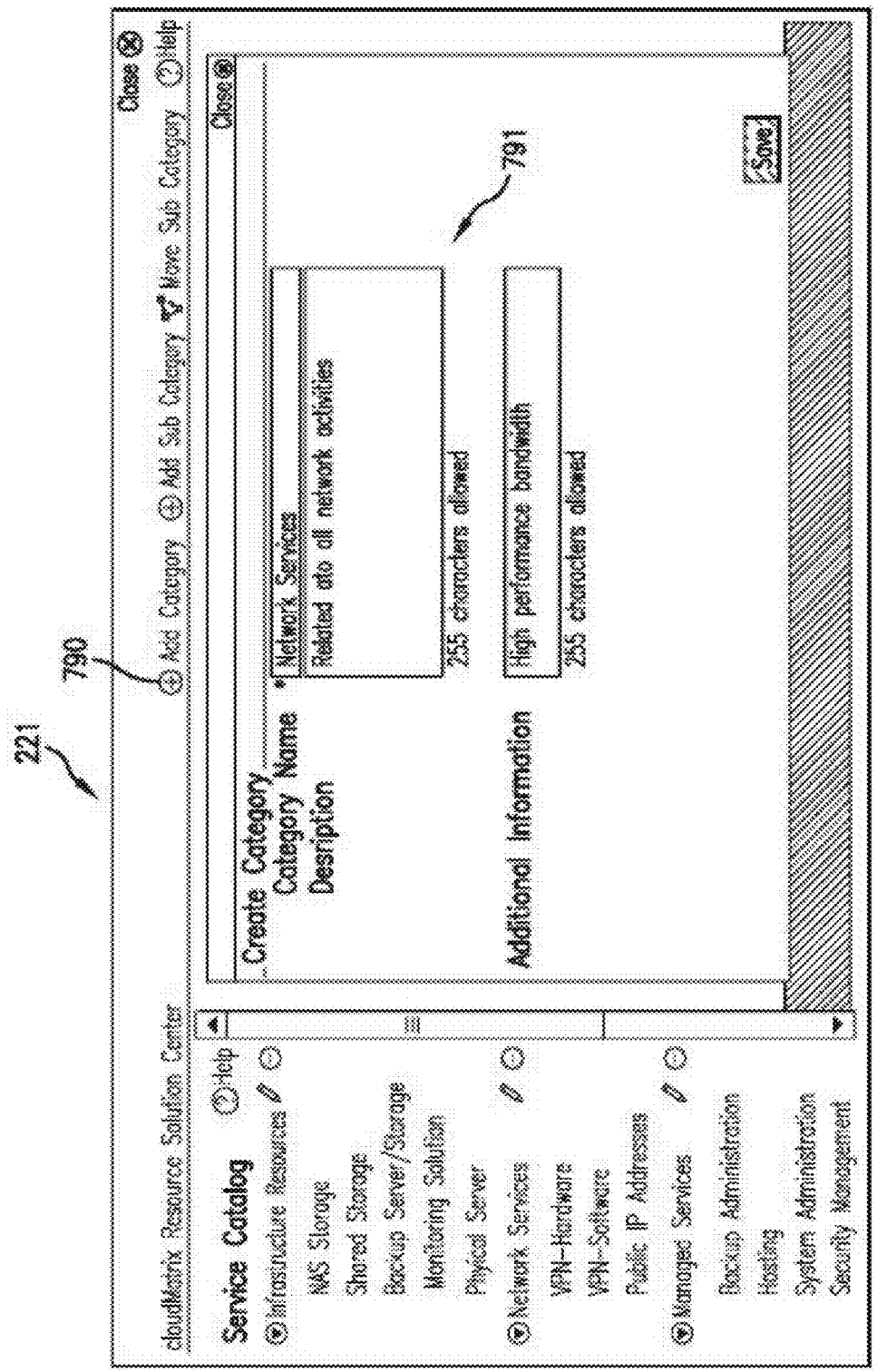
FIG. 31 is an illustrative view showing create category screen of the resource solution center in FIG. 3B.
Figure 32:
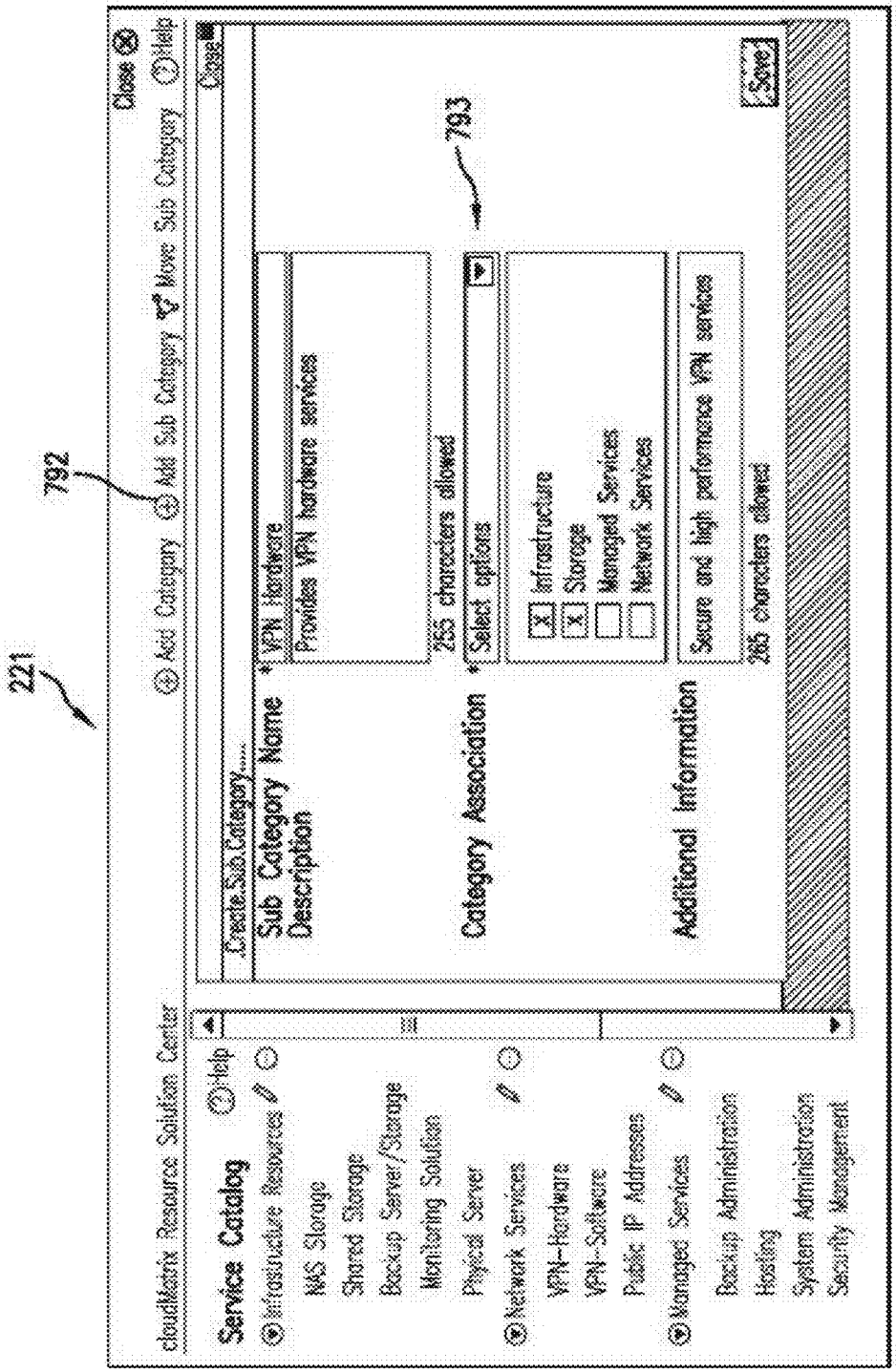
FIG. 32 is an illustrative view showing create sub-category screen of the resource solution center in FIG. 3B.

Entries in the service catalog can also be managed through the resource solution center 221 discussed above in reference to FIG. 3B. The resource solution center 221 can have selections available for enabling a user to add providers, plans and services such as, for example, through the respective process presented above in reference to FIGS. 19-22, 23-26, and 27-30, respectively. Furthermore, through a suitable action at the resource solution center 221, a new category and/or sub-category can be added. For example, selection of an Add Category button (FIG. 31) causes a process for creating a new category (defined by category information 791) within the service catalog of the CSB platform 202 to be initiated and selection of an Add Sub-category button 792 (FIG. 32) causes a process for creating a new sub-category (defined by sub-category information 793) within the service catalog of the CSB platform 202 to be initiated.

In view of the disclosures made herein, a skilled person will understand and appreciate that a service catalog configured in accordance to the present invention is not limited to any particular content. In this regard, a service catalog configured in accordance with the present invention can comprise any necessary and suitable cloud service offerings as necessary or desired by a CSB platform user (e.g., cloud solution architects, IT administrators, procurement managers, application developers, IT managers and the like).

Cloud Service Store

In preferred embodiments, cloud services are offered for procurement and fulfillment through a service store. Through the service store, cloud service subscribers can select desired cloud services (e.g., Managed Services, IaaS, SaaS, and PaaS cloud services) that are published to the service store (e.g., by a broker). The user then configures the selected cloud services, which causes them to be dynamically priced based on that configuration. After the desired cloud services are selected and configured, the user can create an order comprising these selected and configured cloud services and then request fulfillment of the cloud services.

Implementation of a service store configured in accordance with embodiments of the present invention are not limited to the their manner of implementation. Such a service store can be implemented as a standalone system or application or can be implemented as a component of a CSB platform. For example, the service store functionality can be integrated into the order module 222 and/or the broker operations module 238 discussed in reference to FIG. 3A.

Referring now to FIG. 33, a method 1000 for implementing procurement of cloud services accordance with an embodiment of the present invention is shown. In preferred embodiments, such implementing procurement of cloud services is performed within a CSB platform configured in accordance with an embodiment of the present invention. In preferred embodiments, a portion of the method involves creating an electronic cloud services catalog and a portion of the method involved creating cloud service orders consisting of cloud services contained in the electronic cloud services catalog. Advantageously, creation of the cloud service orders can be implemented via a service store (i.e., cloud service store) in which cloud services from the electronic cloud services catalog are selectively published (i.e., cloud service publications) by an entity such as, for example, a cloud service broker. In this respect, a plurality of different service stores can be created from a single electronic cloud services catalog.

The method 1000 begins with creating the electronic cloud services catalog. To this end, an operation 1002 is performed for receiving cloud service defining information for cloud services an electronic cloud services catalog, followed by an operation 1004 for creating entries in the electronic cloud services catalog using the cloud service defining information. Each one of these entries represents a cloud service that can be published to one or more service stores. An example of a detailed implementation of receiving the cloud service defining information and creating entries in the electronic cloud services catalog therefrom is disclosed herein in reference to FIGS. 19-32. It is disclosed herein (as indicated by the dotted line in association with operations 1002 and 1004) that content in the electronic cloud services catalog is dynamic as provided for via cloud services are routinely or periodically being added to the electronic cloud services catalog, removed from the electronic cloud services catalog, or modified within the electronic cloud services catalog.

After creation of an instantiation of the electronic cloud services catalog (e.g., an initial or subsequent edition thereof), an operation 1006 is performed for receiving a publication specification, followed by an operation 1008 for creating the cloud service publications using information in the publication specification therefrom. In preferred embodiments, the publication specification includes information necessary for creating cloud service publications within a service store. To this end, such cloud service publications can be abstractions of corresponding cloud service defining information contained in the electronic cloud services catalog. For example, the cloud service publication for a cloud service can be a summarization of cloud service defining information thereof in a manner allowing an underlying premise of the cloud service to be readily ascertained such as by publication of essential service characterizing information (e.g., service name, key functionality, base price, service provider). It is disclosed herein (as indicated by the dotted line in association with operations 1006 and 1008) that the cloud service publications are routinely or periodically updated via replacement, updated, and/or new publication specifications being issued. For example, a cloud service broker in control of a particular service store can routinely or periodically revise cloud service offerings in the particular service store by issuing replacement, updated, and/or new publication specifications.

It is disclosed herein that publication specifications can include different forms of publication specification information. In one form, the publication specification information is directly correlated to an entry in the electronic cloud services catalog (e.g., broker creates publication specification(s) for a plurality of individual cloud services contained in the electronic cloud services catalog). In another form, the publication specification information is a cloud service solution that includes two or more of the cloud services contained in the electronic cloud service catalog. For example, such a cloud service solution can be created using VDC creation functionality discussed in reference to FIGS. 11-13 and/or IT architecture creation functionality discussed in reference to FIGS. 16-18 (e.g., creating a publication specification for a particular VM, resource group, and/or VDC through an action available in the Action menu 916). To this end, a service store configured in accordance with preferred embodiments of the present invention will have a solution design interface for enabling reception of solution design information generated by functionalities not part of the service store (e.g., interface configured to received solution design information from design portions of the CSB platform). The cloud service store is configured to assess the electronic cloud service catalog for determining cloud service providers that offer the cloud services of a selected one of the cloud service solutions.

Figure 34A:
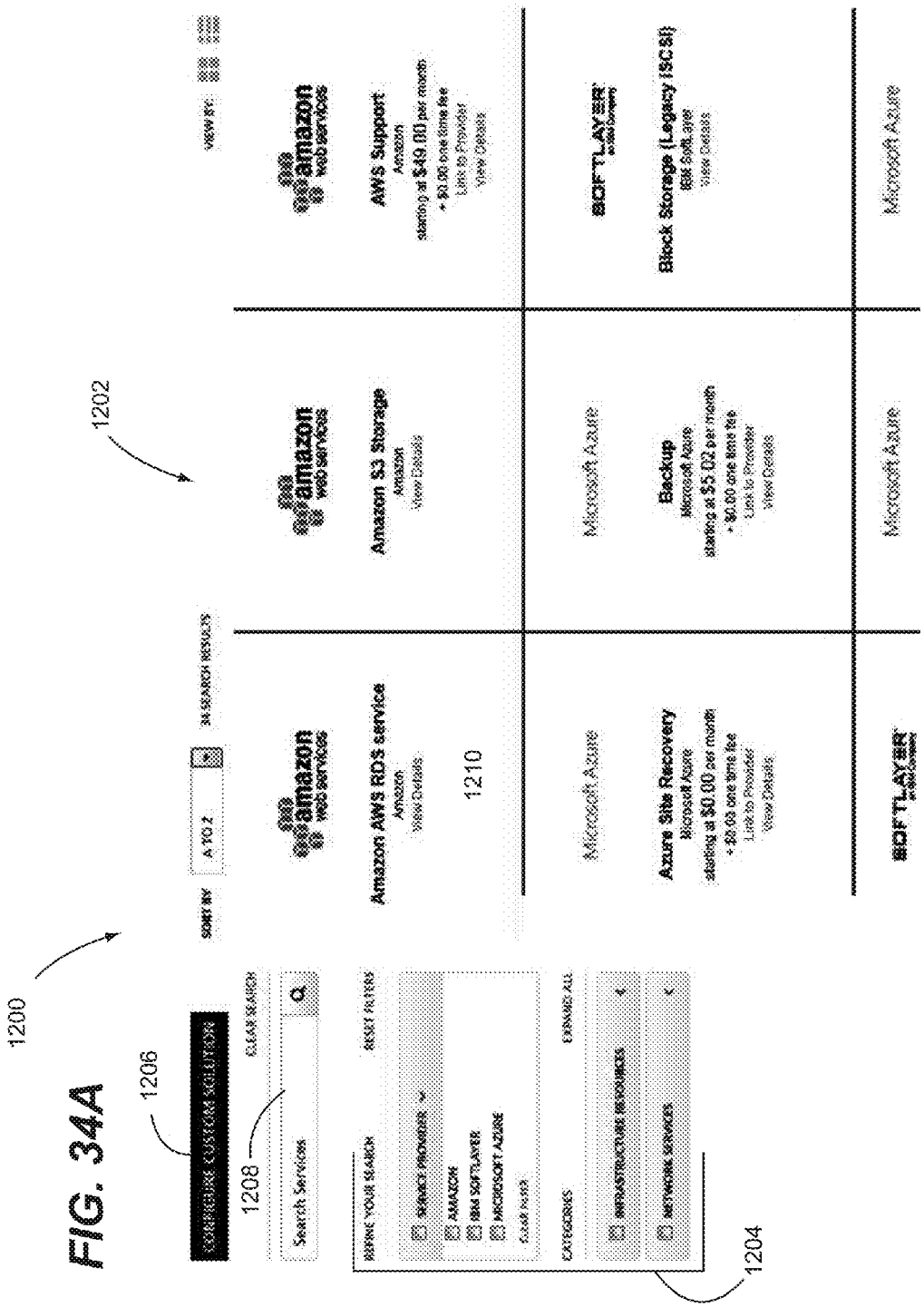
FIG. 34A is an illustrative view showing a selection option display area of a cloud service selection view providing a grid view of the cloud service publications.
Figure 34B:
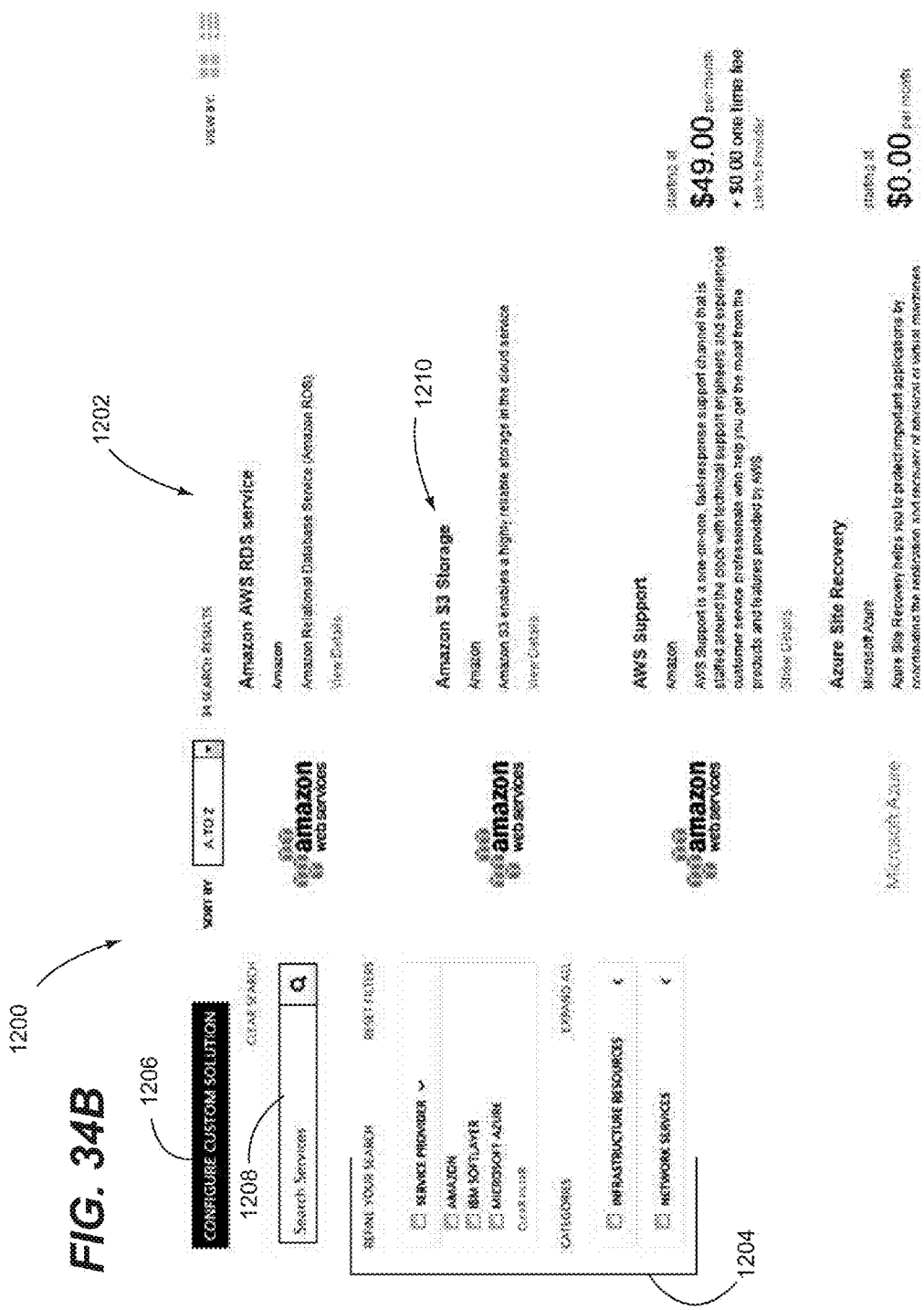
FIG. 34B is an illustrative view showing a selection option display area of a cloud service selection view providing a list view of the cloud service publications.

Following the cloud service publications being created, a user issues a command resulting in an operation 1010 being performed for receiving a request for cloud service selection options. FIGS. 34A and 34B each show a respective cloud service selection view 1200 through which a user can search and select cloud services that are within a service store that has been populated with cloud service publications corresponding to respective cloud services in the aforementioned electronic cloud services catalog. To this end, the cloud service store includes a catalog interface through which the cloud service defining information is received by the service store from the electronic cloud services catalog. Interaction by a user with this cloud service selection view 1200 will result in such command for receiving the request for cloud service selection options (e.g., a search query). The cloud service selection view 1200 in FIGS. 34A and 34B includes a publication display area 1202, cloud service filters 1204, a custom solution configuration selector 1206, and a services search tool 1208. Cloud service publications 1210 corresponding to selected cloud service filter options designated by a user in the cloud service filters 1204 are displayed in the selection option display area 1202. The publication display area 1202 of FIG. 34A provides a grid view of the cloud service publications 1210 and the publication display area 1202 of FIG. 34B provides a list view of the cloud service publications 1210.

As can be seen, the cloud service selection view 1200 offers multiple ways to help users find cloud services they are in need of User can use the cloud service filters 1204 to filter by service provider, service categories, sub-categories, service description, and the like (i.e., all of which are examples of cloud service defining information). For example, all the services provided by a particular service provider are displayed when that particular service provider is selected, all services belonging to a particular category are displayed when that particular category is selected, and so forth. Furthermore, the cloud service filters 1204 can be used in combination with each other. For example, if user selects sub-category of 'Analytics' and provider of 'Amazon', all services belonging to this combination will be displayed. These filter selections are dynamically updated based upon other filter settings. For example, when selecting 'Analytics' sub-category, if there are no services offered by 'Amazon' in this sub-category, then 'Amazon' selection in the Service Provider filter is disabled. Furthermore, a user can select the custom solution configuration selector 1206 for allowing a custom cloud service solution including a plurality of published cloud services to be created (e.g., via a system-provided design tool). Still further, a user can perform a search of the cloud services by using the search textbox 1210 using a text string to search cloud service defining information (e.g., service name, service category, sub-category, service description, additional information, provider name).

After receiving the request for cloud service selection options, an operation 1012 is performed for determining cloud service publications corresponding to the request, followed by an operation 1014 being performed for conveying (e.g., displaying) the cloud service publication that are determined to correspond to the request. To that end, an operation 1016 (now referring to FIG. 33B) is performed for receiving a cloud service publication (e.g., as selected from within the publication display area 1202 of the cloud service selection view 1200). Preferably, such conveying results in cloud service publications corresponding to the request being displayed in the publication display area 1202 of the cloud service selection view 1200 in a manner allowing the user to select a chosen one of the cloud service publications. Each cloud service has configuration requirements (i.e., parameters that define an instantiation of a particular cloud service) associated therewith.

Figure 34C:
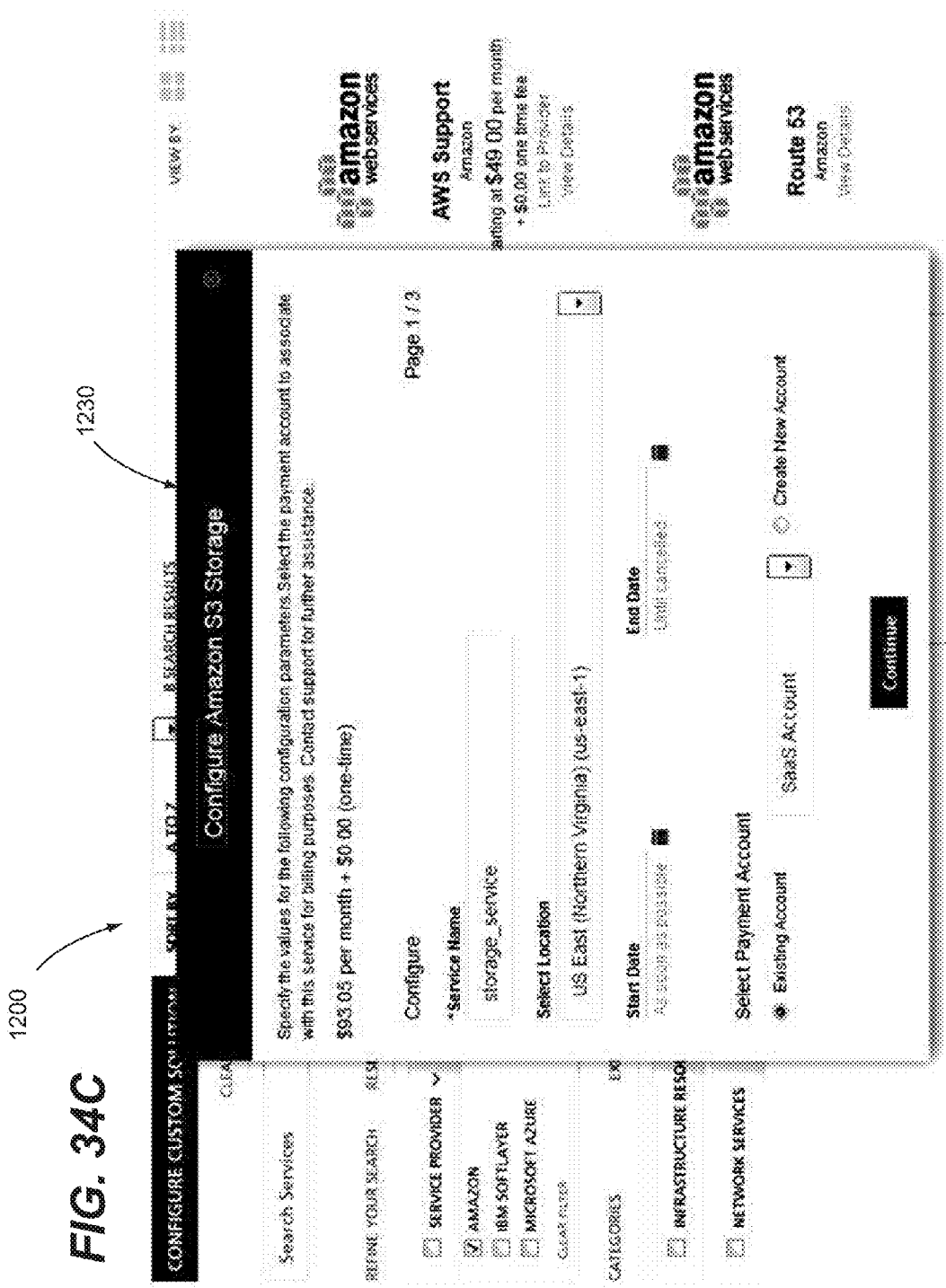
FIGS. 34C and 34D are illustrative views showing respective cloud service configuration views through which a user can input cloud service configuration information for a cloud service corresponding to a selected cloud service publication.
Figure 34D:
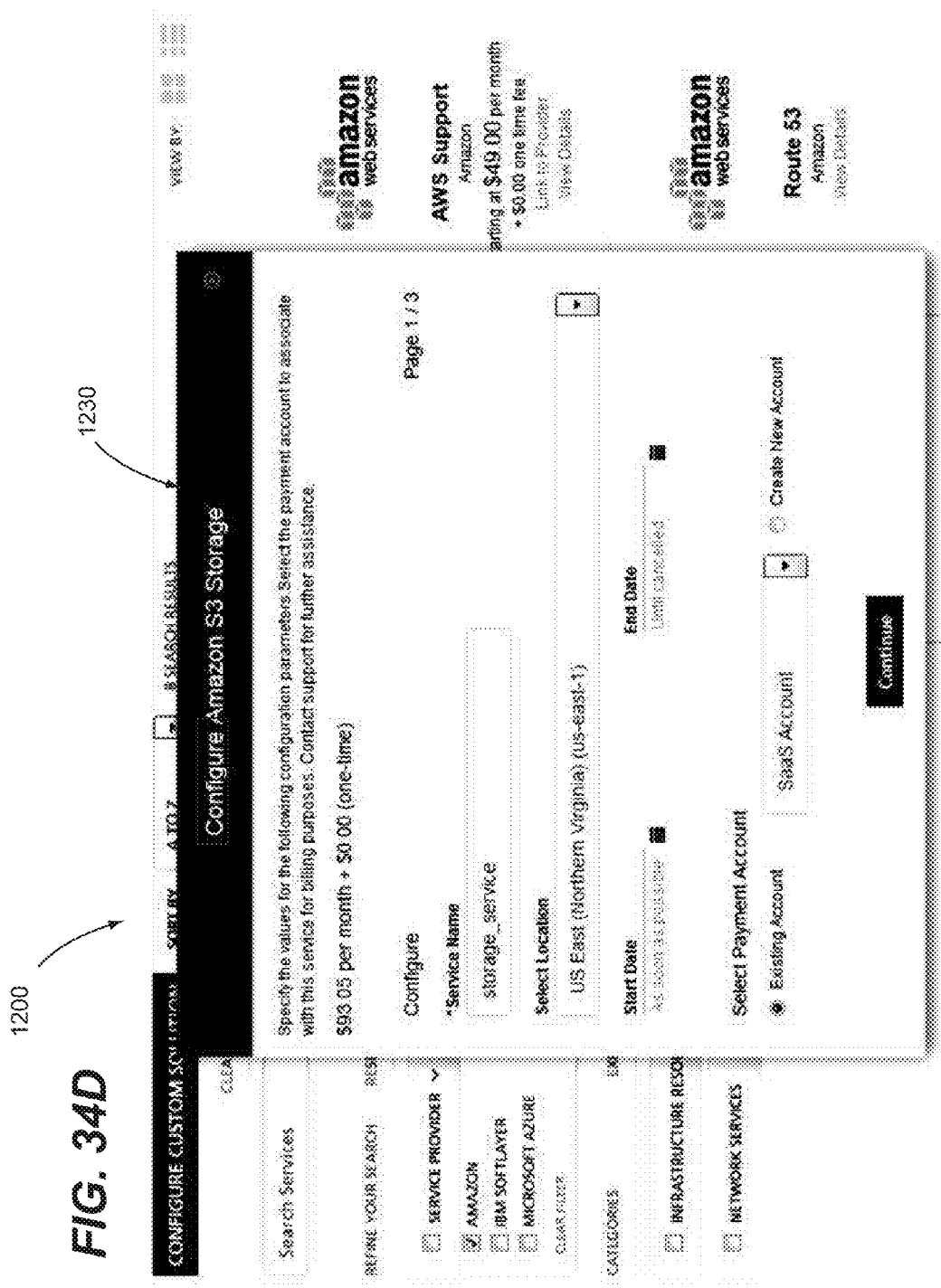

After receiving a selected cloud service publication, an operation 1018 is performed for determining configuration requirements for the cloud service corresponding to the selected cloud service publication, followed by an operation 1020 for requesting the configuration requirements for the cloud service corresponding to the selected cloud service publication. These configuration requirements dictate the specific configuration of the service. Such configuration requirements can be specific to different categories and, optionally, subcategories of services. For example, storage can have a common set of configuration requirements that define an instantiation thereof whereas virtual machines can have a common set of configuration requirements that define an instantiation thereof. FIGS. 34C and 34D each show a respective cloud service configuration view 1230 of a service store (e.g., a pop-up on top of the cloud service selection view 1200) through which a user can input cloud service configuration information for the cloud service corresponding to the selected cloud service publication.

Figure 33A:
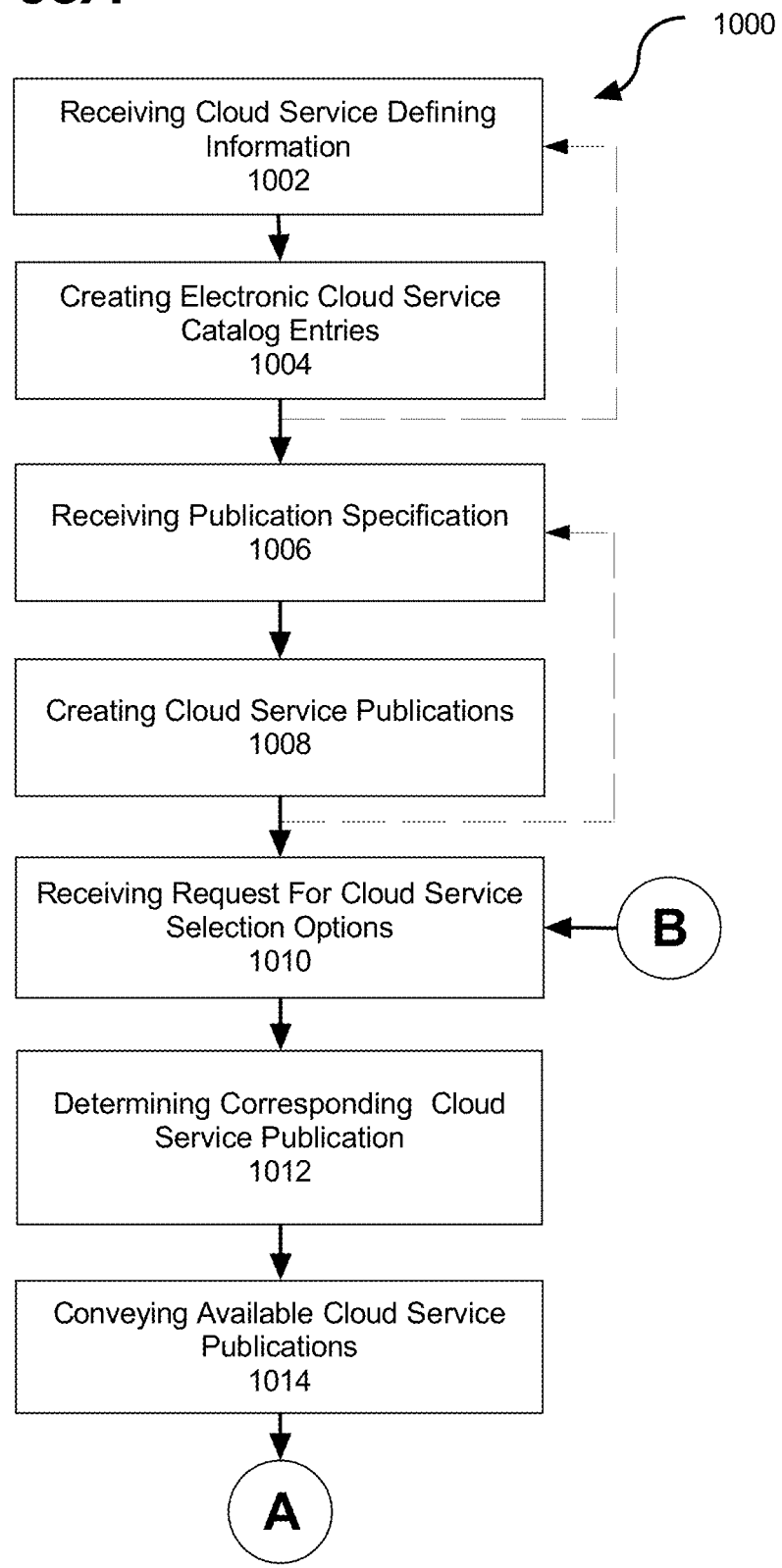
FIGS. 33A and 33B is a flow diagram view showing a method for implementing procurement of cloud services in accordance with an embodiment of the present invention.
Figure 33B:
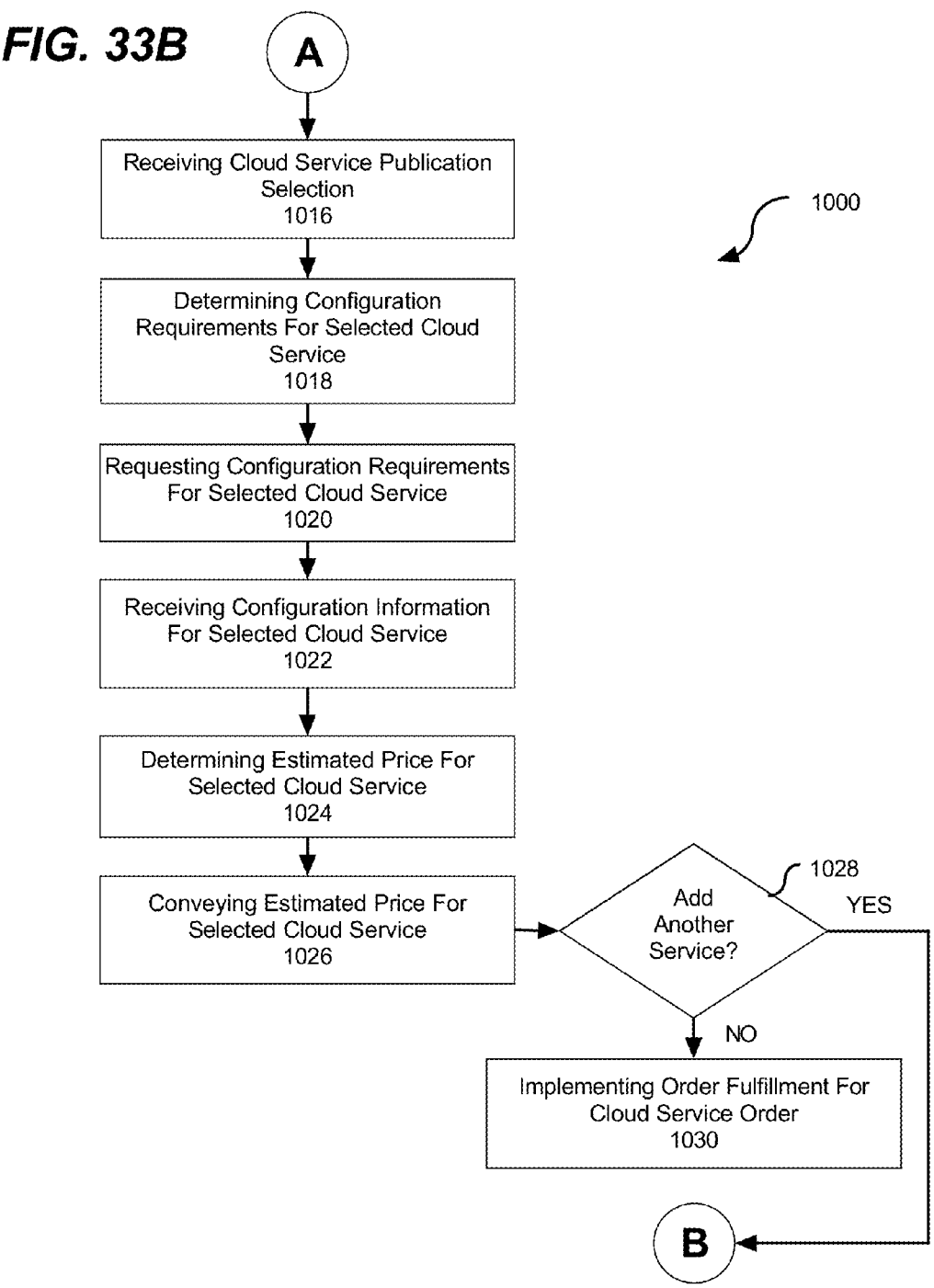
Figure 34E:
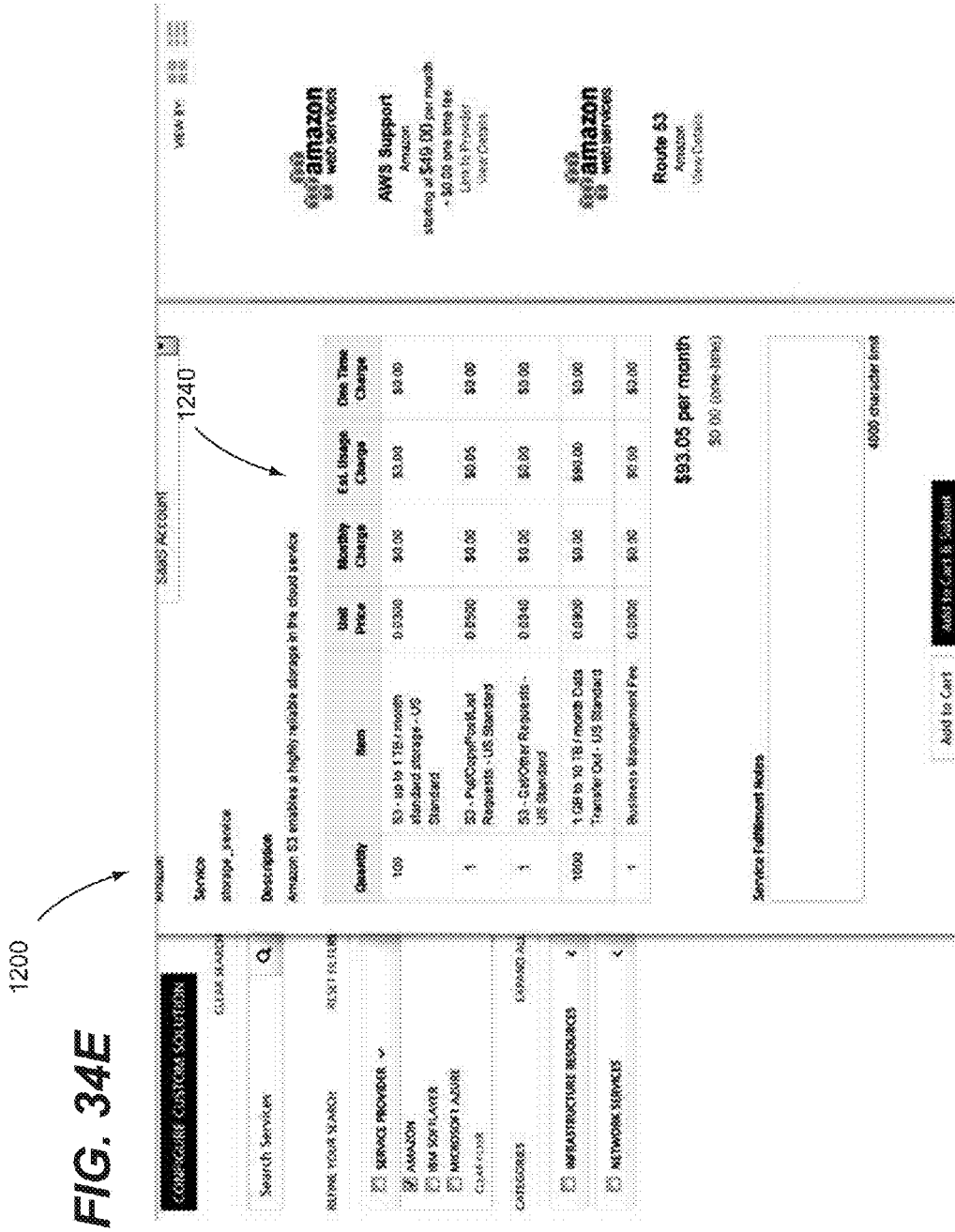
FIG. 34E is an illustrative view showing a cloud service pricing view for the cloud service corresponding to the selected cloud service publication.

In response to performing an operation 1022 for receiving the cloud service configuration information for the cloud service corresponding to the selected cloud service publication, an operation 1024 is performed for determining estimated price information for the cloud service corresponding to the selected cloud service publication, followed by an operation 1026 for conveying (e.g., displaying) the estimated price information. FIG. 34E shows a cloud service pricing view for the cloud service corresponding to the selected cloud service publication, which was determined dependent upon the cloud service configuration information received therefor. The estimated price information is determined dependent upon the cloud service configuration information received therefor. For example, using the cloud service configuration information received for the cloud service corresponding to the selected cloud service publication, pricing parameters for the cloud service are accessed from within the electronic cloud service catalog and, in combination with the cloud service configuration information, the estimated price information is determined. In this manner, for example, when a user browses for a service, a starting price is displayed to the user. When the user enters configuration data for the service, the service gets dynamically priced based on user input. The cloud service pricing can take into account consideration such as, for example, pricing rules that can be defined on multiple contexts. Examples of these contexts include, but are not limited to, provider (e.g., X % discount for services provided by Amazon), customer (e.g., Y % discount for purchased made by Customer ABC Corp.), affiliate (e.g., Z % upcharge for services made by customers of Affiliate XYZ), catalog Item (A % discount for catalog item(s)), catalog item type (e.g., C % discount for catalog item or more catalog item(s)), specific services (e.g., D % discount for Amazon S3 Service), etc. In this respect, cloud service pricing can takes into account pricing rules that can be defined on multiple contexts. These pricing rules can be set up by a broker responsible for an associated service catalog or other system administrator In response to the cloud service corresponding to the selected cloud service publication being confirmed for order (e.g., added to a cloud service order), an operation 1028 is performed for determining if another cloud service is to be included in the current cloud service order. If it is determined that another cloud service is to be included in the current cloud service order, the method 1000 continues at the operation 1010 for receiving the request for cloud service selection options (FIG. 33A). Otherwise, the method 1000 continues with an operation 1030 for implementing order fulfillment for the cloud service order.

Figure 35:
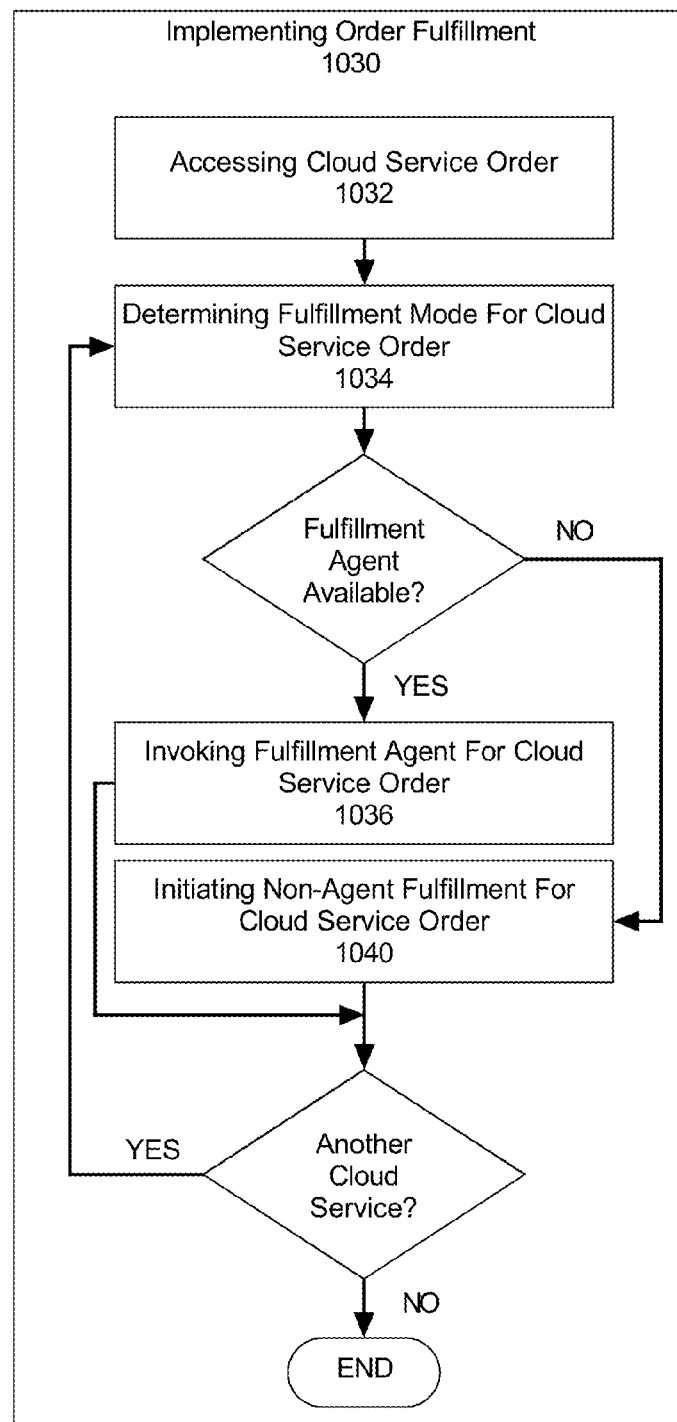
FIG. 35 is a flow diagram view showing a method for fulfilling cloud service orders in accordance with an embodiment of the present invention.

Referring now to FIG. 35, a detailed embodiment of the operation 1030 for implementing order fulfillment of the cloud service order is discussed. A step 1032 is performed for accessing the cloud service order, followed by a step 1034 for determining a suitable order fulfillment mode for fulfilling a particular cloud service in the cloud service order. If it is determined that a fulfillment agent is available for fulfilling the particular cloud service, a step 1036 is performed for invoking the fulfillment agent for fulfilling the particular cloud service. Otherwise, an operation 1038 is performed for initiating a non-agent fulfillment mode. Thereafter an operation 1040 is performed for determining if fulfillment is required for another cloud service of the service order. If fulfillment of another cloud service is required, the operation continues at the step 1034 for determining a suitable fulfillment mode therefor.

Examples of order fulfillment modes include a fulfillment mode where a fulfillment agent performs fulfillment without the need for human intervention and a fulfillment mode where such fulfillment is performed in a manner that requires human intervention (i.e., a human performing one or more actions for fulfilling the particular cloud service). A system-automated agent that performs fulfillment is an example of a fulfillment mode that performs fulfillment without the need for human intervention. Examples of fulfillment modes that requires human intervention (i.e., non-agent fulfillment modes) include, but are not limited to, a third party performing such fulfillment (e.g., CSB platform provides necessary information thereto) and a service store operator (e.g., cloud service broker in control of the service store) performing such fulfillment.

In view of the disclosures made herein, a skilled person will understand that a CSB platform configured in accordance with the present invention (e.g., a service store thereof) can include an interface (e.g., a "service fulfillment bridge interface") through which multiple cloud services in a cloud service order from different cloud service providers are fulfilled. The fulfillment bridge interface connects to a fulfillment bridge that implements an appropriate fulfillment agent for each cloud service in a cloud service order that is determined to be capable of being fulfilled by a fulfillment agent. To this end, when a cloud service order is generated, after the approvals are obtained, each cloud service in the cloud service order is fulfilled. If a particular cloud service is indicated as being fulfilled via the service fulfillment bridge, then the service fulfillment bridge interface enables fulfilling of that particular cloud service by passing relevant information to the service fulfillment bridge (e.g., the associated fulfillment agent thereof). In this respect, the service fulfillment bridge acts as a facilitator to implement fulfillment of suitably configured cloud services.

DETAILED DESCRIPTION SUMMARY

In view of the foregoing disclosures, a skilled person will appreciate that embodiments of the present invention offer several beneficial considerations. One such consideration is enabling private cloud as a service PaaS for enabling true IaaS for end customers in addition to IaaS for enterprise IT. Another such consideration is the ability to shift a private cloud from to a fulfillment model of service to end customers (business units and application teams) to a self-service model offering design, order, fulfillment and control. Another such consideration is enabling IT as a private cloud provider to publish private cloud into a cloud service model for self-service consumption and equal footing with public cloud services thereby allowing enterprise IT to compete in a healthy way with public clouds and provide best value to their costumers (e.g., business units, application teams and the like). Another such consideration is normalization of services and functionalities across disparate public cloud service models (e.g., reserved capacity, pay-as-you-go, reserved instances, memory based pricing, VM based pricing, etc.) and private cloud models for enabling 'apples-to-apples' comparison and best-fit determination. Another such consideration is an ability to graphically design, view and maintain a truly hybrid and dynamic changing cloud solution. Another such consideration is an ability for cloud solution architects, IT administrators, procurement managers, application developers, IT managers, and other constituents to collaborate and manage cloud based solutions across IaaS, PaaS, SaaS, Managed Services and other categories of cloud services through a scenarios concept (e.g., solution or application design). Another such consideration is automated Cost allocation and chargeback to business units, applications, environments, architecture layers, virtual data centers etc such as, for example, loading a bill of charges for specific resources leads to system dynamically computing and maintaining the allocations and chargeback based on a dynamic continuously updated and architected inventory (e.g., via a service catalog). Another such consideration is the ability to provide for conception, implementation and, management of a 'Consolidated Services Order' across cloud services and across multiple providers with order components that have been built up over time. For example, in the cloud environment on a daily or sometimes hourly basis, new cloud services such as virtual machines (VM), additional capacity, additional storage and the like can be added or removed to take advantage of cloud agility and cost models. Another such consideration is enabling consolidated order functionality that provides the ability for an up-to-date 'estimated' bill of materials against which 'actual' costs are tracked and allocated. Another such consideration is conception, implementation and management of a 'consolidated bill' across the cloud services and across multiple providers for each month for each customer.

Although the invention has been described with reference to several exemplary embodiments, it is understood that the words that have been used are words of description and illustration, rather than words of limitation. Changes may be made within the purview of claims supported by the disclosures made herein, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the claims supported by the disclosures made herein.

What is claimed is:

1. A cloud service brokerage system, comprising:
at least one data processing device; and
a non-transitory computer-readable storage medium coupled to the at least one data processing device, the non-transitory computer-readable storage medium having tangibly embodied thereon and accessible therefrom instructions executed by the at least one data processing device, the instructions causing the at least one data processing device to implement:
a plurality of cloud service information providing application programming interfaces (APIs) each providing a connection to a respective one of a plurality of cloud service providers for enabling information defining cloud services thereof to be acquired;

an electronic cloud service catalog containing said cloud service defining information for each one of the cloud services, wherein said cloud service defining information for each one of the cloud services is received from a respective one of the cloud service providers; and a plurality of cloud service stores each including cloud service publications defined exclusively by a respective one of the cloud service brokers, wherein each one of the cloud service stores includes a respective one of a plurality of broker information providing APIs, wherein each one of the broker information providing APIs enables a respective one of a plurality of cloud service brokers to access and manipulate information defining a publication specification thereof, wherein the publication specification of a respective one of the cloud service brokers includes abstraction-defining information utilized exclusively for creating cloud service publications of a cloud service store-thereof by abstracting the cloud service defining information of the electronic cloud service catalog in accordance with the abstraction-defining information of the publication specification thereof, wherein said abstracted cloud service defining information of a particular one of the cloud service publications in the cloud service store of the respective one of the cloud service brokers is correspondingly updated in response to the abstraction-defining information of the publication specifications of the respective one of the cloud service brokers being altered thereby causing configuration of the publication specifications to define a manner in which cloud services contained in the electronic cloud service catalog that are available for procurement via the respective one of the cloud service stores are published as cloud service publications therein, wherein each one of the cloud service stores includes a user interface structure enabling generation of cloud service orders therefrom that include one or more cloud services each characterized by a respective one of the cloud service publications thereof, and wherein each one of the service store conveys cloud service order procurement information for each one of the cloud service orders thereof to respective ones of the cloud service providers through at least one of the cloud service information providing APIs.

2. The cloud service brokerage system of claim 1 wherein the cloud service defining information of the cloud service publication for each one of the cloud services specifies a respective one of a plurality of cloud service providers through which the cloud service is provided.

3. The cloud service brokerage system of claim 1 wherein:
the abstraction-defining information of the publication specification corresponding to a particular one of the cloud service stores includes publication specification information corresponding to a cloud service solution;
the at least one of the cloud service stores includes a solution design interface through which the publication specification information corresponding to the cloud service solution is provided to the particular one of the cloud service stores; and
the cloud service solution includes two or more of the cloud services contained in the electronic cloud service.

4. The cloud service brokerage system of claim 3 wherein:
the cloud service defining information for each one of the cloud services specifies a respective one of a plurality of cloud service providers through which the cloud service is provided; and
the particular one of the cloud service stores is configured to determine one or more of the cloud service providers that offer the two or more cloud services of the cloud service solution.

5. The cloud service brokerage system of claim 1 wherein the user interface structure of at least one of the cloud stores is configured to:
enable user-designated selection of one or more of the cloud service publications for designating one or more cloud services ordered in a respective one of the cloud service orders; and
allow user-designated configuration information to be received for each the one or more selected cloud service publications.

6. The cloud service brokerage system of claim 5 wherein:
the at least one of the cloud service stores is configured to generate service pricing information for each selected one of the cloud services publications dependent upon the user-designated configuration information associated therewith.

7. The cloud service brokerage system of claim 6 wherein:
each one of the cloud service stores includes a catalog interface through which the cloud service defining information is received therefrom; and
each one of the cloud service store uses a portion of the cloud service defining information for each selected one of the cloud service publications to generate the service pricing information therefor.

8. The cloud service brokerage system of claim 1 wherein:
each one of the cloud service store is configured to generate service pricing information for each one of the cloud service publications in a selected one of the cloud service publications; and
the service pricing information is generated dependent upon user-designated configuration information corresponding thereto and upon pricing rules defined on a per-service store basis by the respective cloud service store administrator thereof.

9. An apparatus for ordering cloud services, comprising:
at least one data processing device; and
non-transitory computer-readable storage medium having thereon and accessible therefrom instructions executed by the at least one data processing device, the instructions being configured for causing the at least one data processing device to perform a method comprising:
implementing a plurality of cloud service information providing application programming interfaces (APIs), wherein each one the cloud service information providing APIs provides a connection to a respective one of a plurality of cloud service providers for enabling information defining cloud services thereof to be acquired;
populating an electronic data repository with the cloud service defining information for each one of a plurality of cloud services, wherein the cloud service defining information of each of the cloud services is received from a respective one of the cloud service providers via a corresponding one of the cloud service information providing APIs;
receiving one or more publication specifications each including abstraction-defining information for one or more cloud services maintained in the electronic data repository, wherein said receiving includes implementing a plurality of broker information providing APIs each enabling a respective one of a plurality of cloud service brokers to access and manipulate information defining a publication specification thereof, wherein the publication specification of a respective one of the cloud service brokers includes abstraction-defining information utilized exclusively for creating cloud service publications of a cloud service store thereof by abstracting said cloud service defining information from the electronic cloud service catalog in accordance with said abstraction-defining information of the publication specification thereof;

creating cloud service publications each in accordance with a respective one of the publication specifications, wherein said creating each one of the cloud service publications includes abstracting the cloud service defining information of the electronic cloud service catalog in accordance with the abstraction-defining information of a respective one of the publication specifications whereby each one of the cloud service publications is an abstraction of a corresponding one or more of the cloud services in the electronic data repository in accordance with the abstraction-defining information of the respective one of the publication specifications;

updating one or more of the cloud service publications in the cloud service store of the respective one of the cloud service brokers in response to said abstraction-defining information of the publication specifications of the respective one of the cloud service brokers being altered thereby causing configuration of the publication specifications to define a manner in which cloud services contained in the electronic cloud service catalog that are available for procurement via the respective one of the cloud service stores are published as cloud service publications therein.

10. The apparatus of claim 9 wherein publication specification information of the publication specification for a particular one of the cloud service stores is defined by a respective cloud service solution including a plurality of the cloud services within the electronic data repository.

11. The apparatus of claim 10 wherein
the cloud service defining information for each one of the cloud services specifies a respective one of the cloud service providers through which the cloud service is provided.

12. A non-transitory computer-readable storage medium having tangibly embodied thereon and accessible therefrom instructions interpretable by at least one data processing device, the instructions are configured for causing the at least one data processing device to perform a method comprising:

implementing a plurality of cloud service information providing application programming interfaces (APIs), wherein each one the cloud service information providing APIs provides a connection to a respective one of a plurality of cloud service providers for enabling information defining cloud services of each one of said cloud service providers to be acquired;

populating an electronic data repository with the cloud service defining information for each one of a plurality of cloud services, wherein the cloud service defining information of each of the cloud services is received from a respective one of the cloud service providers via a corresponding one of the cloud service information providing APIs;

receiving one or more publication specifications each including abstraction-defining information for one or more cloud services maintained in the electronic data repository, wherein said receiving includes implementing a plurality of broker information providing APIs each enabling a respective one of a plurality of cloud service brokers to access and manipulate information defining a publication specification thereof, wherein the publication specification of a respective one of the cloud service brokers includes abstraction-defining information utilized exclusively for creating cloud service publications of a cloud service store thereof by abstracting said cloud service defining information from the electronic cloud service catalog in accordance with said abstraction-defining information of the publication specification thereof;

creating cloud service publications each in accordance with a respective one of the publication specifications, wherein said creating each one of the cloud service publications includes abstracting the cloud service defining information of the electronic cloud service catalog in accordance with the abstraction-defining information of a respective one of the publication specifications whereby each one of the cloud service publications is an abstraction of a corresponding one or more of the cloud services in the electronic data repository in accordance with the abstraction-defining information of the respective one of the publication specifications;

updating one or more of the cloud service publications in the cloud service store of the respective one of the cloud service brokers in response to said abstraction-defining information of the publication specifications of the respective one of the cloud service brokers being altered thereby causing configuration of the publication specifications to define a manner in which cloud services contained in the electronic cloud service catalog that are available for procurement via the respective one of the cloud service stores are published as cloud service publications therein.

13. The non-transitory computer-readable storage medium of claim 12 wherein publication specification information of the publication specification for a particular one of the cloud service stores is defined by a cloud service solution including a plurality of the cloud services within the electronic data repository.

* * * * *